United States Patent
Miyauchi

(10) Patent No.: US 9,742,323 B2
(45) Date of Patent: Aug. 22, 2017

(54) PHASE CONTROL CIRCUIT FOR BRUSHLESS MOTOR, BRUSHLESS MOTOR AND METHOD FOR CONTROLLING THE PHASE OF BRUSHLESS MOTOR

(71) Applicant: Mabuchi Motor Co., Ltd., Matsudo, Chiba (JP)

(72) Inventor: Naoto Miyauchi, Matsudo (JP)

(73) Assignee: MABUCHI MOTOR CO., LTD., Matsudo, Chiba (JE)

( * ) Notice: Subject to any disclaimer, the term of this patent is extended or adjusted under 35 U.S.C. 154(b) by 0 days.

(21) Appl. No.: 14/993,919

(22) Filed: Jan. 12, 2016

(65) Prior Publication Data

US 2016/0126872 A1    May 5, 2016

Related U.S. Application Data

(63) Continuation of application No. PCT/JP2014/071491, filed on Aug. 15, 2014.

(30) Foreign Application Priority Data

Sep. 30, 2013    (JP) ................. 2013-205799

(51) Int. Cl.
    *H02P 6/16*    (2016.01)
    *H02K 29/08*   (2006.01)
    (Continued)

(52) U.S. Cl.
    CPC ............ *H02P 6/16* (2013.01); *H02K 1/2753* (2013.01); *H02K 3/28* (2013.01); *H02K 11/215* (2016.01);
    (Continued)

(58) Field of Classification Search
    USPC ................ 318/700, 400.01, 400.14, 538
    See application file for complete search history.

(56) References Cited

U.S. PATENT DOCUMENTS

| 5,418,416 | A | * | 5/1995 | Muller | ................. | H02K 1/146 |
|           |   |   |        |        |                   | 310/186    |
| 5,739,651 | A | * | 4/1998 | Miyazawa | ............. | H02P 6/181 |
|           |   |   |        |        |                   | 318/400.09 |

(Continued)

FOREIGN PATENT DOCUMENTS

| CN | 1661904 A | 8/2005 |
| CN | 1797931 A | 7/2006 |

(Continued)

OTHER PUBLICATIONS

PCT Application No. PCT/JP2014/071491 International Search Report dated Nov. 4, 2014, 3 pages.

(Continued)

*Primary Examiner* — Bentsu Ro
(74) *Attorney, Agent, or Firm* — Schwabe Williamson & Wyatt, PC

(57) ABSTRACT

A phase control circuit for a brushless motor includes a signal output unit that outputs M signals, whose phases differ from each other, in response to a change in the magnetic field resulting from the rotation of magnets placed in a rotor, and a control signal generator that generates two or more different kinds of group of phase control signals, based on at least the M signals, the group of phase control signals being used to control drive voltages, whose phases differ from each other, which are supplied to each phase of an N-phase coil (N being an integer greater than or equal to two). The control signal generator is configured such that a first phase control signal group and a second phase control signal group can be generated.

15 Claims, 50 Drawing Sheets

(51) Int. Cl.
*H02P 6/08* (2016.01)
*H02K 11/215* (2016.01)
*H02K 11/30* (2016.01)
*H02K 11/33* (2016.01)
*H02K 1/27* (2006.01)
*H02K 3/28* (2006.01)
*H02P 6/17* (2016.01)

(52) U.S. Cl.
CPC ............ *H02K 11/30* (2016.01); *H02K 11/33* (2016.01); *H02P 6/08* (2013.01); *H02P 6/17* (2016.02); *H02P 2203/05* (2013.01); *H02P 2207/05* (2013.01)

(56) References Cited

U.S. PATENT DOCUMENTS

| | | | |
|---|---|---|---|
| 5,942,863 A * | 8/1999 | Wada | H02K 29/08 318/400.04 |
| 2005/0184700 A1 | 8/2005 | Fujimura | |
| 2006/0138994 A1 | 6/2006 | Cheng | |

FOREIGN PATENT DOCUMENTS

| | | |
|---|---|---|
| JP | 2146996 U | 12/1990 |
| JP | 11215792 A | 8/1999 |
| JP | 2009268225 A | 11/2009 |
| JP | 2012-120338 A | 6/2012 |
| JP | 2012223065 A | 11/2012 |

OTHER PUBLICATIONS

Japanese Application No. 2015-502434 Office Action dated Sep. 15, 2015, 8 pages including English translation.
PCT Application No. PCT/JP2014/071491 International Preliminary Examination Report and Written Opinion dated Apr. 5, 2016, 11 pages with English translation.
Office Action dated Dec. 5, 2016 in TW application 1041000942, including English translation; 16 pages.
Office Action issued in Chinese Application No. 201480033538.0 dated Mar. 3, 2017; 16 pages including English translation.

* cited by examiner

FIG.4A

|   | | HALL ELEMENT U | HALL ELEMENT V | HALL ELEMENT W |
|---|---|---|---|---|
| ① | −30~30 | 0 | + | + |
| ② | 30~90 | 0 | 0 | + |
| ③ | 90~150 | + | 0 | + |
| ④ | 150~210 | + | 0 | 0 |
| ⑤ | 210~270 | + | + | 0 |
| ⑥ | 270~330 | 0 | + | 0 |
| ① | (330~390) | 0 | + | + |

FIG.4B

|   | | U-PHASE APPLIED VOLTAGE | V-PHASE APPLIED VOLTAGE | W-PHASE APPLIED VOLTAGE |
|---|---|---|---|---|
| ① | −30~30 | 0 | − | + |
| ② | 30~90 | + | − | 0 |
| ③ | 90~150 | + | 0 | − |
| ④ | 150~210 | 0 | + | − |
| ⑤ | 210~270 | − | + | 0 |
| ⑥ | 270~330 | − | 0 | + |
| ① | (330~390) | 0 | − | + |

FIG.8

| | | U-PHASE COMPARATOR OUTPUT | | V-PHASE COMPARATOR OUTPUT | | W-PHASE COMPARATOR OUTPUT | |
|---|---|---|---|---|---|---|---|
| | | + | − | + | − | + | − |
| ① | −30~30 | 0 | + | 0 | 0 | 0 | 0 |
| ② | 30~90 | 0 | 0 | 0 | 0 | + | 0 |
| ③ | 90~150 | 0 | 0 | 0 | + | 0 | 0 |
| ④ | 150~210 | + | 0 | 0 | 0 | 0 | 0 |
| ⑤ | 210~270 | 0 | 0 | 0 | 0 | 0 | + |
| ⑥ | 270~330 | 0 | 0 | + | 0 | 0 | 0 |
| ① | 330~390 | 0 | + | 0 | 0 | 0 | 0 |

FIG.10

|   | | U-PHASE COMPARATOR OUTPUT | | V-PHASE COMPARATOR OUTPUT | | W-PHASE COMPARATOR OUTPUT | |
|---|---|---|---|---|---|---|---|
|   | | + | − | + | − | + | − |
| ① | −30~10 | 0 | + | 0 | 0 | 0 | 0 |
| ② | 10~30 | 0 | + | 0 | 0 | + | 0 |
| ③ | 30~70 | 0 | 0 | 0 | 0 | + | 0 |
| ④ | 70~90 | 0 | 0 | 0 | + | + | 0 |
| ⑤ | 90~130 | 0 | 0 | 0 | + | 0 | 0 |
| ⑥ | 130~150 | + | 0 | 0 | + | 0 | 0 |
| ⑦ | 150~190 | + | 0 | 0 | 0 | 0 | 0 |
| ⑧ | 190~210 | + | 0 | 0 | 0 | 0 | + |
| ⑨ | 210~250 | 0 | 0 | 0 | 0 | 0 | + |
| ⑩ | 250~270 | 0 | 0 | + | 0 | 0 | + |
| ⑪ | 270~310 | 0 | 0 | + | 0 | 0 | 0 |
| ⑫ | 310~330 | 0 | + | + | 0 | 0 | 0 |
| ① | 330~370 | 0 | + | 0 | 0 | 0 | 0 |
| ② | 370~390 | 0 | + | 0 | 0 | + | 0 |

FIG.12A

APPLIED VOLTAGE DURING NEUTRAL POINT DRIVE

|   |   | U-PHASE APPLIED VOLTAGE | V-PHASE APPLIED VOLTAGE | W-PHASE APPLIED VOLTAGE |
|---|---|---|---|---|
| ① | −30~30 | 0 | − | + |
| ② | 30~90 | + | − | 0 |
| ③ | 90~150 | + | 0 | − |
| ④ | 150~210 | 0 | + | − |
| ⑤ | 210~270 | − | + | 0 |
| ⑥ | 270~330 | − | 0 | + |
| ① | (330~390) | 0 | − | + |

FIG.12B

APPLIED VOLTAGE DURING 20-DEGREE LEAD-ANGLE DRIVE

|   |   | U-PHASE APPLIED VOLTAGE | V-PHASE APPLIED VOLTAGE | W-PHASE APPLIED VOLTAGE |
|---|---|---|---|---|
| ① | −50~10 | 0 | − | + |
| ② | 10~70 | + | − | 0 |
| ③ | 70~130 | + | 0 | − |
| ④ | 130~190 | 0 | + | − |
| ⑤ | 190~250 | − | + | 0 |
| ⑥ | 250~310 | − | 0 | + |
| ① | (310~370) | 0 | − | + |
| ② | (370~430) | + | − | 0 |

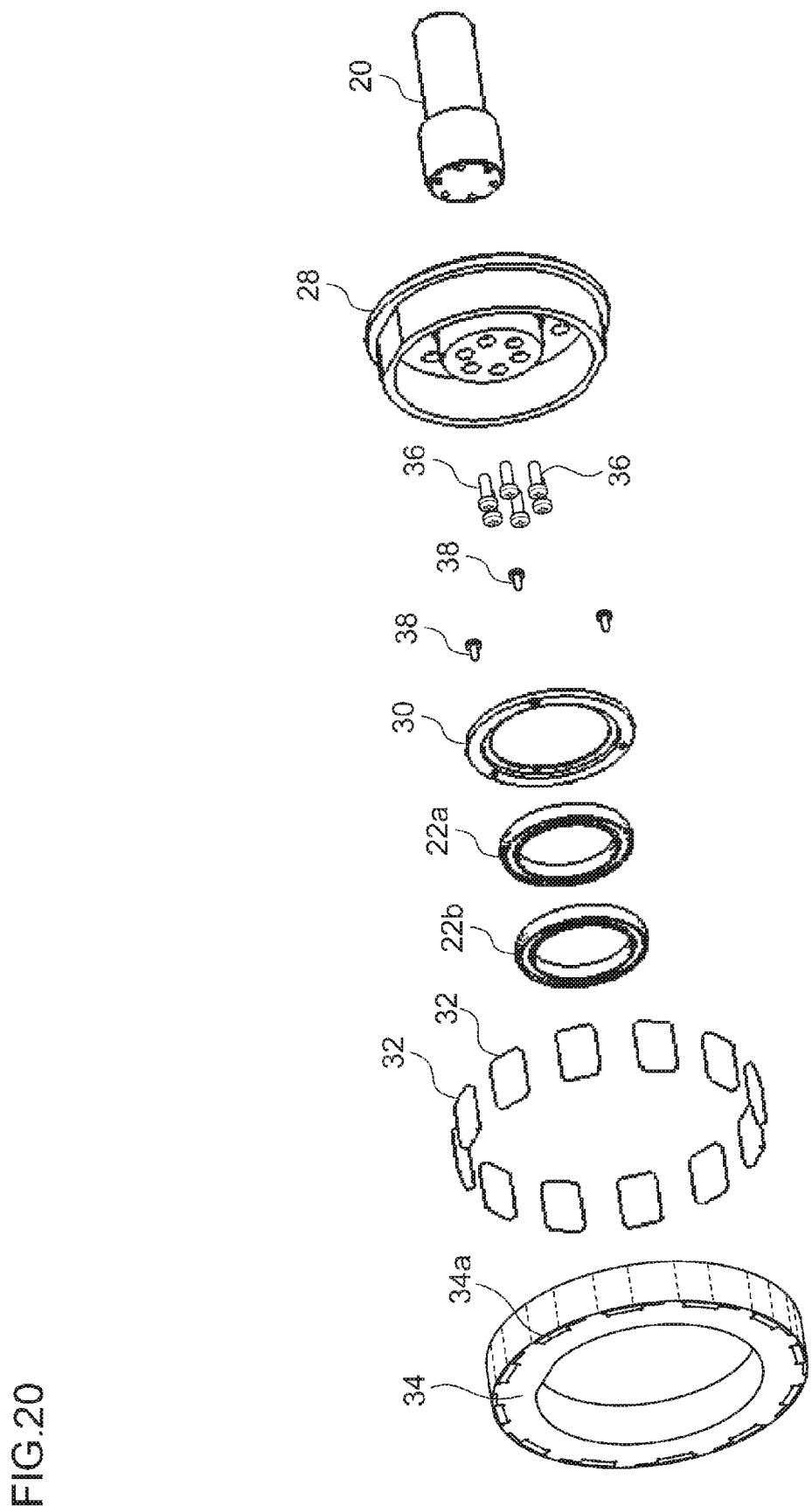

PHASE CONTROL CIRCUIT FOR BRUSHLESS MOTOR, BRUSHLESS MOTOR AND METHOD FOR CONTROLLING THE PHASE OF BRUSHLESS MOTOR

This application is based upon and claims the benefit of priority from the prior Japanese Patent Application No. 2013-205799, filed on Sep. 30, 2013, and International Patent Application No. PCT/JP 2014/071491, filed on Aug. 15, 2014, the entire content of each of which is incorporated herein by reference.

BACKGROUND OF THE INVENTION

1. Field of the Invention

The present invention relates to a brushless motor.

2. Description of the Related Art

Conventionally, electric motors are used as driving sources of various types of apparatuses and products. For example, the motors are used as power assist sources for business machines, such as printers and copying machines, various kinds of home electric appliances, and vehicles, such as automobiles and power-assisted bicycles. In particular, brushless motors are sometimes used as the driving sources of movable parts with high operation frequency in the light of increased durability and reduced noise.

In a high-output brushless motor, the maximum torque required is large and therefore the induced voltage tends to be large. As a result, the motor rotating speed tends to be insufficient in a low-torque region. In the light of this, for example, the induced voltage needs to be made smaller for the purpose of increasing the motor rotating speed in the low-torque region. In order to enlarge the output range of the high-output brushless motor, the phase of the brushless motor needs to be controlled and it is vital that the position of a rotor be detected. In other words, in the brushless motor, the rotation position of the rotor needs to be detected by using a certain method and then the phase of the current flowing in a coil needs to be controlled.

To achieve this, proposed is a brushless DC (direct-current) motor comprised of a plurality of Hall elements for detecting the rotation position of a magnet rotor and a drive control circuit for supplying the drive current to an exciting coil based on the output timing with which a detection signal is outputted from the Hall elements (see Patent Document 1).

RELATED ART DOCUMENT

[Patent Document 1] Japanese Utility Patent Application Publication No. Hei02-146996.

In consideration of a case where a delay in the phase control occurs when the rotor rotates at high speed, the aforementioned brushless DC motor includes a set of (three) Hall elements suitable for a high-speed measurement in addition to a set of (three) Hall elements suitable for a low-speed measurement. When the magnet rotor rotates at speed exceeding a certain rotating speed, the drive control circuit is operated by switching the low-speed measuring Hall elements to the high-speed measuring Hall elements. This requires the two different sets of Hall elements, thereby leading to an increased number of components required and an increase in the space required therefor.

SUMMARY OF THE INVENTION

The present invention has been made in view of the foregoing circumstances, and a purpose thereof is to provide a technology for realizing a phase control, for enlarging the output range, with a simple configuration.

In order to resolve the foregoing problems, a phase control circuit, for a brushless motor, according to one embodiment of the present invention includes: a signal output unit that outputs M signals, whose phases differ from each other, in response to a change in a magnetic field resulting from a rotation of a magnet placed in a rotor; a control signal generator that generates two or more different kinds of group of phase control signals, based on at least the M signals, wherein the group of phase control signals is used to control drive voltages, whose phases differ from each other, which are supplied to each phase of an N-phase coil (N being an integer greater than or equal to two); and a drive unit that supplies the drive voltages to each phase of the N-phase coil, based on the group of phase control signals. The control signal generator is configured such that a first phase control signal group and a second phase control signal group are generated. Here, the first phase control signal group controls drive voltages, which are supplied to each phase of the N-phase coil, in a first drive mode of the brushless motor, and the second phase control signal group, whose phase differs from that of the first phase control signal group by a predetermined phase of α degrees (α>0), controls drive voltages, which are supplied to each phase of the N-phase coil, in a second drive mode of the brushless motor.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4A shows a relationship between an output of each Hall element in FIG. 3C and a rotation angle of a rotor;

FIG. 4B shows a relationship between a voltage applied to each phase in FIG. 3B and a rotation angle of the rotor;

FIG. 8 is a table showing a relationship between an output of each comparator and a rotation angle of a rotor;

FIG. 10 is a table showing a relationship between an output of each comparator and a rotation angle of a rotor;

FIG. 12A is a table showing a relationship between a voltage applied to each phase and a rotation angle of a rotor, during a neutral point drive;

FIG. 12B is a table showing a relationship between a voltage applied to each phase and a rotation angle of a rotor, during a lead-angle drive;

FIG. 20 is an exploded perspective view of a rotor according to a first embodiment;

DETAILED DESCRIPTION OF THE INVENTION

Figure 1:
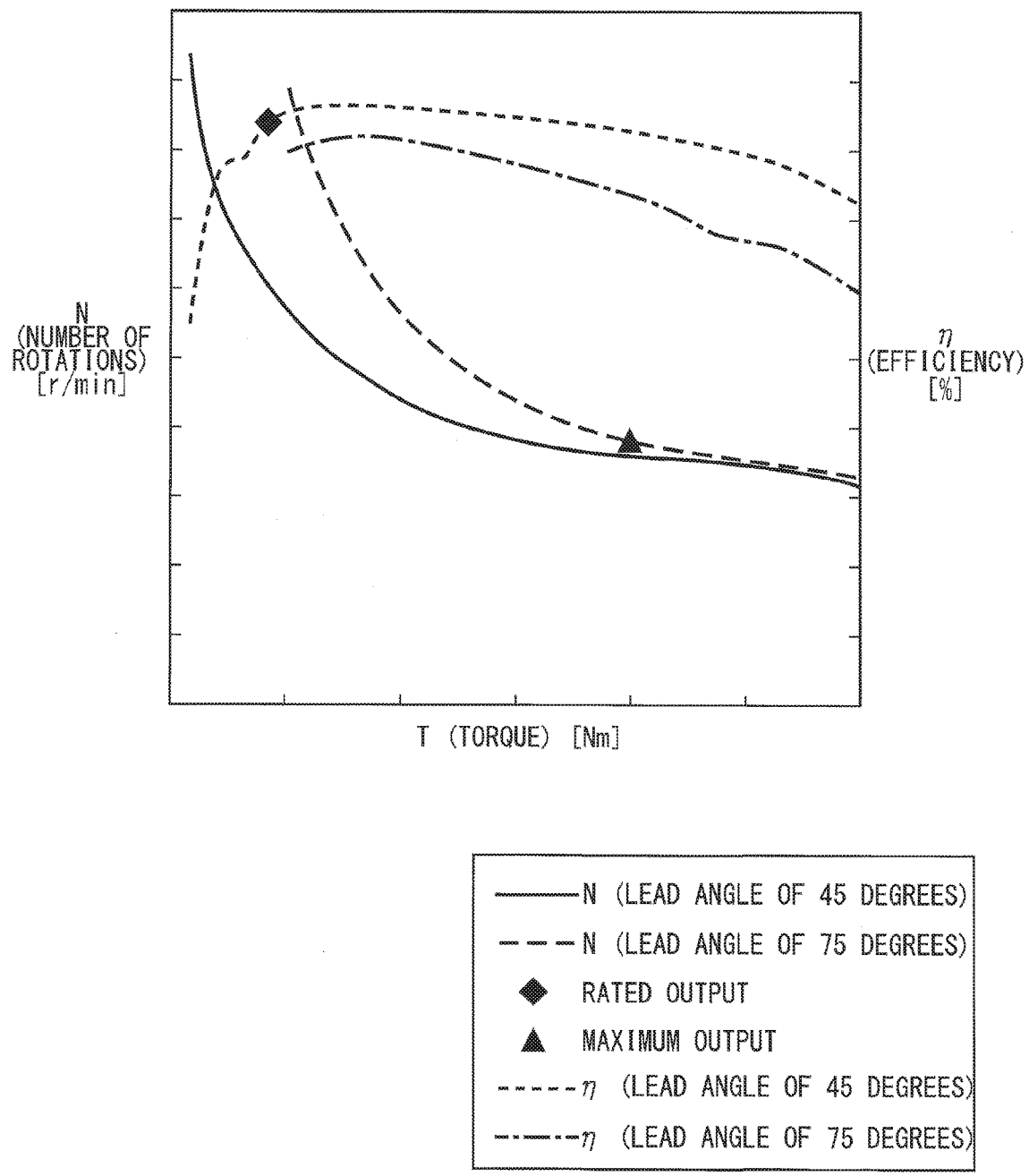
FIG. 1 is a graph showing the characteristics of an exemplary high-output motor.

The invention will now be described by reference to the preferred embodiments. This does not intend to limit the scope of the present invention, but to exemplify the invention.

A phase control circuit, for a brushless motor, according to one embodiment of the present invention includes: a signal output unit that outputs M signals, whose phases differ from each other, in response to a change in a magnetic field resulting from a rotation of a magnet placed in a rotor; a control signal generator that generates two or more different kinds of group of phase control signals, based on at least the M signals, wherein the group of phase control signals is used to control drive voltages, whose phases differ from each other, which are supplied to each phase of an N-phase coil (N being an integer greater than or equal to two); and a drive unit that supplies the drive voltages to each phase of the N-phase coil, based on the group of phase control signals. The control signal generator is configured such that a first phase control signal group and a second phase control signal group are generated. Here, the first phase control signal group controls drive voltages, which are supplied to each phase of the N-phase coil, in a first drive mode of the brushless motor, and the second phase control signal group, whose phase differs from that of the first phase control signal group by a predetermined phase of $\alpha$ degrees ($\alpha$>0), controls drive voltages, which are supplied to each phase of the N-phase coil, in a second drive mode of the brushless motor.

By employing this embodiment, a plurality of phase control signal groups can be generated based on M signals. This eliminates the need of providing different signal output units corresponding respectively to the plurality of phase control signal groups. In other words, it is no longer necessary to provide the corresponding signal output unit for every drive mode of the brushless motor.

The signal output unit may have P Hall elements where P equals M/2, and the Hall elements may be configured such that a first waveform, which varies in response to a change in the magnetic field, and a second waveform, which has an inverted polarity of the first waveform, are outputted separately. Thereby, the signal output unit can output waveforms the number of which is larger than the number of Hall elements, so that the number of Hall elements can be reduced.

The control signal generator may generate three phase control signals, whose phases mutually differ from each other by 120 degrees in an electric angle, which are supplied to each phase of a three-phase coil. The signal output unit may have three Hall elements.

The control signal generator may include: a comparator circuit that compares a plurality of signals outputted from the signal output unit against a predetermined threshold value and generates a plurality of comparison outputs, having a predetermined pulse width, whose phases mutually differ from each other; and a generation circuit that generates a first phase control signal group, based on one of rising timing and falling timing of pulses of the comparison outputs, and generates a second phase control signal group, based on the other thereof. Thereby, two different kinds of phase control signal groups can be generated from the same comparison output.

The control signal generator may include: a comparator circuit that compares a plurality of signals outputted from the signal output unit against a predetermined threshold value and generates a plurality of comparison outputs, having a predetermined pulse width, whose mutually differ from each other; a generation circuit that generates the first phase control signal group, based on one of rising timing and falling timing of pulses of the comparison outputs; and a delay circuit that generates the second phase control signal group whose phase lags that of the first phase control signal group by a predetermined phase of $\alpha$ degrees ($\alpha$>0). Thereby, two different kinds of phase control signal groups can be generated from the same comparison output.

The predetermined phase of $\alpha$ degrees may lie in the range of 0<$\alpha$<240 (excluding $\alpha$=60, 120 and 180) in an electric angle, and the pulse width may lie in the range of 60<60+$\alpha$<300 (excluding $\alpha$=60, 120 and 180) in the electric angle. This enables the detection of positions of the rotor required to drive the brushless motor.

The waveform of a signal outputted from the signal output unit may be such that the electric angle starting from the rising timing of the waveform till the reach of the threshold value is 40 degrees or below or preferably 30 degrees or below. This improves the accuracy with which the positions of the rotor are detected.

The control signal generator may have a mode information acquiring unit, which acquires a selection signal indicating that either the first drive mode or the second drive mode is selected as a drive mode of the brushless motor, and may output a phase control signal corresponding to the selected drive mode. This allows the brushless motor to be driven in a plurality of drive modes.

The signal output unit may have P Hall elements where P equals M/2, and the Hall elements may be configured such that a first waveform, which varies in response to a change in the magnetic field, and a second waveform, which differs from the first waveform, are outputted separately.

The signal output unit may have P Hall elements (P=M/2) and an inverting circuit, the Hall elements may be configured such that a first waveform, which varies in response to a change in the magnetic field, is outputted, and the inverting circuit may be configured such that a second waveform is outputted by inverting an output based on the first waveform. Thereby, the signal output unit can output waveforms the number of which is larger than the number of Hall elements, so that the number of Hall elements can be reduced even though the Hall element has a single output.

The control signal generator may include: a first comparator circuit that compares a plurality of signals outputted from the signal output unit against a first threshold value and generates a plurality of first comparison outputs, having a predetermined pulse width, whose phases mutually differ from each other; a second comparator circuit that compares a plurality of signals outputted from the signal output unit against a second threshold value, which differs from the first threshold value, and generates a plurality of second comparison outputs, having a predetermined pulse width, whose phases mutually differ from each other; and a generation circuit that generates the first phase control signal group, based on the first comparison output and generates the second phase control signal group, based on the second comparison output. Thereby, two different kinds of phase control signal groups can be generated from the same comparison output.

Another embodiment of the present invention relates to a brushless motor. The brushless motor includes: a cylindrical stator where a plurality of windings are placed; a circular rotor core provided in a central part of the stator; a plurality of plate-shaped magnets placed in a rotor; a phase control circuit; and a power feed section for supplying power to the plurality of windings in the stator.

The plurality of plate-shaped magnets may be placed at intervals in a circumference direction of the rotor core, and each of the plurality of plate-shaped magnets may have a protrusion protruding from an end face of the rotor core in a direction of a rotating shaft, and each Hall element in the signal output unit may be placed inward of the protrusion and is so placed as to face the protrusion.

Still another embodiment of the present invention relates to a method for controlling phases of a brushless motor. The method includes: outputting M signals, whose phases differ from each other, in response to a change in a magnetic field resulting from a rotation of a magnet placed in a rotor; generating two or more different kinds of group of phase control signals, based on at least the M signals, wherein the group of phase control signals is used to control drive voltages, whose phases differ from each other, which are supplied to each phase of an N-phase coil (N being an integer greater than or equal to two); and supplying the drive voltages to each phase of the N-phase coil, based on the group of phase control signals. The generating the phase control signals selectively generates a first phase control signal group, which controls the drive voltages supplied to each phase of the N-phase coil in a first drive mode of the brushless motor, and a second phase control signal group, whose phase differs from that of the first phase control signal group by a predetermined phase of α degrees (α>0), which controls the drive voltages supplied to each phase of the N-phase coil in a second drive mode of the brushless motor.

By employing this embodiment, a plurality of phase control signal groups can be generated based on M signals. This therefore eliminates the need of providing different signal output units corresponding respectively to the plurality of phase control signal groups. In other words, it is no longer necessary to provide the corresponding signal output unit for every drive mode of the brushless motor.

Optional combinations of the aforementioned constituting elements, and implementations of the invention in the form of methods, apparatuses, systems, and so forth may also be practiced as additional modes of the present invention.

The embodiments of the present invention will be hereinbelow described with reference to drawings. Note that in all of the Figures the same components are given the same reference numerals and the repeated description thereof is omitted as appropriate. The structures and configurations described hereinbelow are only exemplary and does not limit the scope of the present invention.

A description is first given of a background of the present invention as to how the inventor of the present invention has come to recognize the present invention. In a high-output electric motor used for a power-assisted bicycle or the like, the maximum torque required therefor is large and therefore the induced voltage tends to be large. As a result, the motor rotating speed tends to be insufficient in a low-torque region.

FIG. 1 is a graph showing the characteristics of an exemplary high-output motor. FIG. 1 shows a relation between an efficiency η, the number N of rotations, and a torque T at a lead angle of 45 degrees where the efficiency is high and a relation between an efficiency η, the number N of rotations, and a torque T at a lead angle of 75 degrees when the phase is further advanced by 30 degrees.

In the high-output motor shown in FIG. 1, the number N of rotations in a low-torque region is small in the setting of a lead angle of 45 degrees whose efficiency is high. Since the rated output is proportional to the number N of rotations and the torque T, the rated output will be insufficient in the setting of a lead angle of 45 degrees. For this reason, the high-output motor is set to a lead angle of 75 degrees, for example. Then the number N of rotations in a low-torque region increases although, as shown in FIG. 1, the maximum efficiency η is lowered as a whole than when it is set to a lead angle of 45 degrees. That is, the rated output increases.

In this manner, the rated output in the low-torque region can be ensured while the maximum output required is being met, as long as a single high-output motor can be controlled using two kinds of phases. Hence, the output range in the practical level can be enlarged. However, in order to control the motor by switching a plurality of phases, the information on the rotation position of the motor needs to be known. Such information thereon can be obtained with accuracy if an encoder or resolver is used. If such an instrument is used, the cost of an apparatus as a whole increases. In the light of this, the inventor of the present invention has come to arrive at the present invention through diligent investigation to obtain the information, on the rotation position of the rotor, which is required to achieve the phase control by using a simple configuration.

First Embodiment

Figure 2:
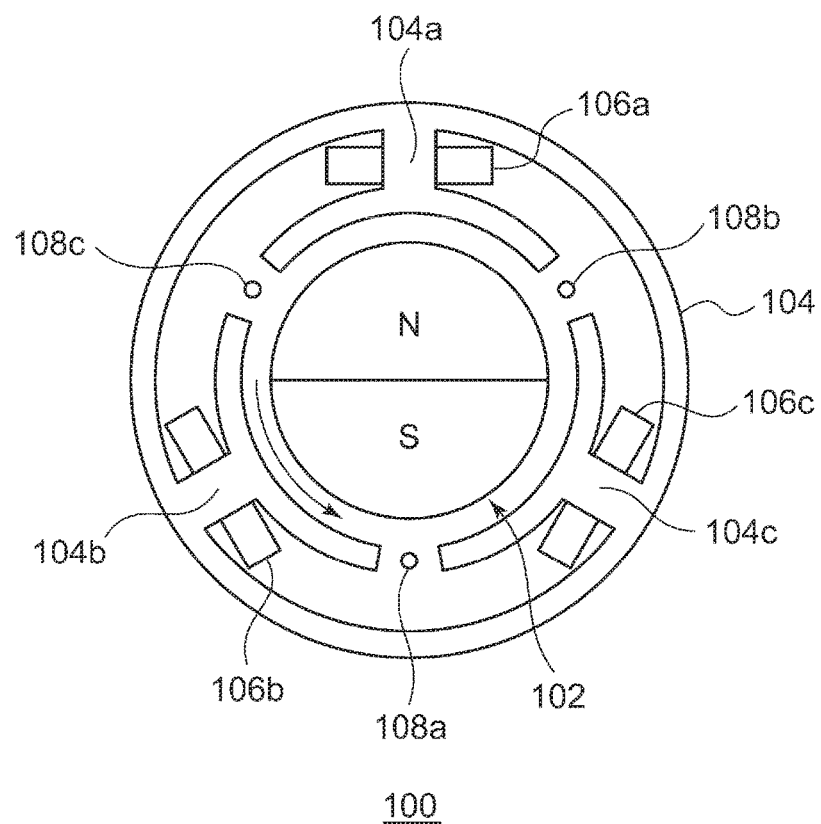
FIG. 2 is a schematic diagram for explaining a three-phase brushless motor having two poles and three slots.

In a first embodiment, a description is given of an example where a 120-degree rectangular-wave drive is used, as a method for driving a brushless motor. For simplicity of explanation, a three-phase brushless motor having two poles and three slots is first explained as an example. FIG. 2 is a schematic diagram for explaining a three-phase brushless motor having two poles and three slots.

A brushless motor 100 is comprised of a rotor 102 formed of two poles and a stator 104 having three arms 104a, 104b and 104c. A U-phase winding 106a, a V-phase winding 106b, and a W-phase winding 106c are wound around the three arms 104a, 104b and 104c, respectively. A first Hall element (Hall element U) 108a, a second Hall element (Hall element V) 108b, and a third Hall element (Hall element W) 108c are arranged in positions opposite to the three arms 104a, 104b and 104c, respectively. Each Hall element converts magnetic flux into voltage.

Figure 3A:
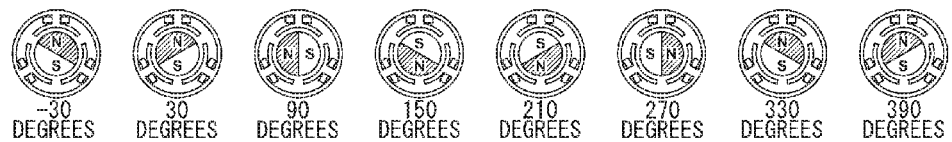
FIG. 3A are schematic diagrams continuously showing how a rotor of a brushless motor shown in FIG. 2 rotates counterclockwise.
Figure 3B:
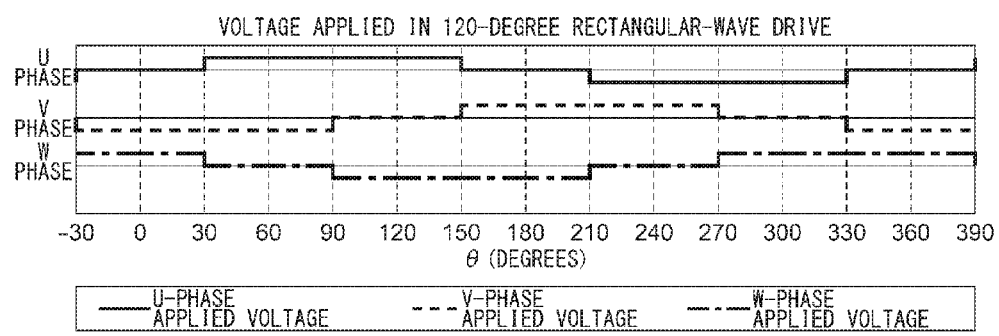
FIG. 3B shows a change of voltage applied to the winding of each phase.
Figure 3C:
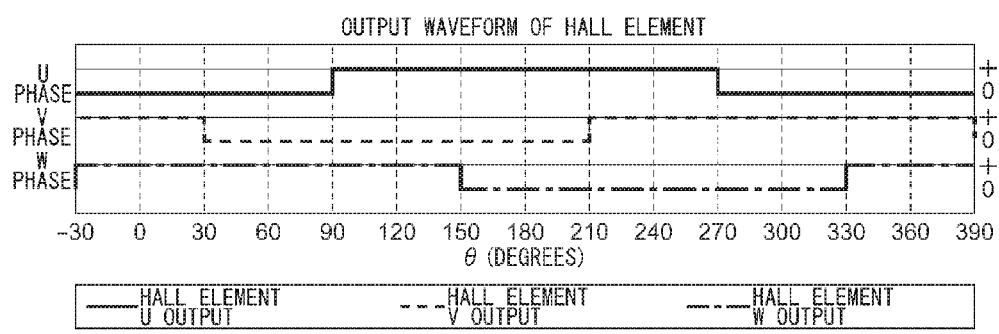
FIG. 3C shows a change of the output of each Hall element.

FIG. 3A are schematic diagrams continuously showing how the rotor of the brushless motor shown in FIG. 2 rotates counterclockwise. FIG. 3B shows a change of voltage applied to the winding of each phase. FIG. 3C shows a change of the output of each Hall element. Note that the angle of the rotor is 0 degree (360 degrees) when the rotor is in the position shown in FIG. 2. Note also that the mechanical angle and the electric angle are identical to each other if the motor has two poles.

The 120-degree rectangular-wave drive is a driving method defined as follows. That is, a constant voltage is applied to the U phase in a range of 30 to 150 degrees (210 to 330 degrees). A constant voltage is applied to the V phase in a range of 150 to 270 degrees (330 to 90 degrees). A constant voltage is applied to the W phase in a range of 270 to 30 degrees (90 to 210 degrees). In this case, as shown in FIG. 3B, the voltage applied to each phase remains unchanged and the rotor is driven by the identical voltage in the following six ranges (intervals) (1) to (6).

(1) −30 to 30 degrees (330 to 390 degrees)
(2) 30 to 90 degrees
(3) 90 to 150 degrees
(4) 150 to 210 degrees
(5) 210 to 270 degrees
(6) 270 to 330 degrees Thus, the 120-degree rectangular-wave drive can be performed if the information on the six positions at intervals of 60 degrees can be obtained.

In FIG. 3C, for simplicity of explanation, the output of each Hall element is positive (+) when each Hall element faces a north pole (N-pole), and the output thereof is zero (0) when each Hall element faces a south pole (S-pole). In this manner, FIG. 3C shows a change of the output of each Hall element. In this case, as shown in FIG. 3C, the waveform outputted from each Hall element remains unchanged in the following six ranges (1) to (6).
(1) −30 to 30 degrees (330 to 390 degrees)
(2) 30 to 90 degrees
(3) 90 to 150 degrees
(4) 150 to 210 degrees
(5) 210 to 270 degrees
(6) 270 to 330 degrees FIG. 4A shows a relationship between the output of each Hall element in FIG. 3C and the rotation angle of the rotor. FIG. 4B shows a relationship between the voltage applied to each phase in FIG. 3B and the rotation angle of the rotor.

As shown in FIG. 4A, the combination of outputs of each Hall element differs in the six intervals. Thus, in which interval the rotor is presently located can be determined from the outputs of three Hall elements. Then, voltages as shown in FIG. 4B are applied in synchronism with the timing and thereby the 120-degree rectangular-wave drive is made possible.

Figure 5:
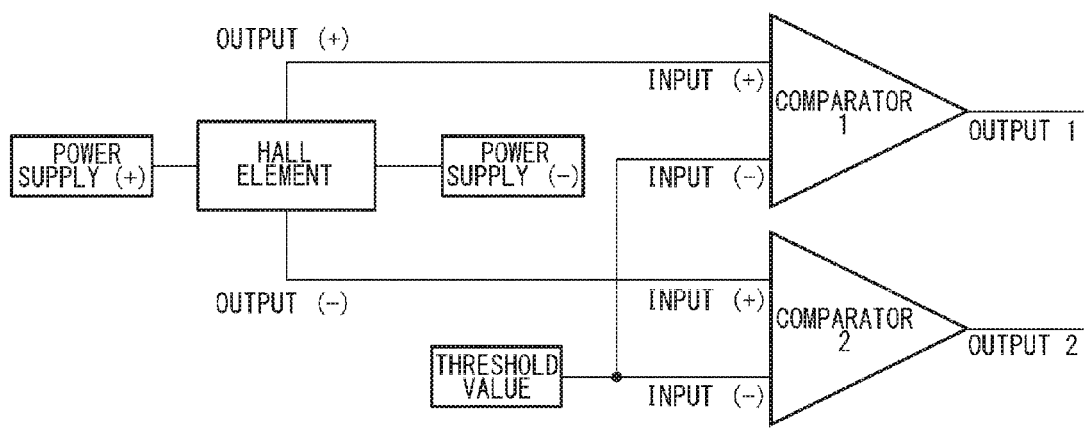
FIG. 5 is a block diagram showing an exemplary circuit for generating a rectangular wave based on an output of a Hall element.
Figure 6:
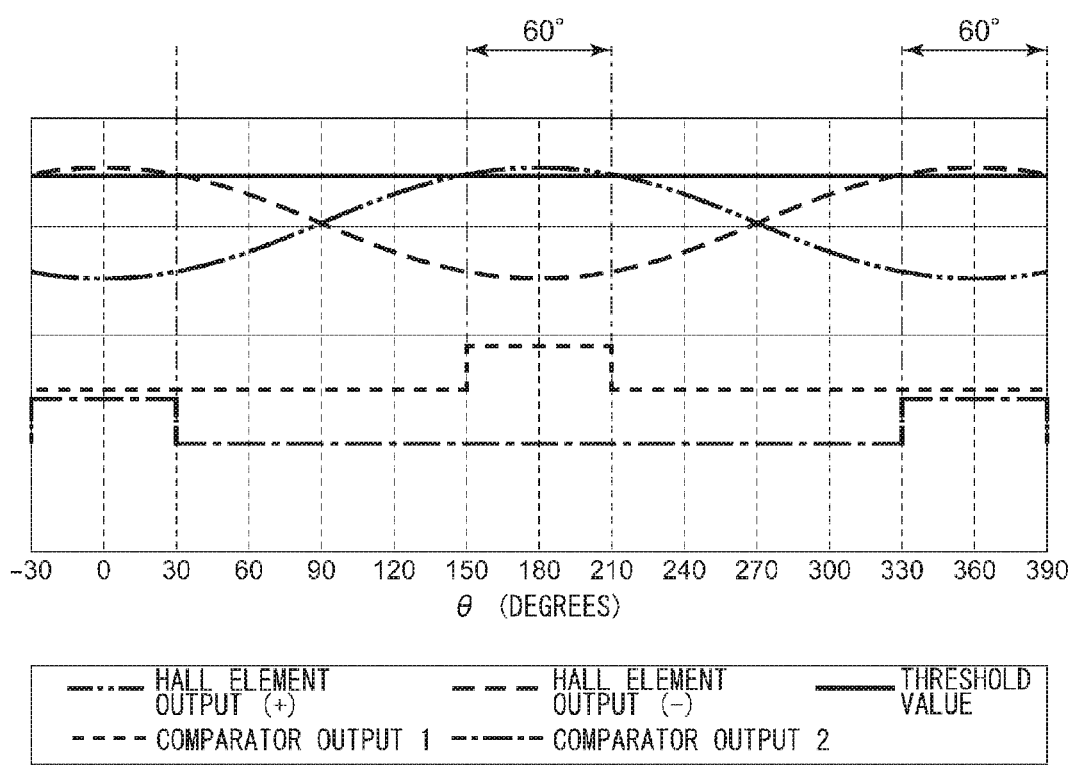
FIG. 6 shows changes of two signal waveforms outputted from a Hall element and changes of two comparator output signal waveforms.

A description is now given of output waveforms of the Hall elements. FIG. 5 is a block diagram showing an exemplary circuit for generating a rectangular wave based on the output of a Hall element. FIG. 6 shows changes of two signal waveforms outputted from the Hall element and changes of two comparator output signal waveforms. It is assumed in FIG. 6 that, for simplification of explanation, a change in magnetic flux is expressed by a sinusoidal wave. A value where the polarity has been inverted for an output (+) is obtained from an output (−) in the Hall element shown in FIG. 5.

An output (+) of the Hall element is inputted to an input (+) of a comparator 1 shown in FIG. 5, and a threshold value is inputted to an input (−) thereof. If the value of the input (+) is greater than that of the input (−), the value of the input (+) will be outputted from the comparator 1. If, on the other hand, the value of the input (+) is less than that of the input (−), the value of the input (−) will be outputted therefrom. An output (−) of the Hall element is inputted to an input (+) of a comparator 2, and a threshold value is inputted to an input (−) thereof. If the value of the input (+) is greater than that of the input (−), the value of the input (+) will be outputted from the comparator 2. If, on the other hand, the value of the input (+) is less than that of the input (−), the value of the input (−) will be outputted therefrom.

In the circuit like this, the threshold value is set such that, as shown in FIG. 6, an interval (range), in which the value of the output (+) or output (−) of the Hall element is greater than the threshold value, is equal to 60 degrees in the electric angle. In this case, as shown in FIG. 6, an output 1 of the comparator 1 outputs positive (+) values in a first range of 150 to 210 degrees and outputs negative (−) values in a range other than the first range. Also, an output 2 of the comparator 2 outputs positive (+) values in a second range of 330 to 390 degrees (−30 to 30 degrees) and outputs negative (−) values in a range other than the second range.

Figure 7:
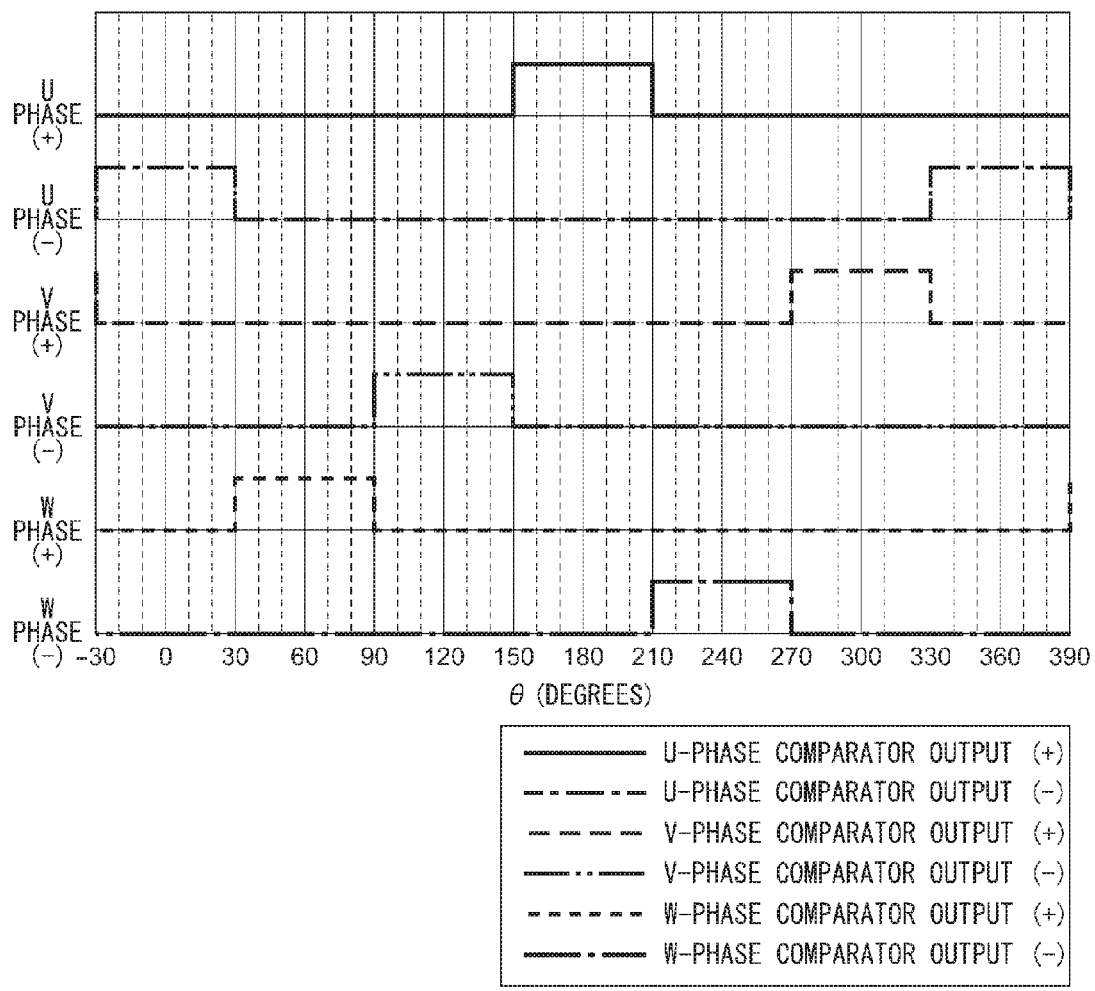
FIG. 7 shows a change of output of each comparator when a circuit including a Hall element shown in FIG. 5 is each provided at U phase, V phase and W phase.

FIG. 7 shows a change of output of each comparator when a circuit including the Hall element shown in FIG. 5 is each provided at the U phase, V phase and W phase. FIG. 8 is a table showing a relationship between an output of each comparator and a rotation angle of the rotor.

As shown in FIG. 7 and FIG. 8, in which 60-degree interval the rotation position of the rotor is being presently located can be determined if the output of a positive (+) value can be determined to be an output (+) or output (−) of which particular comparator. Thus, use of three sets of circuits including the Hall elements as shown in FIG. 5 enables the applied voltage to be controlled at intervals of 60 degrees, so that the above-described 120-degree rectangular-wave drive can be performed.

However, such a circuit cannot make a distinction between a neutral point drive and a lead-angle drive of the brushless motor and use separately one from the other by the phase control. As shown in FIG. 7 and FIG. 8, it is possible to perform the neutral point drive where the drive voltage is varied based on the timing at intervals of 60 degrees between 30, 90, 150, 210, 270 and 330 degrees; if, however, the brushless motor is to be driven at a lead angle of 20 degrees for example, each timing of 10, 70, 130, 190, 250 and 310 degrees need be detected. It is, however, evident from the output of each comparator shown in FIG. 7 that the output of each comparator remains the same at 10, 70, 130, 190, 250 and 310 degrees.

In the light of this, a description is now given of a case where the threshold value in the circuit shown in FIG. 5 is set such that an interval (range), in which the value of the output (+) or output (−) of the Hall element is greater than the threshold value, is equal to [60+α] degrees in the electric angle, specifically 60 plus 20 degrees. For example, lowering the threshold value shown in FIG. 6 allows the interval, in which the output of the Hall element is greater than the threshold value, to be enlarged.

Figure 9:
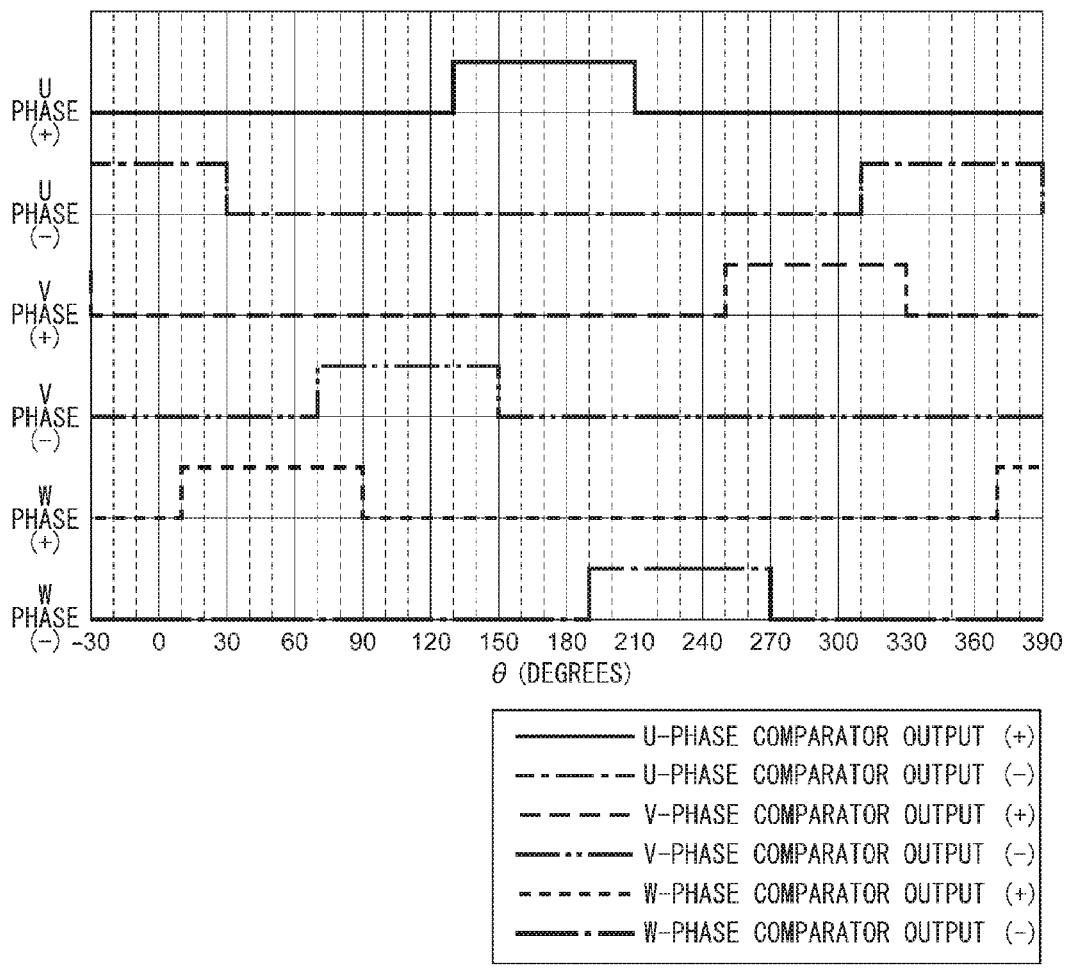
FIG. 9 shows a change of output of each comparator when an interval, in which an output of a Hall element is greater than a threshold value, is equal to [60+20] degrees in an electric angle.

FIG. 9 shows a change of output of each comparator when an interval (range), in which the output of a Hall element is greater than a threshold value, is equal to [60+20] degrees in the electric angle. FIG. 10 is a table showing a relationship between an output of each comparator and a rotation angle of the rotor. In this case, as shown in FIG. 10, the combination of signals outputted from each comparator differs in each of the following twelve ranges (intervals).
(1) −30 to 10 degrees (330 to 370 degrees)
(2) 10 to 30 degrees (370 to 390 degrees)
(3) 30 to 70 degrees
(4) 70 to 90 degrees
(5) 90 to 130 degrees
(6) 130 to 150 degrees
(7) 150 to 190 degrees
(8) 190 to 210 degrees
(9) 210 to 250 degrees
(10) 250 to 270 degrees
(11) 270 to 310 degrees
(12) 310 to 330 degrees Also, the outputs of comparators are such that only one of the outputs thereof is a positive (+) value in each of the ranges (1), (3), (5), (7), (9) and (11) indicating the information on positions at intervals of 40 degrees. The outputs of comparators are such that only two of the outputs thereof are positive (+) values in each of the ranges (2), (4), (6), (8), (10) and (12) indicating the information on positions at intervals of 20 degrees. In this manner, the interval (range), in which the output of the Hall element is greater than the threshold value, is set equal to [60+α] degrees. Hence, the rotation position of the rotor can be detected with twelve different timings.

This configuration and arrangement can achieve the neutral point drive, where the drive voltage is varied based on the timing at intervals of 60 degrees between 30, 90, 150, 210, 270 and 330 degrees, and the lead-angle drive, where the drive voltage is varied based on the timing at intervals of 60 degrees between 10, 70, 130, 190, 250 and 310 degrees.

Figure 11:
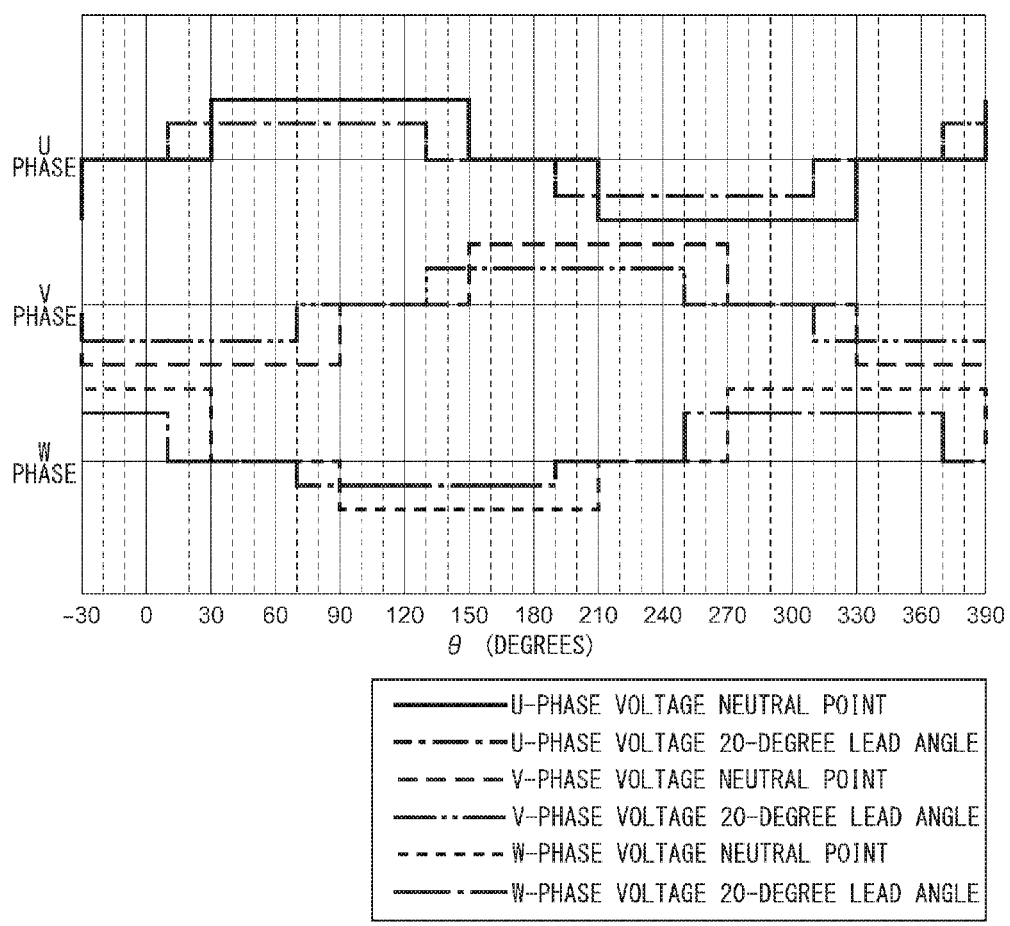
FIG. 11 shows changes of 120-degree rectangular-wave drive voltages in U phase, V phase and W phase during a neutral point drive and a lead-angle drive.

FIG. 11 shows changes of 120-degree rectangular-wave drive voltages in the U phase, V phase and W phase during the neutral point drive and the lead-angle drive. FIG. 12A is a table showing a relationship between a voltage applied to each phase and a rotation angle of the rotor, during the neutral point drive. FIG. 12B is a table showing a relationship between a voltage applied to each phase and a rotation angle of the rotor, during the lead-angle drive. It therefore makes clear that the brushless motor can be controlled using a plurality of phases by regulating the threshold value in the circuit as shown in FIG. 5.

Figure 13:
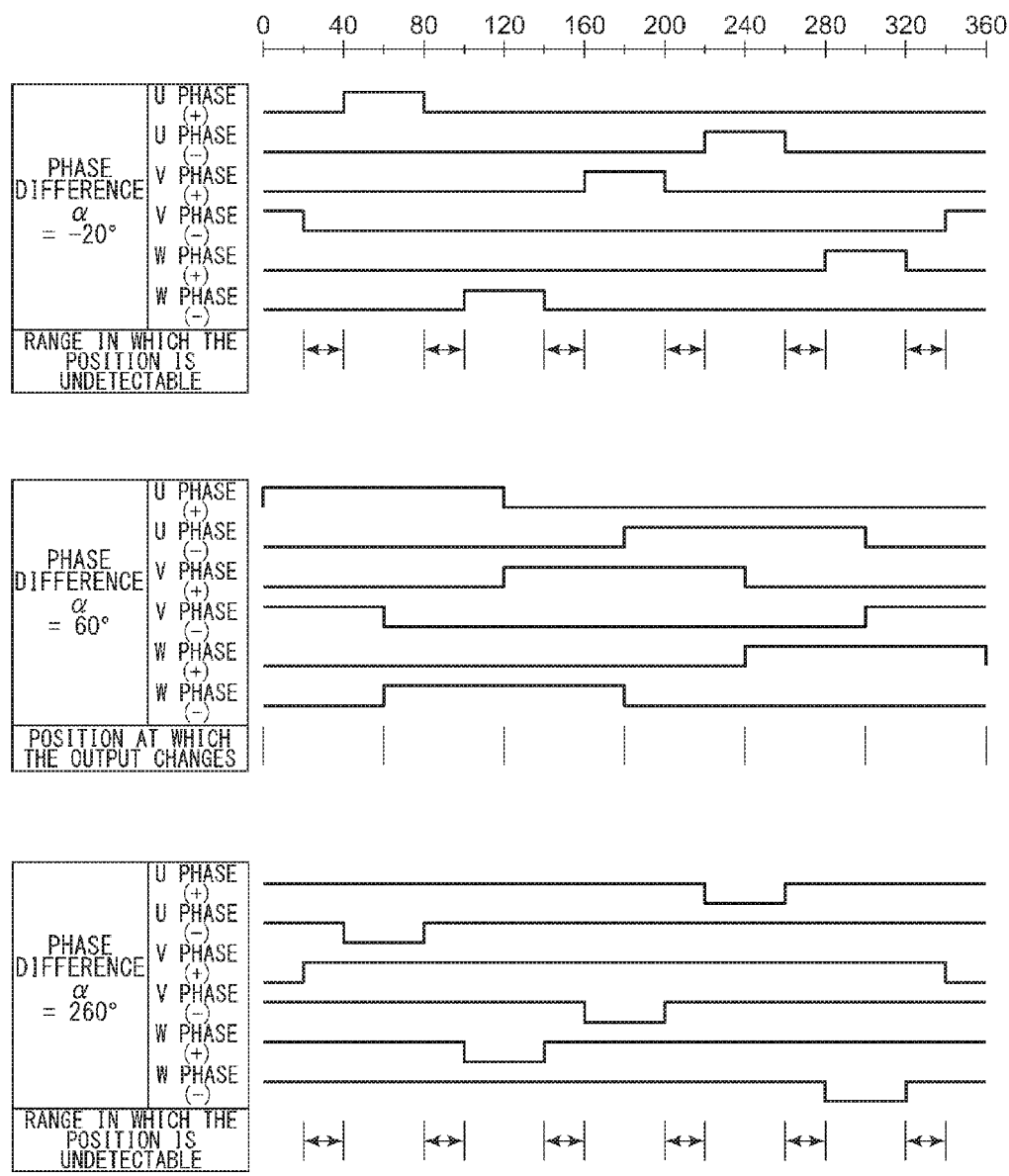
FIG. 13 schematically shows an output of each comparator that changes in response to phase difference α.

Next, it is examined whether or not a plurality of phase controls are feasible even though the interval (range), in which the output of the Hall element is greater than the threshold value, is [60+α] degrees (where α is any of values in the range of −60<α<300). FIG. 13 schematically shows an output of each comparator that changes in response to a phase difference α.

As shown in the above-described FIG. 7, a plurality of phase controls cannot be carried out if α is 0 degree. As shown in FIG. 13, when α is −20 degrees, any of the comparators also indicate negative (−) outputs in the ranges of 20 to 40 degrees, 80 to 100 degrees, 140 to 160 degrees, 200 to 220 degrees, 260 to 280 degrees, and 320 to 340 degrees. Hence, the position of the rotor cannot be detected in these ranges. This indicates similarly that the position of the rotor cannot be detected when −60<α<0.

When α is 60 degrees, the neutral point drive, where the drive voltage is varied based on the timing at intervals of 60 degrees between 0, 60, 120, 180, 240 and 300 degrees, can be performed. Since the rotation position of the rotor cannot be detected with the other timings, the lead-angle drive cannot be performed separately from the neutral point drive. In this regard, the same is true when α is 120, 180 and 240 degrees.

When α is greater than 240 degrees, any of the comparators also indicate positive (+) outputs in the ranges of 20 to 40 degrees, 80 to 100 degrees, 140 to 160 degrees, 200 to 220 degrees, 260 to 280 degrees, and 320 to 340 degrees, respectively. Hence, the position of the rotor cannot be detected in these ranges. This indicates similarly that the position of the rotor cannot be detected when 240<α<300.

Taking the above facts into consideration, it is verified that a plurality of phase controls can be carried out when 0<α<240 (except when α=60, 120 and 180).

Figure 14:
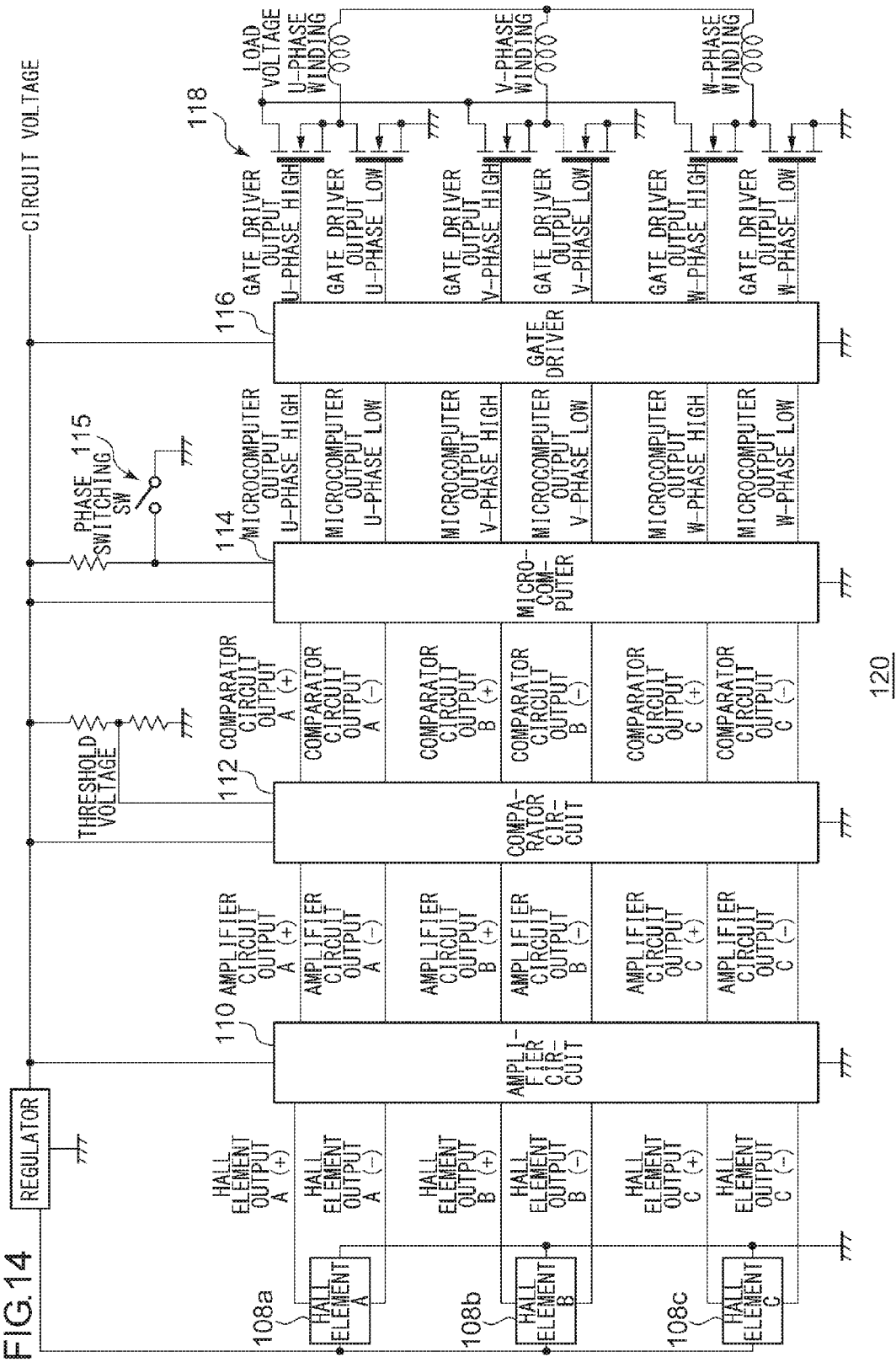
FIG. 14 is a block diagram of a phase control circuit of a brushless motor according to a first embodiment.
Figure 15:
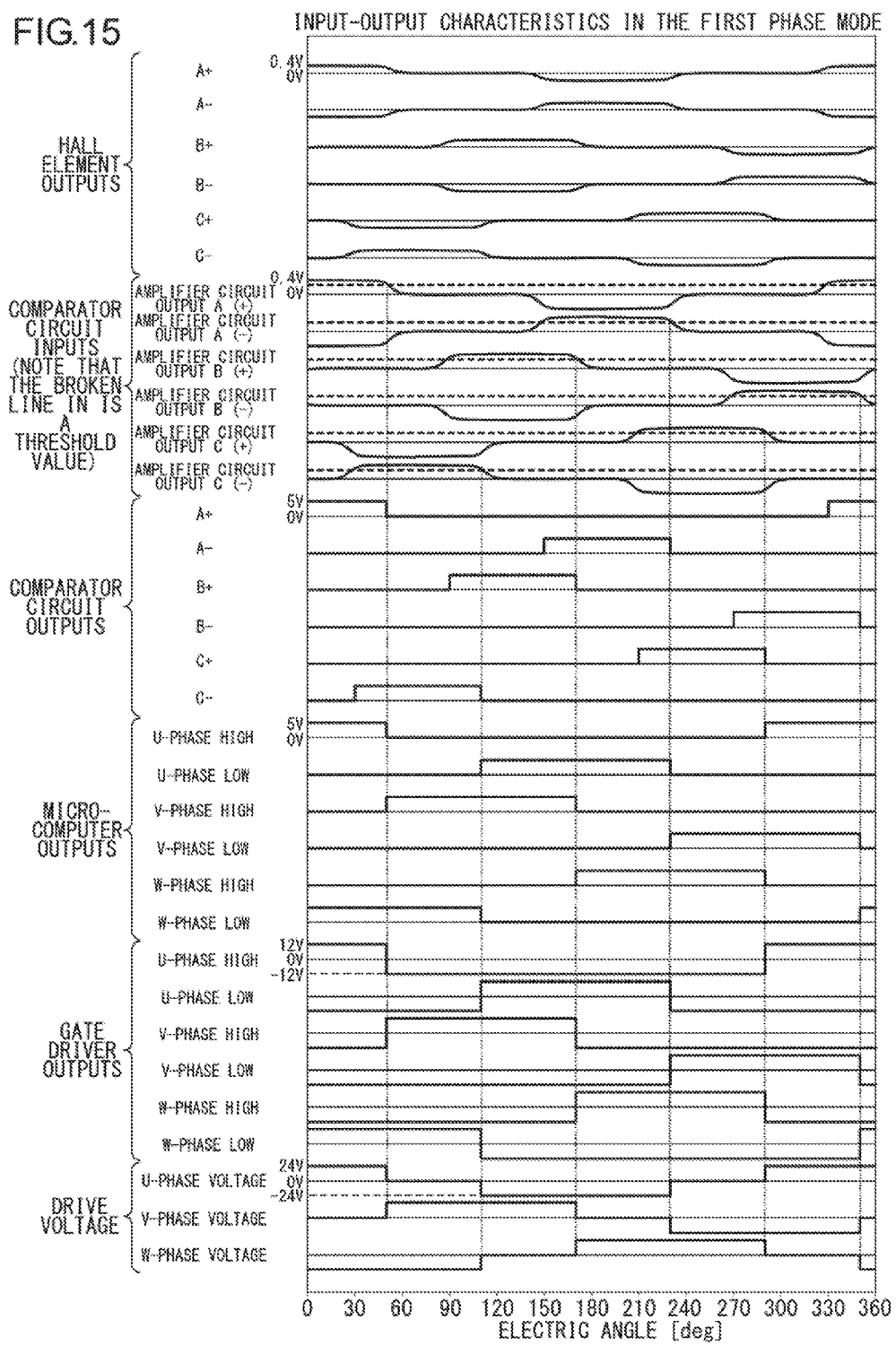
FIG. 15 shows input-output characteristics of each block of a phase control circuit according to a first embodiment, in a first phase mode.
Figure 16:
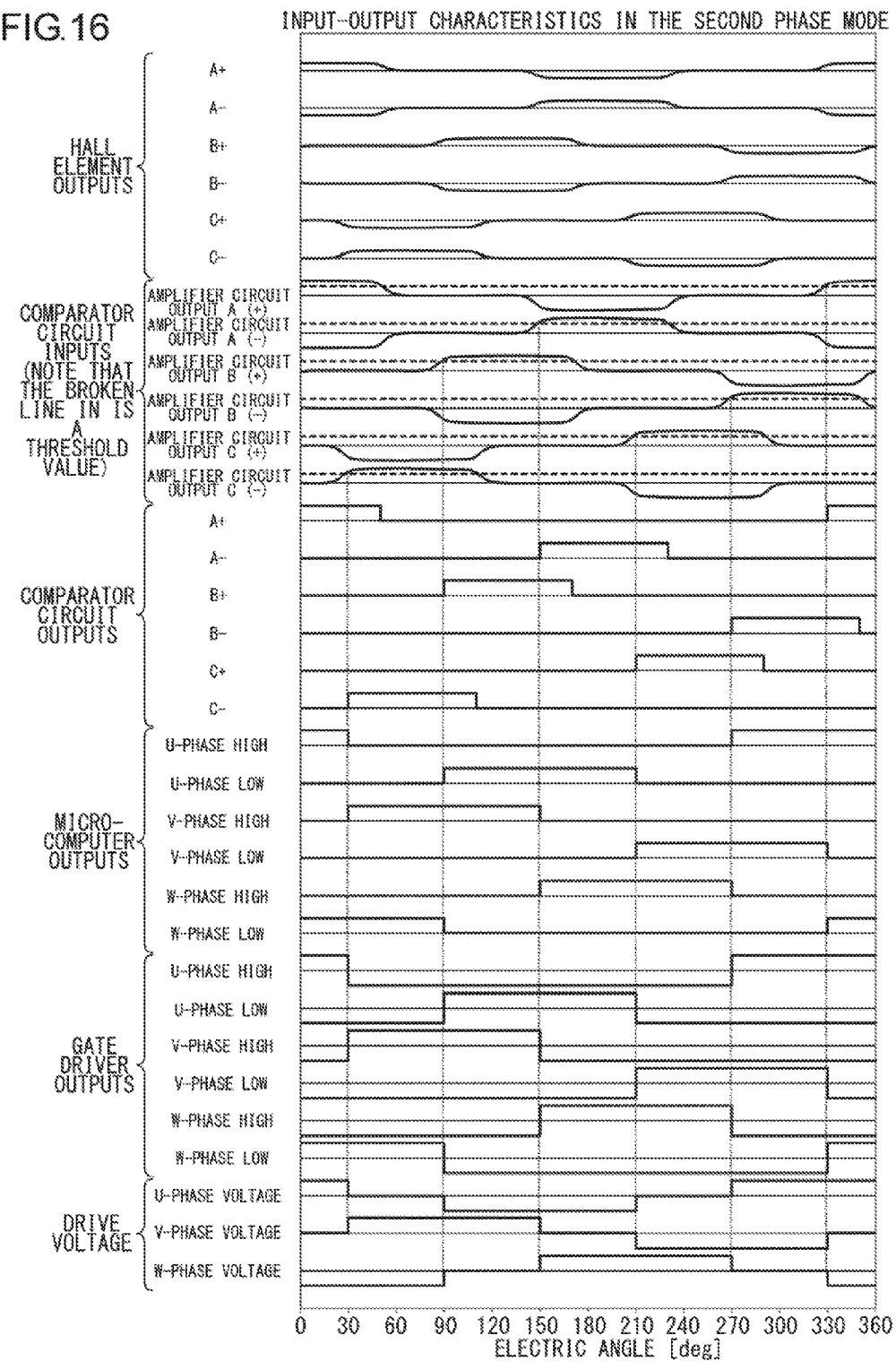
FIG. 16 shows input-output characteristics of each block of a phase control circuit according to a first embodiment, in a second phase mode.

FIG. 14 is a block diagram of a phase control circuit 120 of a brushless motor according to the first embodiment. FIG. 15 shows input-output characteristics of each block of the phase control circuit 120 according to the first embodiment, in a first phase mode. FIG. 16 shows input-output characteristics of each block of the phase control circuit 120 according to the first embodiment, in a second phase mode.

Hall elements A to C shown in FIG. 14 output six voltages whose phases differ from each other, in response to a change in the magnetic field resulting from the rotation of magnets placed in the rotor. As described earlier, each Hall element according to the present embodiment outputs a set of voltages where the polarity of one of the set thereof is the inverted polarity of the other thereof (see the Hall element outputs in FIG. 15). These six Hall element outputs are amplified by an amplifier circuit 110. Since the voltage of each Hall element output is small, the effect of noise can be reduced, by amplification, in the subsequent processing. Also, each Hall element outputs two voltages whose polarities differ from each other. Thus, the noise can be removed by outputting a voltage difference of the two voltages whose polarities differ from each other when the amplifier circuit 110 performs amplification. The amplifier circuit 110 as used herein is an operational amplifier (op-amp), for instance. In the present embodiment, the Hall elements A to C and the amplifier circuit 110 constitute a signal output unit. The Hall element may be constructed such that a first waveform, which varies in response to a change in the magnetic field, and a second waveform, which differs from the first waveform, are outputted separately.

Each amplifier circuit output amplified by the amplifier circuit 110 is inputted to a comparator circuit 112. A threshold voltage is also inputted to the comparator circuit 112. The comparator circuit 112 compares the amplifier circuit outputs against a predetermined threshold value and performs A/D conversion on their comparison results so as to generate a plurality of comparison outputs, having predetermined pulse widths, whose phases differ from each other. Here, the plurality of comparison outputs generated by the comparator circuit 112 may be referred to as "comparator circuit outputs" also. In so doing, "1" is outputted (the comparator circuit output being up to 5 V, for instance) when the threshold value is smaller than the amplifier circuit output; "0" is outputted (the comparator circuit output being 0 V) when the threshold value is larger than the amplifier circuit output. For example, a comparator is used as the comparator circuit 112.

Each comparison output outputted from the comparator circuit 112 is inputted to a microcomputer 114. The microcomputer 114 generates two or more different kinds of group of phase control signals, based on six comparison output signals. Here, the group of phase control signals is used to control the drive voltages, whose phases differ from each other, which are supplied to each phase of a three-phase coil. In the present embodiment, the comparator circuit 112 and the microcomputer 114 constitute a control signal generator.

The comparator circuit 112 and the microcomputer 114 are configured such that a first phase control signal group and a second phase control signal group are generated. The first phase control signal group controls the drive voltages, which are supplied to each phase of the three-phase coil, in a first drive mode (normal or lag-angle mode) of the brushless motor. The first phase control signal group is, for example, a U-phase High signal, a U-phase Low signal, a V-phase High signal, a V-phase Low signal, a W-phase High signal and a W-phase Low signal in a first phase mode shown in FIG. 15. The second phase control signal group, whose phase differs from that of the first phase control signal group by a predetermined phase of α degrees (α>0), controls drive voltages, which are supplied to each phase of the three-phase coil, in a second drive mode (lead-angle mode) of the brushless motor. The second phase control signal group is, for example, a U-phase High signal, a U-phase Low signal, a V-phase High signal, a V-phase Low signal, a W-phase High signal and a W-phase Low signal in a second phase mode shown in FIG. 16. In the present embodiment, α is 20 degrees.

The microcomputer 114 receives the input of either one of two external signals having different voltages by switching on or off a phase switching switch 115. The microcomputer 114 selects either the first drive mode or the second drive mode by whether either one of two external signals has been inputted, and a phase control signal group corresponding to the thus selected drive mode is generated.

In this manner, the microcomputer 114 has a mode information acquiring unit, which acquires a selection signal indicating that either the first drive mode or the second drive mode is selected as the drive mode of the brushless motor, and then outputs a phase control signal group corresponding to the selected drive mode. This allows the brushless motor to be driven in a plurality of drive modes.

A microcomputer output, corresponding to each phase, which is outputted from the microcomputer 114 is inputted to a gate driver 116. The gate driver 116 converts the microcomputer output into a voltage at which a MOSFET 118 can be driven. The MOSFET 118 controls a voltage applied to the winding of each phase, based on the output of the gate driver. Here, the gate driver 116 and the MOSFET 118 function as a drive unit that supplies drive voltages to each phase of the three-phase coil based on the phase control signal group.

The phase control circuit 120, according to the present embodiment, configured as above can generate a plurality of (two in FIG. 14) phase control signal groups, based on M signals (M=6 in FIG. 14). This eliminates the need of providing different signal output units corresponding respectively to the plurality of phase control signal groups. In other words, it is no longer necessary to provide the corresponding signal output unit for every drive mode of the brushless motor.

Here, the signal output unit according to the present embodiment has three Hall elements, and each Hall element is configured such that the first waveform, which varies in response to a change in the magnetic field, and a second waveform, which has the inverted polarity of the first waveform, are outputted separately. Thus, the signal output unit can output a number of waveforms (i.e., six waveforms), which is greater than the number of Hall elements used (i.e., three Hall elements), so that the number of Hall elements used can be reduced.

The microcomputer 114 generates the first phase control signal group, based on falling timing of a pulse of the comparison output, and generates the second phase control signal group, based on rising timing thereof. Thereby, two different kinds of phase control signal groups can be generated from the same comparison output. It is appreciated here that the microcomputer 114 may generate the first phase control signal group, based on the rising timing of a pulse of the comparison output, and generate the second phase control signal group, based on the falling timing thereof, instead.

Also, the microcomputer 114 generates three phase control signals (e.g., the U-phase High signal, the V-phase High signal, and the W-phase High signal); these three phase control signals are supplied directly or indirectly to each phase of the three-phase coil after conversion, and the phases of the three phase control signals mutually differ from each other by 120 degrees in the electric angle.

As already explained in FIG. 13, the α degrees, which indicates the phase difference between the aforementioned first phase control signal group and the second phase control signal group, may lie in the range of 0<α<240 (except when α=60, 120 and 180) in the electric angle. And the pulse width may lie in the range of 60<60+α<300 (except when α=60, 120 and 180) in the electric angle. Setting α in this range can detect the position of the rotor required to achieve the phase control capable of operating the brushless motor in a plurality of drive modes.

[Brushless Motor]

Figure 17:
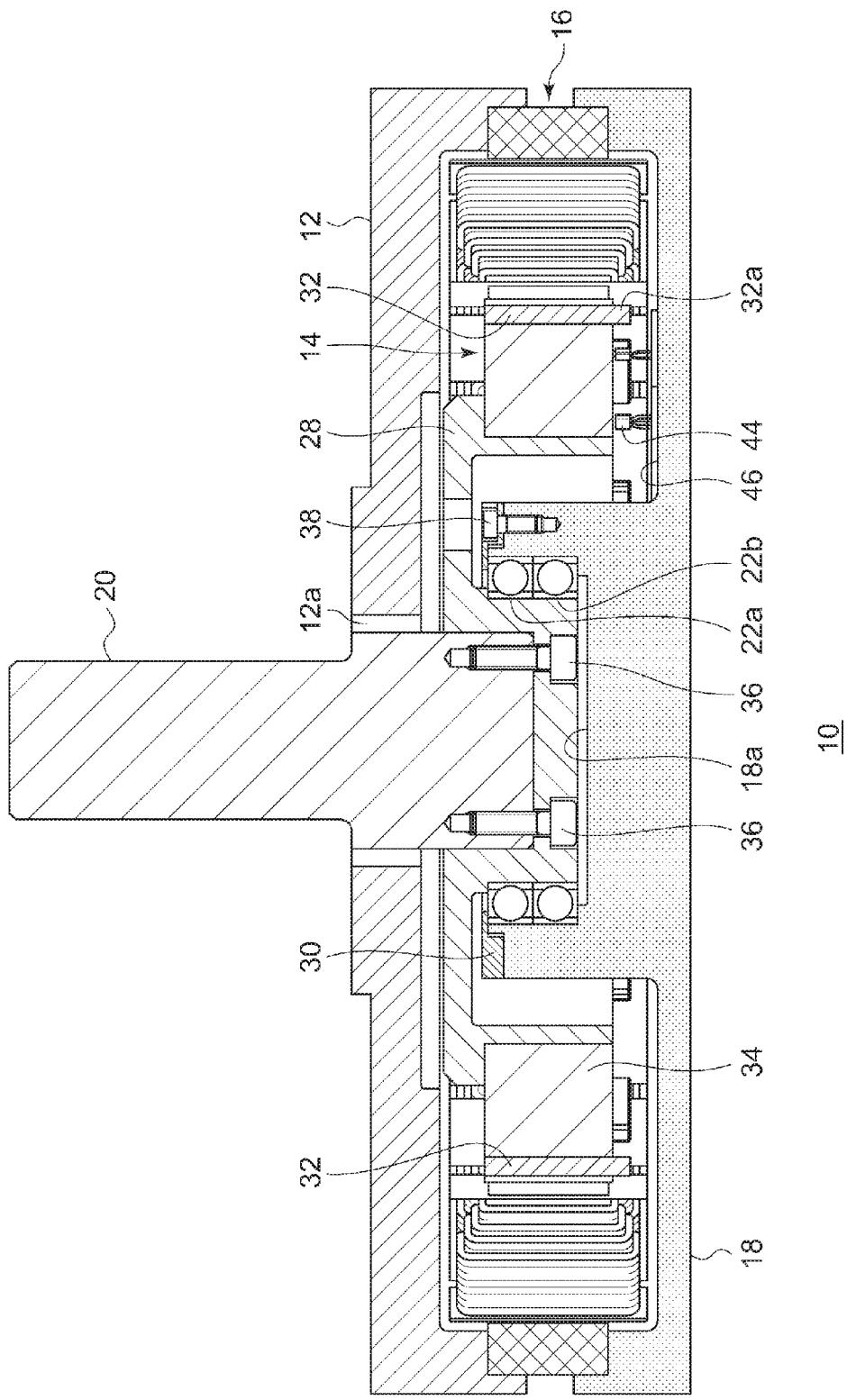
FIG. 17 is a cross-sectional view of a brushless motor according to a first embodiment.
Figure 18:
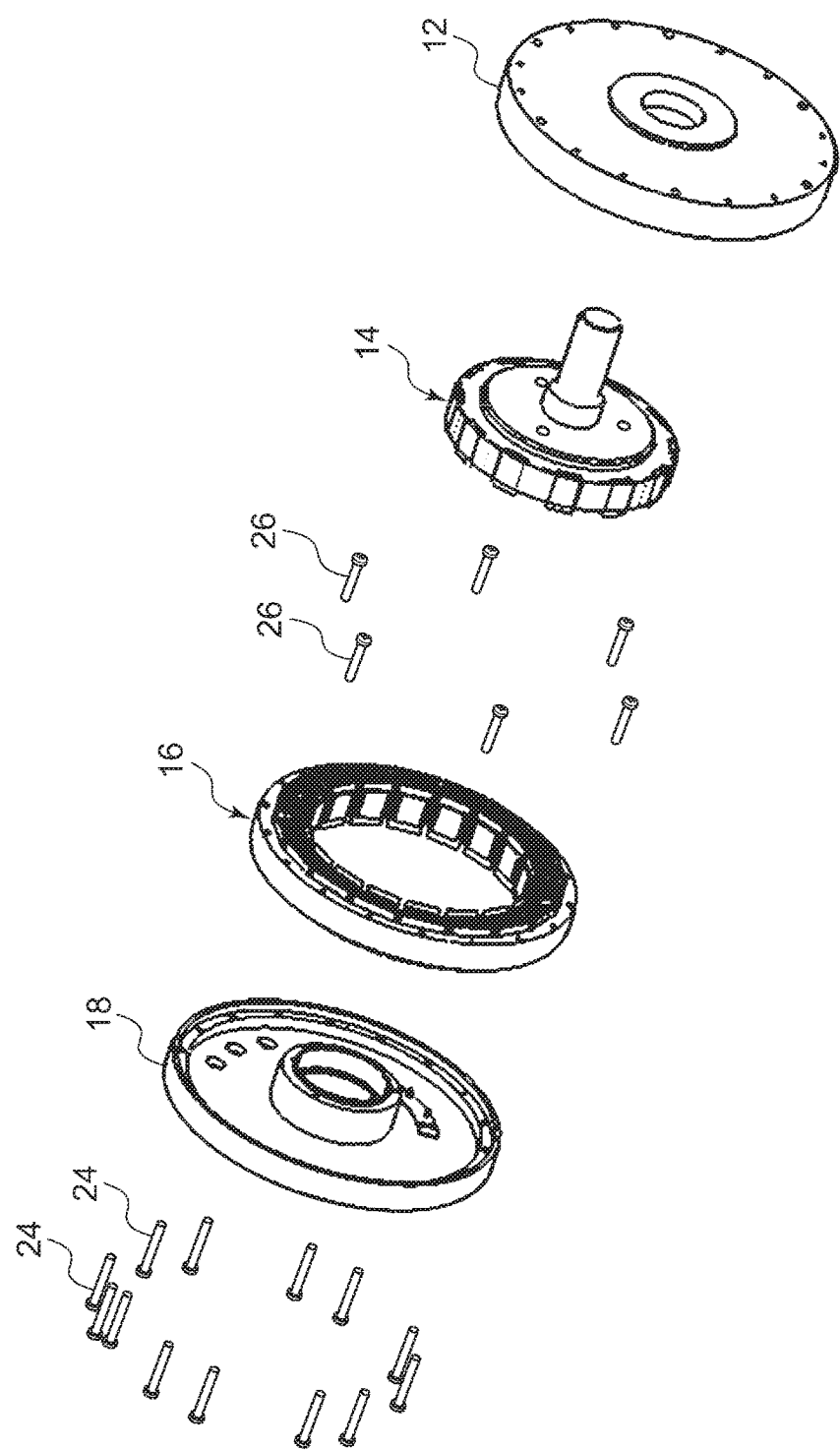
FIG. 18 is an exploded perspective view of the brushless motor shown in FIG. 17.

A description is now given of an outline of a brushless motor according to the present embodiment. FIG. 17 is a cross-sectional view of the brushless motor according to the first embodiment. FIG. 18 is an exploded perspective view of the brushless motor shown in FIG. 17. A brushless motor 10 according to the first embodiment includes an output-shaft-side bell 12, a rotor 14, a stator 16, an end bell 18, and the above-described phase control circuit 120.

The output-shaft-side bell 12 is a cylindrically shaped member, and a hole 12a is formed in a center of the output-shaft-side bell 12 so that a shaft 20 of the rotor 14 can penetrate the hole 12a. The end bell 18 is a cylindrically shaped member, and has a recess 18a, which holds bearings 22a and 22b of the rotor 14, in a center of the end bell 18. The output-shaft-side bell 12 and the end bell 18 are secured to each other by fixing bolts 24. The stator 16 is secured to the end bell 18 by fixing bolts 26.

[Rotor]

Figure 19A:
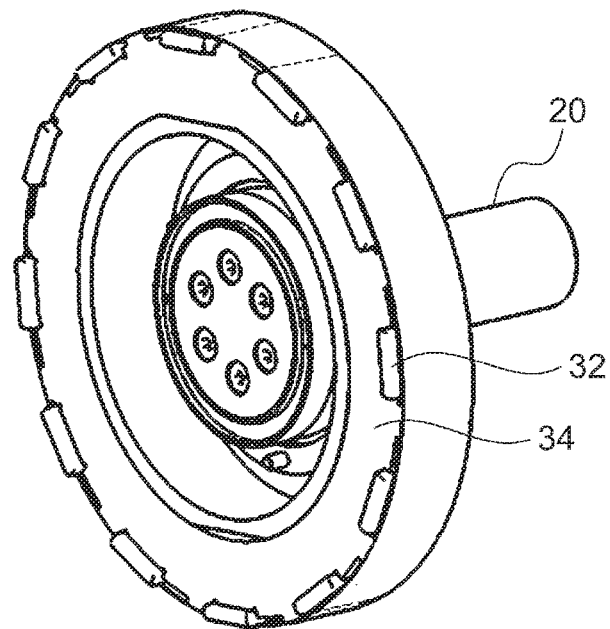
FIG. 19A is a perspective view of a rotor according to a first embodiment as seen from one viewpoint.
Figure 19B:
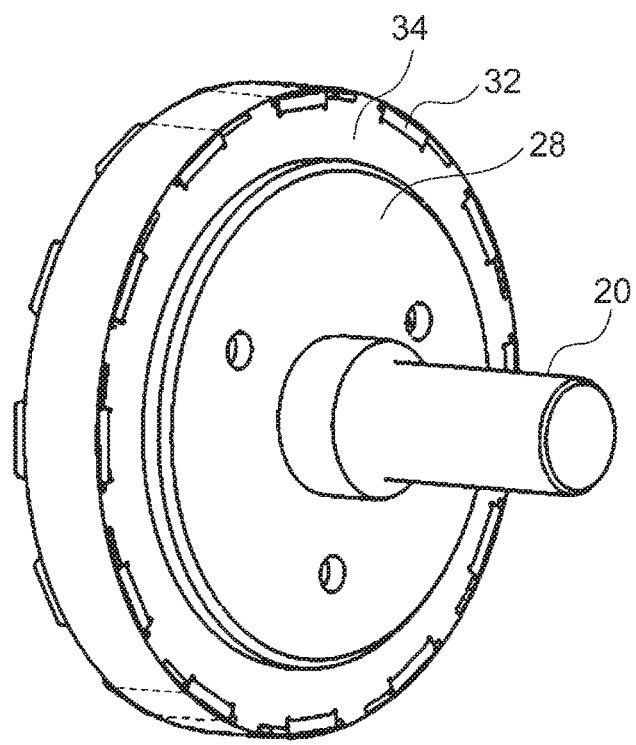
FIG. 19B is a perspective view of a rotor according to a first embodiment as seen from another viewpoint.
Figure 21A:
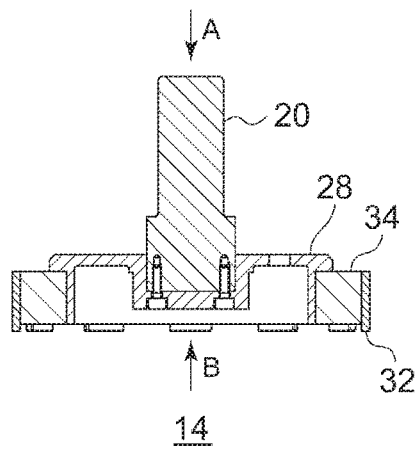
FIG. 21A is a cross-sectional view of a rotor according to a first embodiment.
Figure 21B:
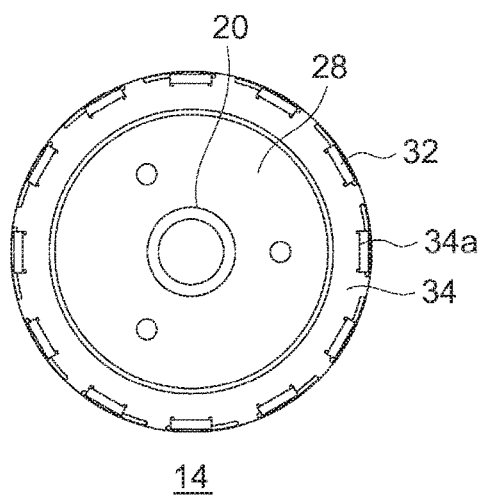
FIG. 21B is a top view thereof as seen from direction A indicated in FIG. 21A.
Figure 21C:
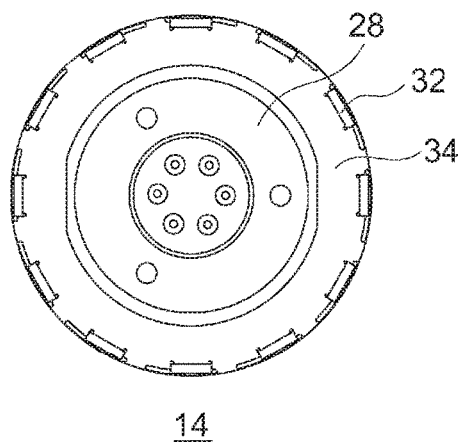
FIG. 21C is a bottom view thereof as seen from direction B indicated in FIG. 21A.

FIG. 19A is a perspective view of the rotor according to the first embodiment as seen from one viewpoint. FIG. 19B is a perspective view of the rotor according to the first embodiment as seen from another viewpoint. FIG. 20 is an exploded perspective view of the rotor according to the first embodiment. FIG. 21A is a cross-sectional view of the rotor according to the first embodiment. FIG. 21B is a top view thereof as seen from direction A indicated in FIG. 21A. FIG. 21C is a bottom view thereof as seen from direction B indicated in FIG. 21A.

The rotor 14 includes a shaft 20, a rotor wheel 28, a bearing holder 30, bearings 22a and 22b, twelve plate-shaped magnets 32, and a rotor core 34. The shaft 20, which is a cylindrical member, is secured to the rotor wheel 28 by fixing bolts 36. The rotor wheel 28 is fitted to an inner edge portion of the rotor core 34. The bearing holder 30 is secured to the end bell 18 by fixing bolts 38 in a subsequent assembling process while the bearings 22a and 22b are being held between the bearing holder 30 and the end bell 18. Twelve magnet holding portions 34a, which are formed according to the shape of the magnets 32, are formed in the rotor core 34. The magnet holding portions 34a are formed in a circle shape on an outer circumferential part of the rotor core 34. The magnet 32 has a protrusion 32a protruding from the magnet holding portion 34a.

A plurality of plate-shaped magnets 32 are inserted into the magnet holding portion 34a and secured, and are thereby arranged at intervals in a circumferential direction of the rotor core 34. Each magnet 32 has a protrusion protruding from an end face of the rotor core in a direction of the rotating shaft.

[Stator]

Figure 22A:
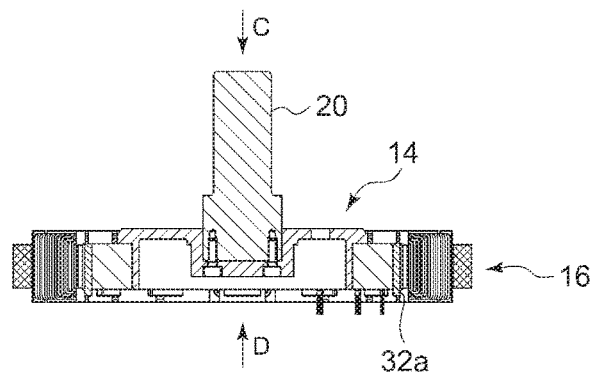
FIG. 22A is a cross-sectional view of a rotor and a stator according to a first embodiment.
Figure 22B:
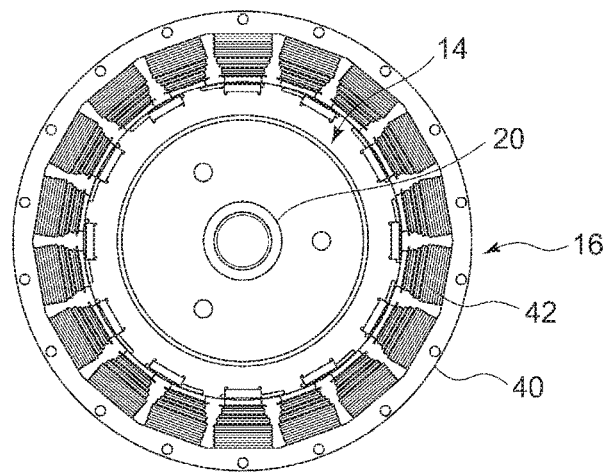
FIG. 22B is a top view thereof as seen from direction C indicated in FIG. 22A.
Figure 22C:
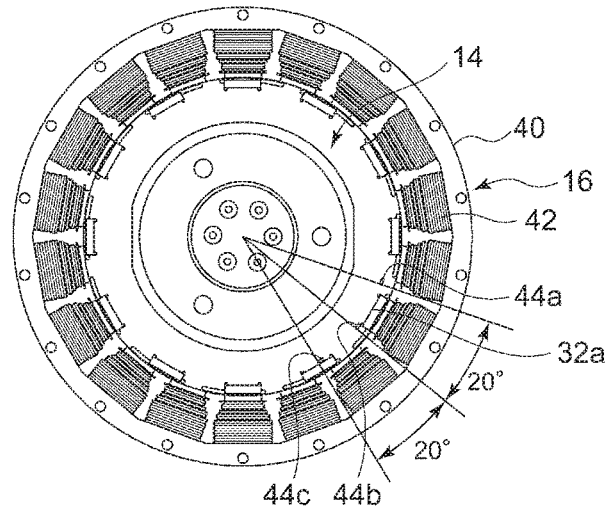
FIG. 22C is a bottom view thereof as seen from direction D indicated in FIG. 22A.

FIG. 22A is a cross-sectional view of a rotor and a stator according to the first embodiment. FIG. 22B is a top view thereof as seen from direction C indicated in FIG. 22A. FIG. 22C is a bottom view thereof as seen from direction D indicated in FIG. 22A.

The stator 16 includes a cylindrical stator core 40 and windings 42. Eighteen arms are provided on an inner circumferential part of the stator core 40, and the winding 42 is wound around each arm. The eighteen windings 42 are arranged in the order of a U phase, a V phase, a W phase, a U phase, a V phase, a W phase and so forth.

As described above, the brushless motor 10 is comprised of the cylindrical stator 16, where a plurality of windings 42 are placed, the circular rotor core 34, which is provided in a central part of the stator 16, the plurality of plate-shaped magnets 32 arranged in the rotor core 34, the phase control circuit 120, and a power feed section (not shown) for supplying the power to the plurality of windings 42.

[Hall Elements]

Figure 23:
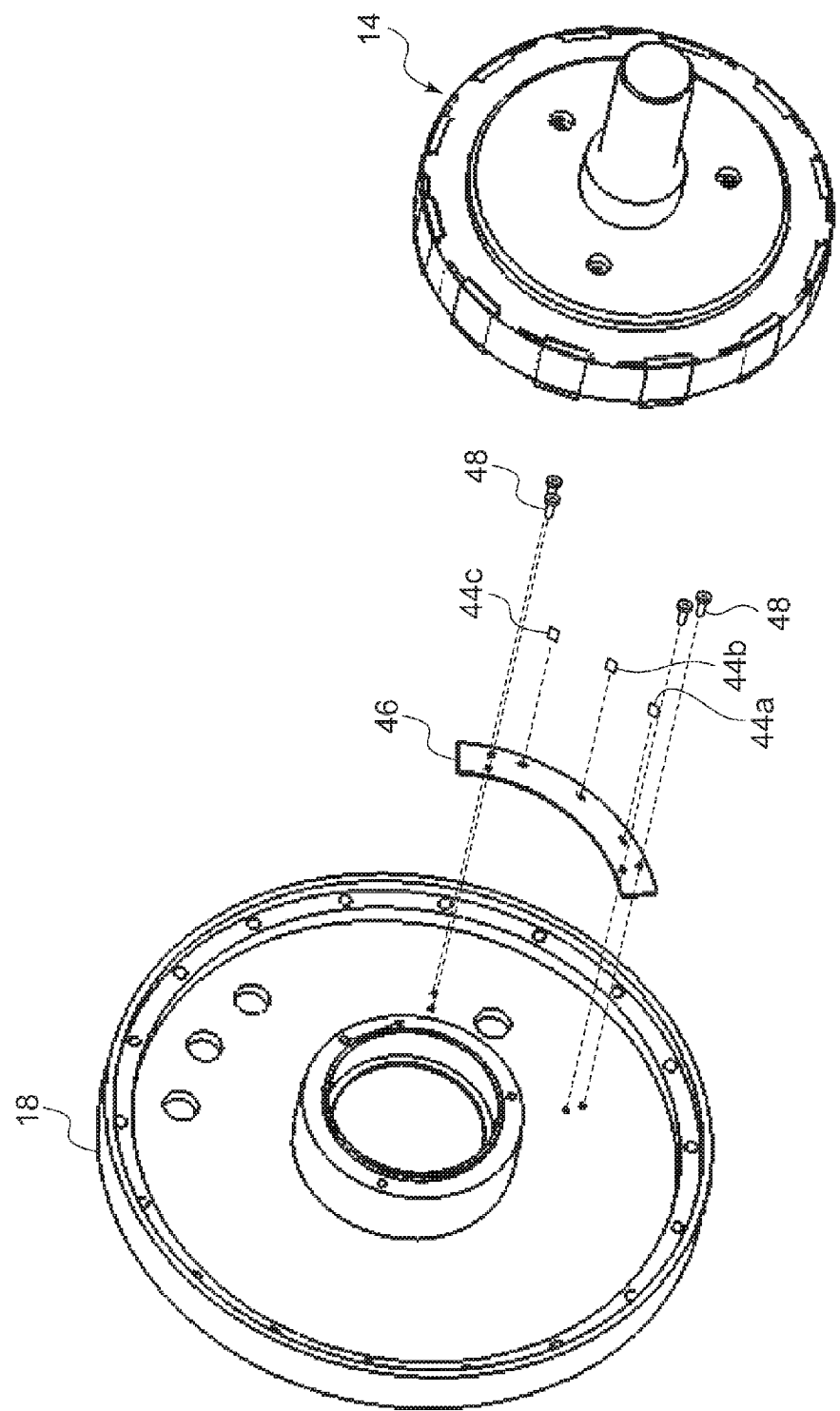
FIG. 23 is an exploded perspective view of an end bell with Hall elements.

FIG. 23 is an exploded perspective view of an end bell with Hall elements. As shown in FIG. 23, three Hall elements 44a, 44b and 44c (hereinafter sometimes referred to as "Hall element 44" or "Hall elements 44" as appropriate, also) are mounted on a base plate 46. The base plate 46 is secured to the end bell 18 by board fixing screws 48. As shown in FIG. 22C, each Hall element 44 constituting the signal output unit is placed radially inward of the protrusion 32a of the magnet 32 and is so arranged as to face the protrusion 32a thereof.

The Hall elements are arranged such that the Hall elements are spaced apart from each other circumferentially, at intervals of 20 degrees, relative to the center of the rotor 14. The brushless motor 10 according to the present embodiment is a three-phase motor having twelve poles and eighteen slots, and the mechanical angle corresponding to the electric angle of 120 degrees is [120 degrees/(12 poles/2)]=20 degrees. Thus, the phases of waveforms outputted from the three Hall elements arranged in the positions of FIGS. 22B and 22C are approximated to those of the three-phase brushless motor, having two poles and three slots, shown in FIG. 2.

Figure 24:
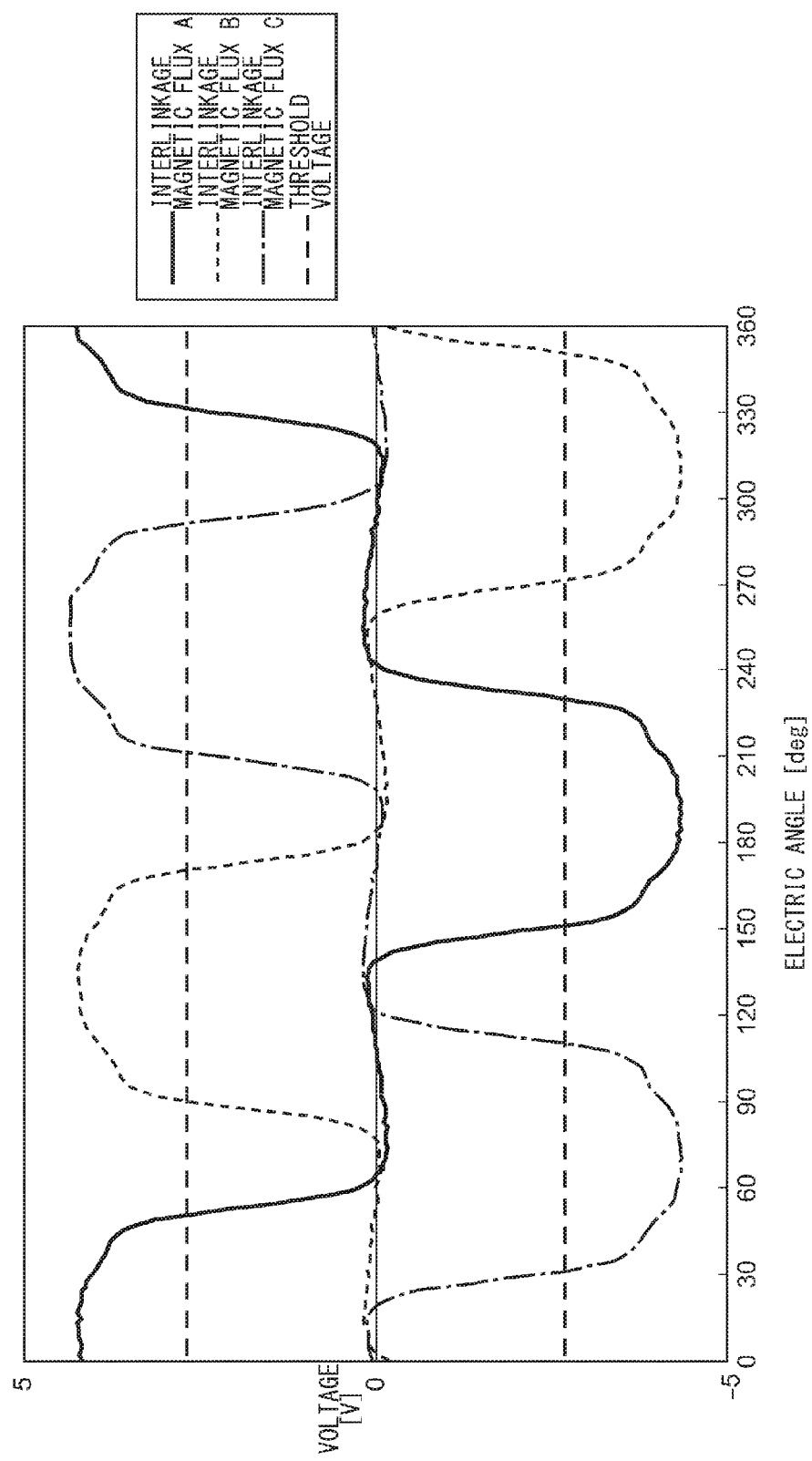
FIG. 24 shows waveforms of signals outputted from each Hall element according to a first embodiment.

FIG. 24 shows waveforms of signals outputted from each Hall element according to the present embodiment. When a method for detecting the positions is employed where the magnetic flux of a permanent magnet interlinked across the Hall element is used, the interlinkage magnetic flux needs to be treated as an analog quantity in order to obtain fine positional information. Thus, an A/D circuit having a high computation capacity is required for the A/D conversion. In the light of this, used is the brushless motor 10 that outputs waveforms varying stepwise as shown in FIG. 24. As a result, the phase control circuit 120 can easily perform the A/D conversion by only using the comparator circuit, for instance, and therefore the increase in the computing time can be suppressed at low cost. When this method for detecting the positions is employed where the magnetic flux of a permanent magnet interlinked across the Hall element is used, phase errors may possibly occur due to the heat produced as a result of the motor loss and the exposure to heat in a usage environment as well as the variations and unevenness in the dimensions (width/depth/height) of the permanent magnet and the material characteristics. Nevertheless, use of the brushless motor 10 for outputting the waveforms varying stepwise allows the phase control circuit 120 to eliminate the phase errors in the event that the magnetic flux drops.

Figure 25A:
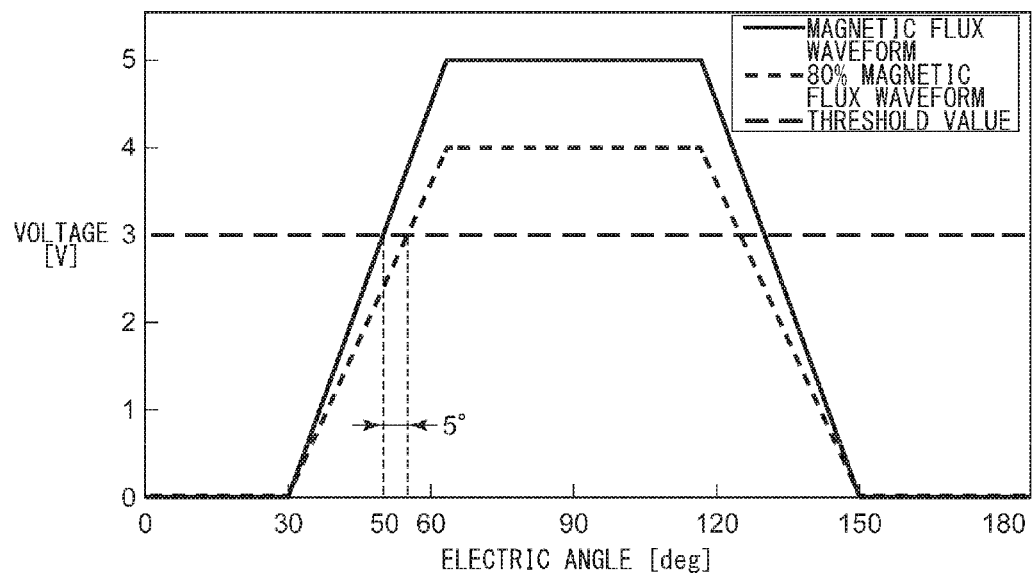
FIG. 25A schematically shows a case where a waveform of a signal outputted from a signal output unit is such that an electric angle of the signal starting from the rising timing of the waveform till the reach of a threshold value is 20 degrees.
Figure 25B:
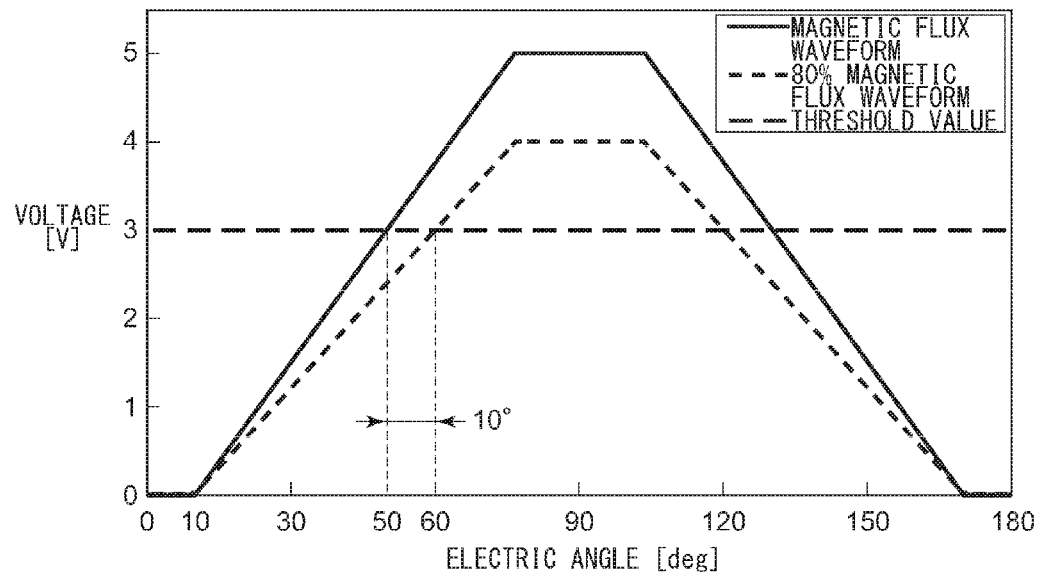
FIG. 25B schematically shows a case where a waveform of a signal outputted from a signal output unit is such that an electric angle of the signal starting from the rising timing till the reach of a threshold value is 40 degrees.

Note that it is not an easy task to design a structure of the rotor so that the brushless motor 10 can output the completely perfect stepwise waveforms. To alleviate this problem, it is appreciated here that the same advantageous effects as in the stepwise waveforms can be achieved if a trapezoidally-shaped waveform close to the stepwise waveform is used instead. FIG. 25A schematically shows a case where a waveform of a signal outputted from the signal output unit is such that the electric angle thereof starting from the rising timing of the waveform till the reach of a threshold value is 20 degrees. FIG. 25B schematically shows a case where a waveform of a signal outputted from the signal output unit is such that the electric angle thereof starting from the rising timing of the waveform till the reach of the threshold value is 40 degrees.

Taking into consideration a case where the permanent magnets used in the rotor are demagnetized due to the heat, a waveform where the magnetization state of the magnets is demagnetized by 20%, for example, is an 80% magnetic flux waveform (dotted line) indicated in FIG. 25A and FIG. 25B. In this case, the electric angle until the reach of the threshold is shifted as compared with the normal magnetic flux waveform (solid line). In other words, error occurs in the phase control. The larger the electric angle starting from the rising timing till the reach of the threshold value is, namely the slower the rising timing is, the error will be larger. Thus, in order that the error in the phase affected by the demagnetization can lie within 10 degrees in the electric angle, the waveform of a signal outputted from the signal output unit including the Hall elements is such that the electric angle thereof starting from the rising timing of the waveform till the reach of the threshold value is 40 degrees or below or more preferably 30 degrees or below. This improves the accuracy with which the positions of the rotor are detected.

[First Modification]

Figure 26:
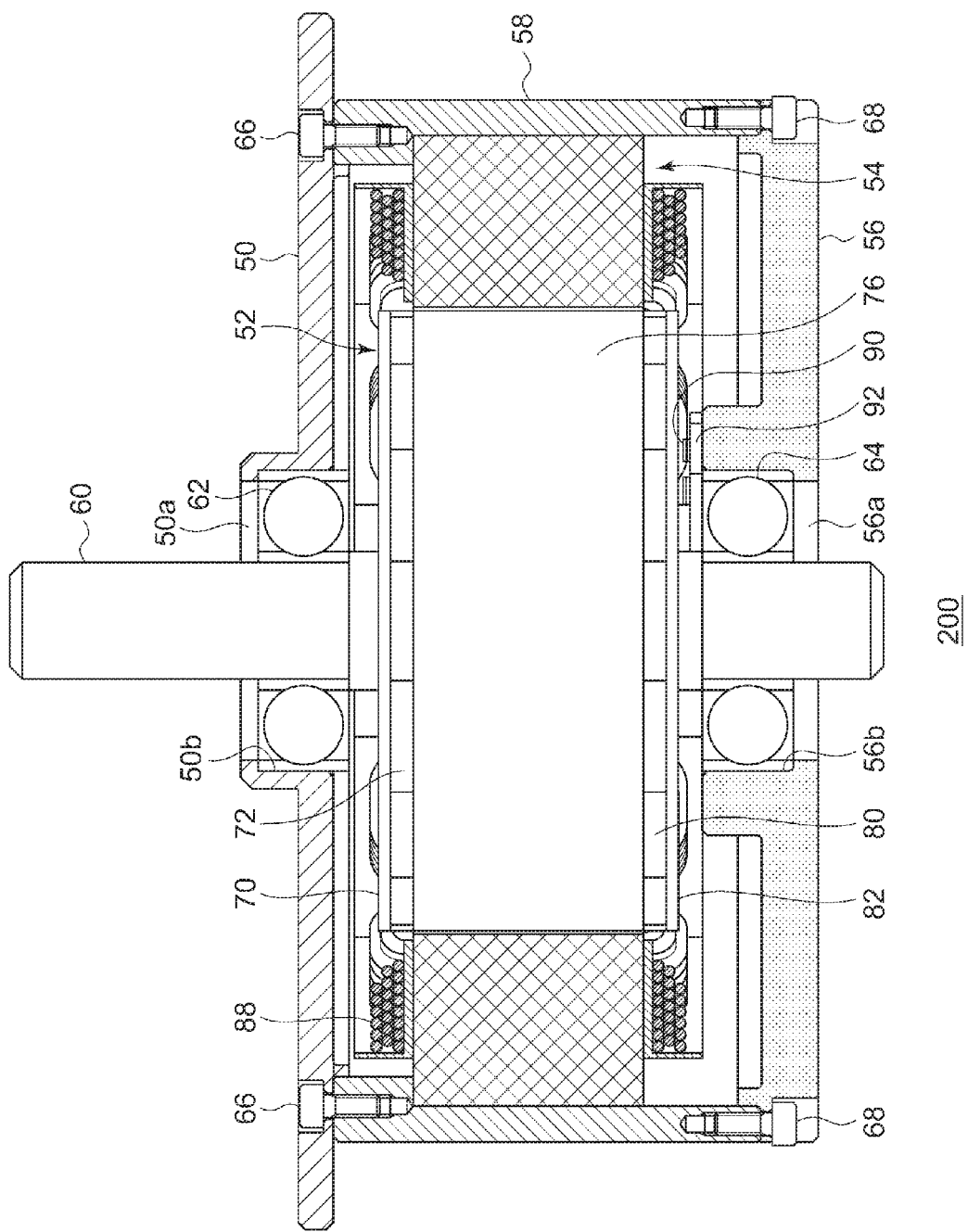
FIG. 26 is a cross-sectional view of a brushless motor according to a first modification.
Figure 27:
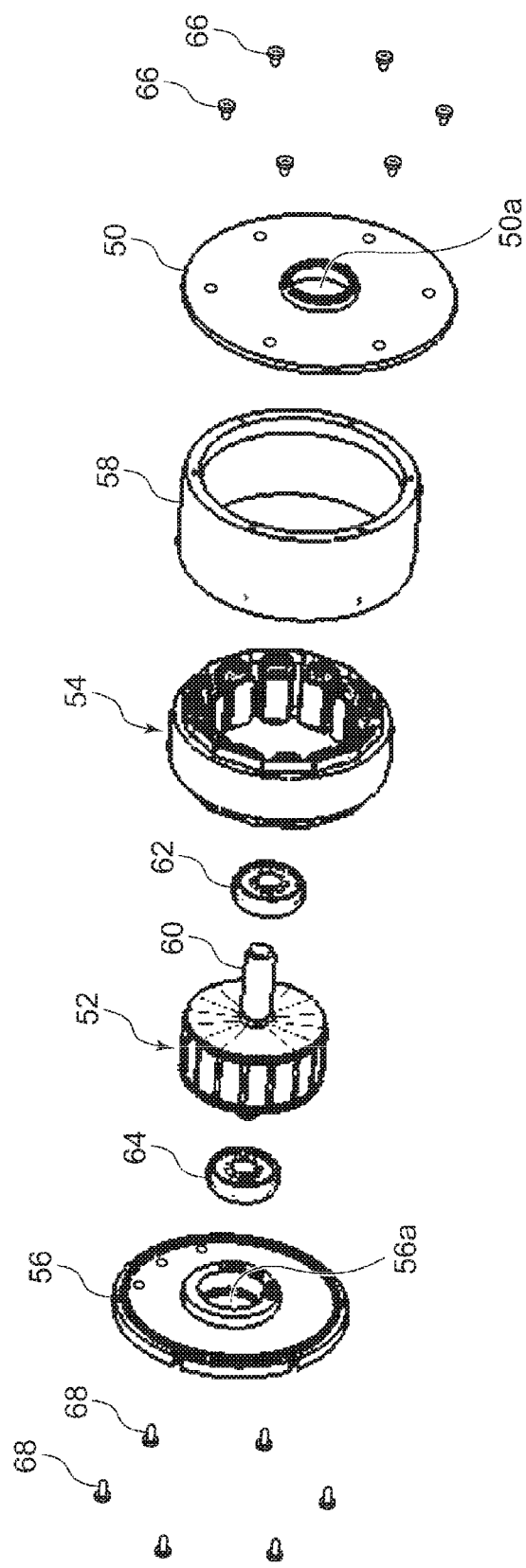
FIG. 27 is an exploded perspective view of the brushless motor shown in FIG. 26.

A description is now given of a modification of the brushless motor to which the present embodiment is applicable. Note that the explanation of the same components as those of the brushless motor 10 will be omitted as appropriate. FIG. 26 is a cross-sectional view of a brushless motor according to a first modification. FIG. 27 is an exploded perspective view of the brushless motor shown in FIG. 26. A brushless motor 200 according to the first modification includes an output-shaft-side bell 50, a rotor 52, a stator 54, an end bell 56, a housing 58, and the above-described phase control circuit 120.

The output-shaft-side bell 50 is a disk-shaped member, and a hole 50a is formed in a center of the output-shaft-side bell 50 so that a shaft 60 can penetrate the hole 50a. Also, a recess 50b, which holds a bearing 62, is formed near the hole 50a. The end bell 56 is a disk-shaped member, and a hole 56a is formed in a center of the end bell 56 so that the shaft 60 can penetrate the hole 56a. Also, a recess 56b, which holds a bearing 64, is formed near the hole 56a. The housing 58 is a cylindrical member. The output-shaft-side bell 50 is secured to the housing 58 by fixing bolts 66. The end bell 56 is secured to the housing 58 by fixing bolts 68. The output-shaft-side bell 50, the end bell 56 and the shaft 60 constitute a casing of the brushless motor 200.

[Rotor]

Figure 28:
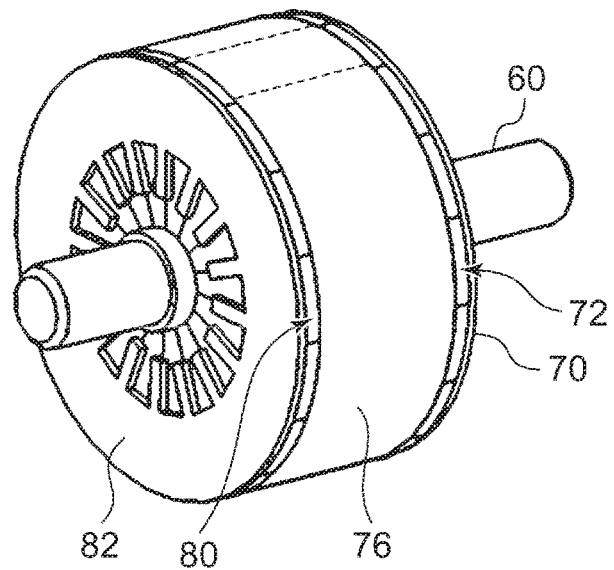
FIG. 28 is a perspective view of a rotor according to a first modification.
Figure 29:
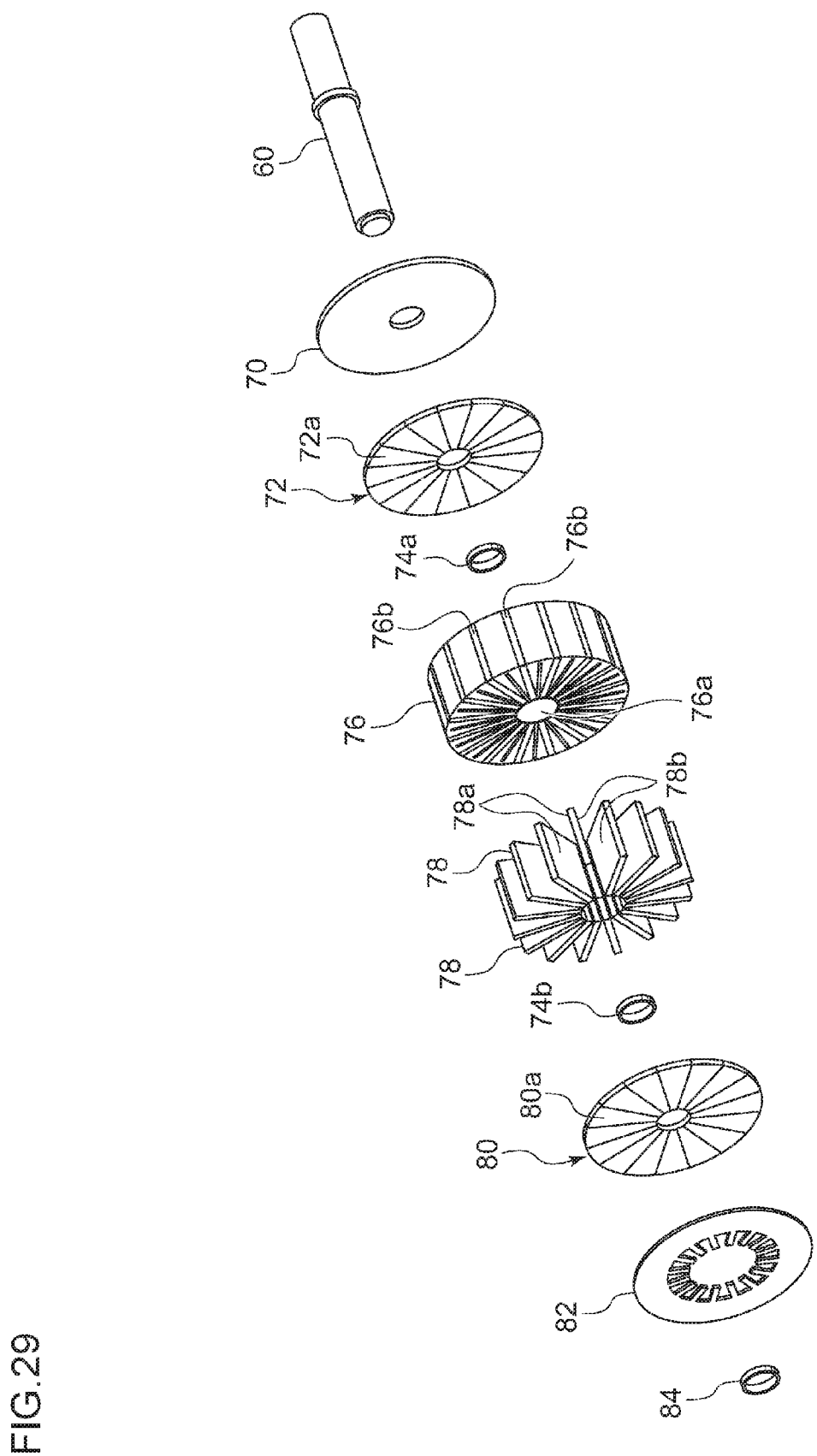
FIG. 29 is an exploded perspective view of a rotor according to a first modification.
Figure 30A:
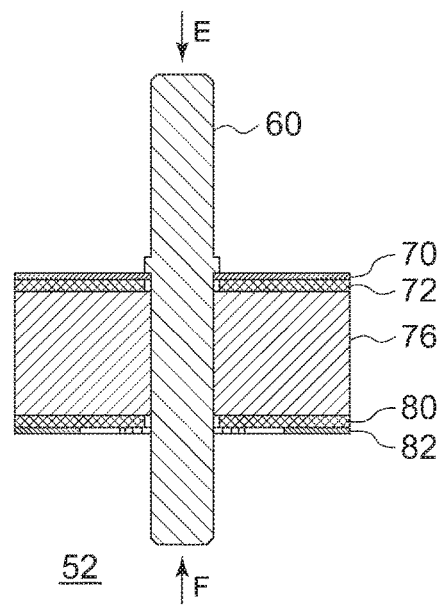
FIG. 30A is a cross-sectional view of a rotor according to a first modification.
Figure 30B:
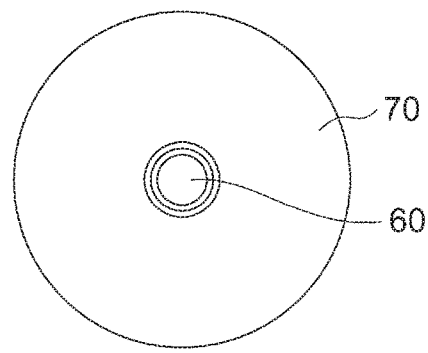
FIG. 30B is a top view thereof as seen from direction E indicated in FIG. 30A.
Figure 30C:
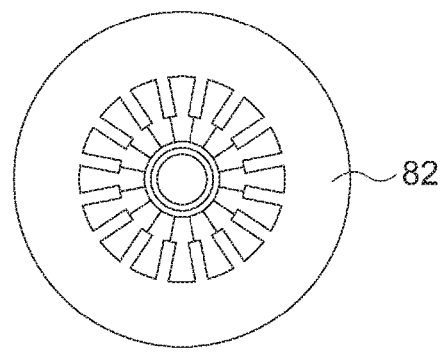
FIG. 30C is a bottom view thereof as seen from direction F indicated in FIG. 30A.

FIG. 28 is a perspective view of a rotor according to the first modification. FIG. 29 is an exploded perspective view of the rotor according to the first modification. FIG. 30A is a cross-sectional view of the rotor according to the first modification. FIG. 30B is a top view thereof as seen from direction E indicated in FIG. 30A. FIG. 30C is a bottom view thereof as seen from direction F indicated in FIG. 30A.

A rotor 52 includes a shaft 60, an output-shaft-side back yoke 70, an output-shaft-side Z magnet 72, spacers 74a and 74b, a rotor core 76, a plurality of θ magnets 78, an end-side Z magnet 80, an end-side back yoke 82, and an adjusting sleeve 84. The shaft 60, which is a cylindrical member, is fitted into a hole in a center of the rotor core 76 so as to be secured.

The output-shaft-side Z magnet 72 is held between the output-shaft-side back yoke 70 and the rotor core 76. Similarly, the end-side Z magnet 80 is held between the end-side back yoke 82 and the rotor core 76.

The output-shaft-side Z magnet 72 is such that a plurality (sixteen) of fan-shaped small pieces 72a are arranged in a ring shape. There is a space between every adjacent small pieces 72a. Since an attractive force acts between the small pieces 72a, non-magnetic members may be arranged in the spaces such that the spaces can be maintained at constant intervals or radiant protruding shapes may be provided on the output-shaft-side Z magnet 72 on an output-shaft-side back yoke 70 side. Similarly, the end-side Z magnet 80 is such that a plurality (e.g., sixteen) of fan-shaped small pieces 80a are arranged in a ring shape. There is a space between every adjacent small pieces 80a. Since an attractive force acts between the small pieces 80a, non-magnetic members may be arranged in the spaces such that the spaces can be maintained at constant intervals or radiant protruding shapes may be provided on a surface of the end-side back yoke 82 on an end-side Z magnet 80 side.

The output-shaft-side Z magnet 72 and the end-side Z magnet 80 are constructed such that if an opposed flat face of a small piece 72a facing an end face of the rotor core 76 in a direction of the rotating shaft is an N-pole, for instance, then a flat face of a small piece 80a opposite to said opposed face is an N-pole. Thus, the output-shaft-side Z magnet 72 is constructed such that N-poles and S-poles are alternately formed circularly on the surfaces of the small pieces 72a. The end-side Z magnet 80 is constructed such that N-poles and S-poles are alternately formed circularly on the surfaces of the small pieces 80a.

In the rotor core 76, a plurality of magnet holding sections 76b, which are fixed by inserting the θ magnets 78 thereinto, are provided radially with the rotating shaft as the center. The θ magnets 78 are of plate-shaped members in accordance with the shape of the magnet holding sections 76b.

Then, each member is assembled in sequence. More specifically, the output-shaft-side back yoke 70 where the output-shaft-side Z magnet 72 has been secured is inserted through the shaft 60. Then a plurality (e.g., sixteen) of θ magnets 78 are fitted into the corresponding magnet holding sections 76b, and the aforementioned shaft 60 is inserted into a through-hole 76a of the rotor core 76. Then the aforementioned shaft 60 is inserted into a central hole of the end-side back yoke 82 to which the end-side Z magnet 80 is fixed. Then the bearing 62 is mounted to the shaft 60. Also, the bearing 64 is mounted to the shaft 60 by way of the adjusting sleeve 84.

In the rotor core 76, a plurality of plate-shaped members are laminated. Each of the plurality of plate-shaped members is manufactured such that a non-oriented electromagnetic steel sheet (e.g., silicon steel sheet) or a cold-rolled steel sheet is stamped out into a predetermined shape by press-forming.

The θ magnets 78 are contained in the magnet holding sections 76b such that the same magnetic pole of one θ magnet 78 as that of another θ magnet 78 adjacent to said one θ magnet 78 faces the same magnet pole of the adjacent θ magnet 78 in circumferential directions θ of the rotor core 76. In other words, the θ magnets 78 are configured such that principal surfaces 78a and 78b, whose surface areas are largest among the six surfaces of each of the adjacent θ magnets 78 that are each an approximately rectangular parallelepiped, are an N-pole and an S-pole, respectively. Thus, the lines of magnetic force emanating from the principal surface 78a are directed outward of the rotor core 76 from a region disposed between these two adjacent θ magnets 78. As a result, the rotor 52 according to the present embodiment functions as sixteen magnets such that eight N-poles and eight S-poles are alternately formed in a circumferential direction of an outer circumferential surface of the rotor core 76.

[Stator]

Figure 31A:
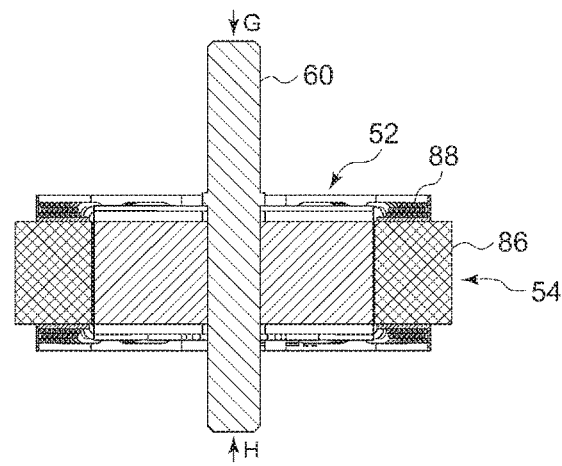
FIG. 31A is a cross-sectional view of a rotor and a stator according to a first modification.
Figure 31B:
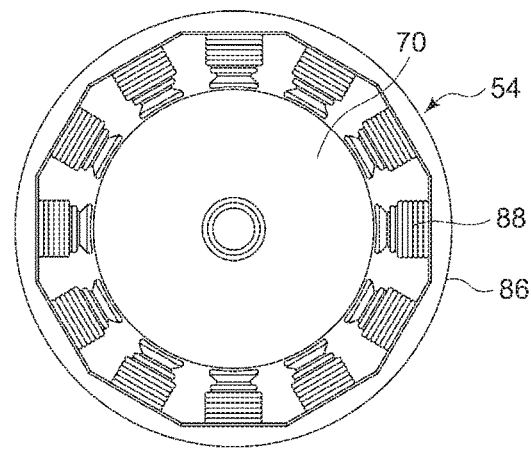
FIG. 31B is a top view thereof as seen from direction G indicated in FIG. 31A.
Figure 31C:
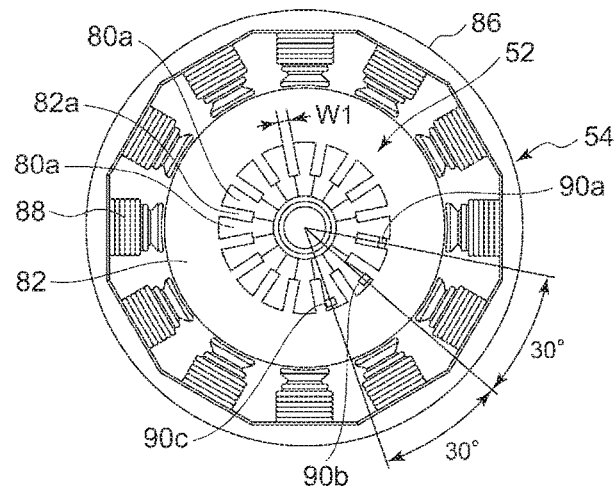
FIG. 31C is a bottom view thereof as seen from direction H indicated in FIG. 31A.

FIG. 31A is a cross-sectional view of a rotor and a stator according to the first modification. FIG. 31B is a top view thereof as seen from direction G indicated in FIG. 31A. FIG. 31C is a bottom view thereof as seen from direction H indicated in FIG. 31A.

The stator 54 includes a cylindrical stator core 86 and windings 88. Twelve arms are provided on an inner circumferential part of the stator core 86, and the winding 88 is wound around each arm. The twelve windings 88 are arranged in the order of a U phase, a W phase, a V phase, a U phase, a W phase, a V phase and so forth.

[Hall Elements]

As shown in FIG. 31C, three Hall elements 90a, 90b and 90c (hereinafter sometimes referred to as "Hall element 90" or "Hall elements 90" as appropriate, also) are mounted on a base plate 92 (see FIG. 26). As shown in FIG. 31C, each Hall element 90 constituting the signal output unit is so arranged as to face the end-side back yoke 82. The Hall elements 90 are arranged such that the Hall elements are spaced apart from each other circumferentially, at intervals of 30 degrees, relative to the center of the rotor 52.

Figure 32:
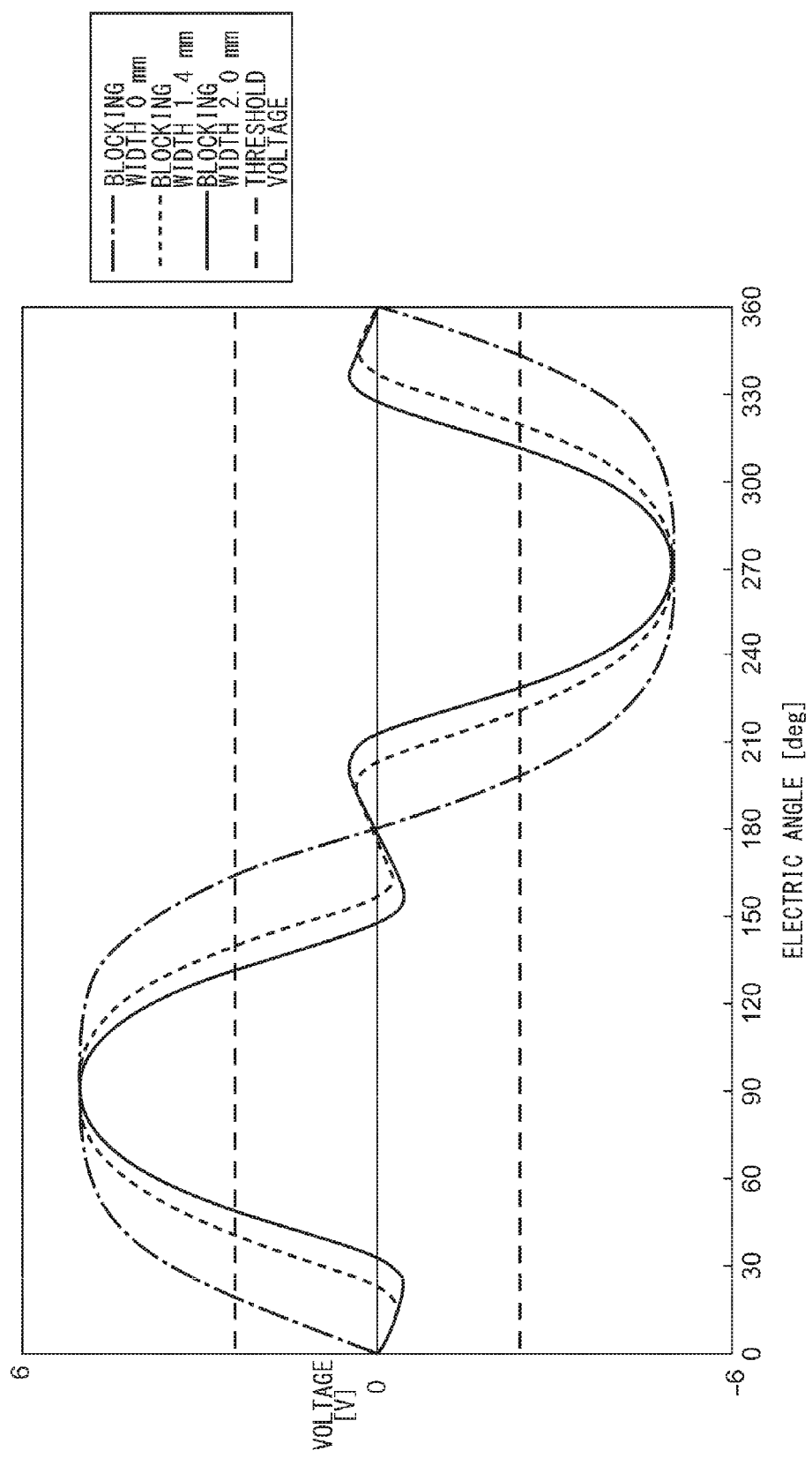
FIG. 32 shows waveforms of signals outputted from each Hall element according to a first modification.

FIG. 32 shows waveforms of signals outputted from each Hall element according to the first modification. In the end-side back yoke 82 shown in FIG. 31C, sixteen rectangular magnetic flux short-circuiting portions 82a are formed inward of an opening. The magnetic flux short-circuiting portion 82a short-circuits magnetically two adjacent end-side Z magnets 80. This allows the flux to change steeply. FIG. 32 shows waveforms for three cases; the first case is when no magnetic flux short-circuiting portion 82a is provided, and the second and third cases are when the widths W1 of the magnetic flux short-circuiting portion 82a are 1.4 mm and 2.0 mm, respectively. In this manner, the output waveform from the Hall element can be formed and changed in a desired shape by appropriately selecting the shape of the magnetic flux short-circuiting portion 82a.

[Second Modification]

A description is now given of another modification of the brushless motor to which the present embodiment is applicable. Note that the same components as those of the brushless motor 200 are given the same reference numerals and the description thereof is omitted as appropriate. A significant difference between a brushless motor according to the second modification and the brushless motor 200 according to the first modification is in the rotor.

Figure 33:
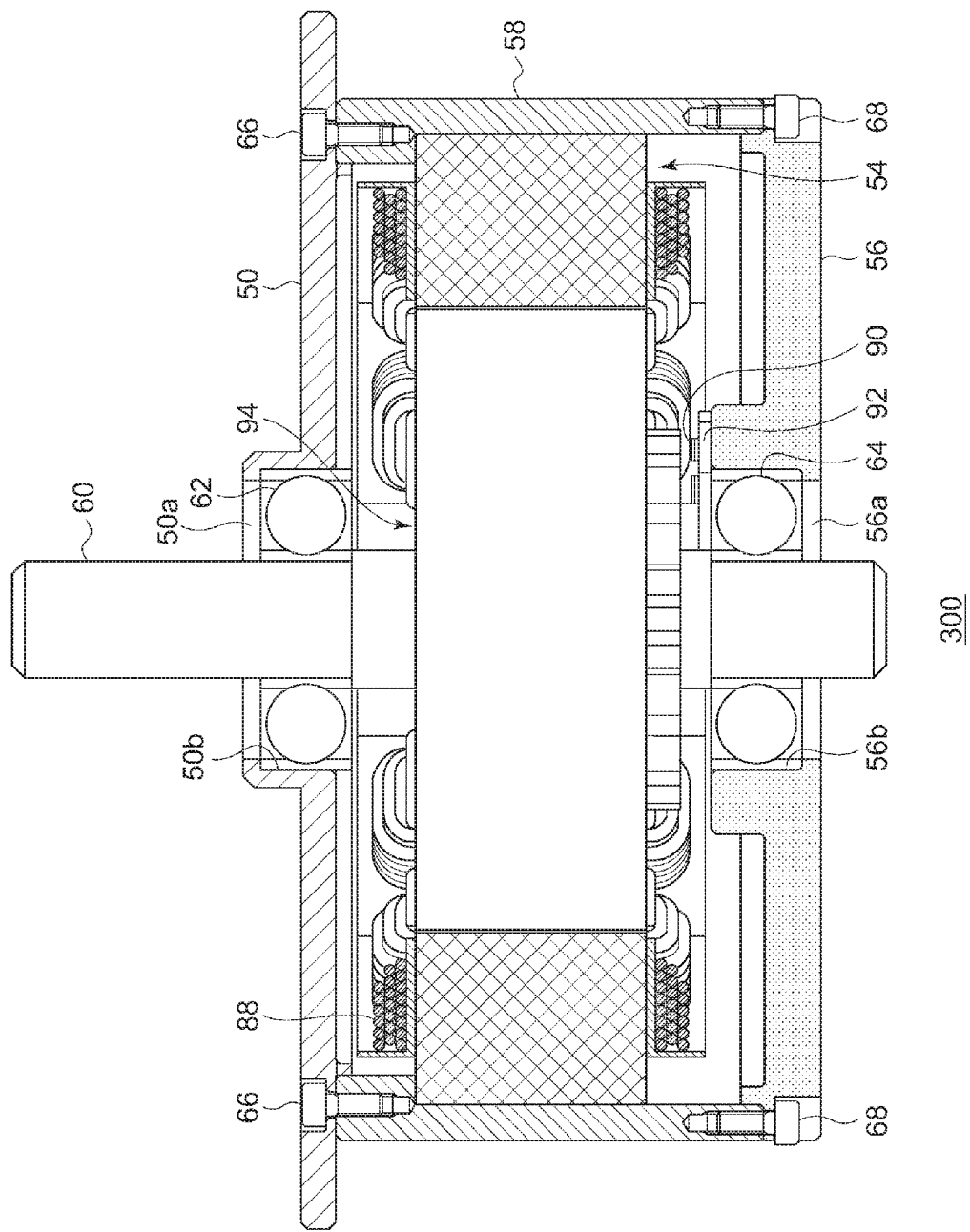
FIG. 33 is a cross-sectional view of a brushless motor according to a second modification.

FIG. 33 is a cross-sectional view of a brushless motor according to the second modification. A brushless motor 300 according to the second modification includes an output-shaft-side bell 50, a rotor 94, a stator 54, an end bell 56, a housing 58, and the above-described phase control circuit 120.

[Rotor]

Figure 34:
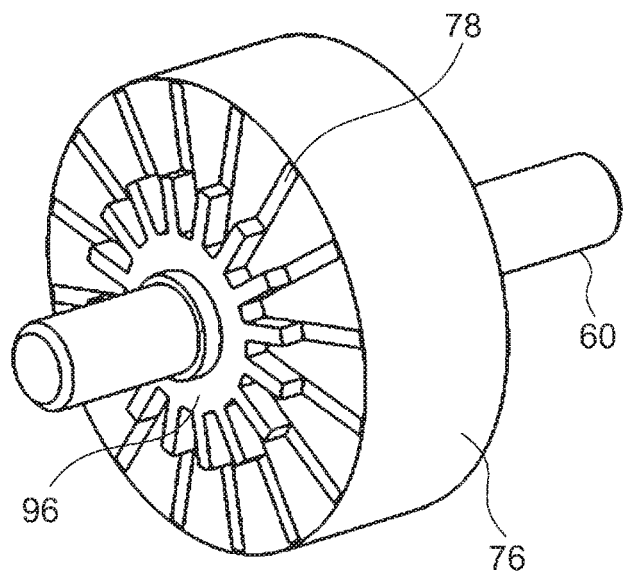
FIG. 34 is a perspective view of a rotor according to a second modification.
Figure 35:
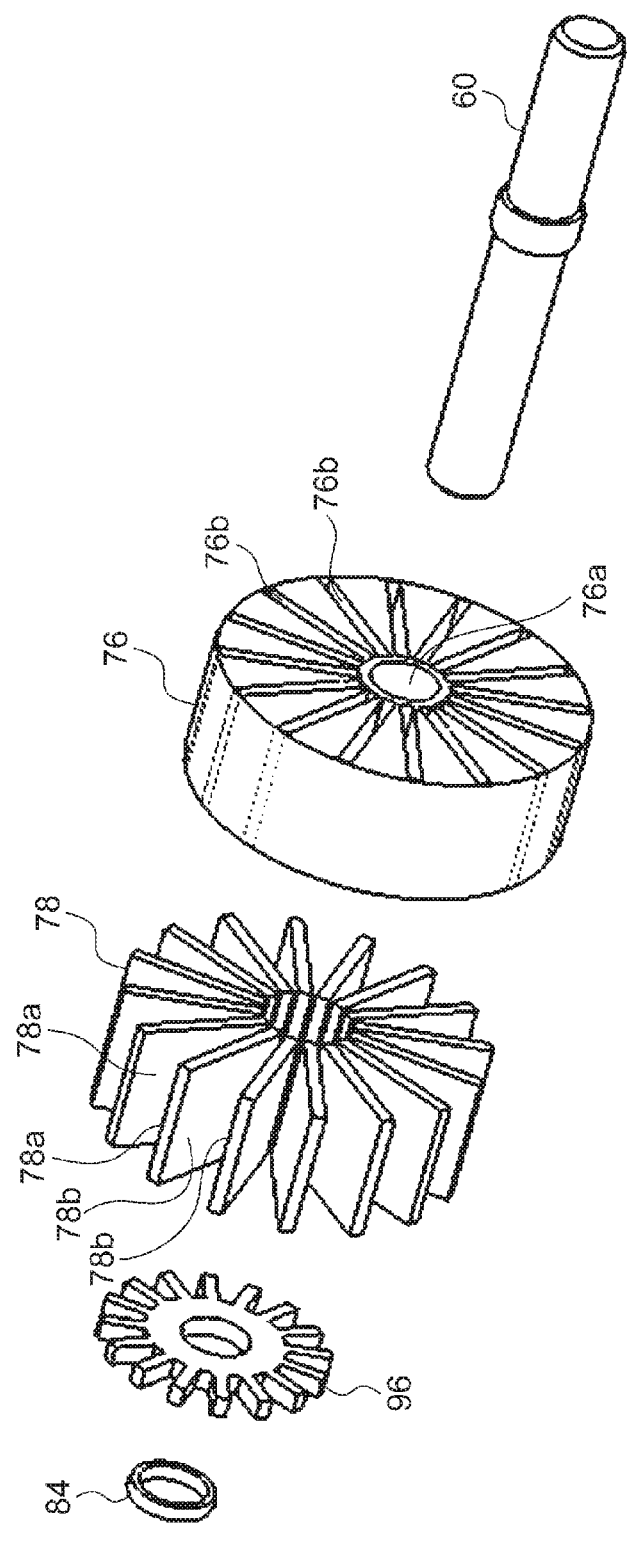
FIG. 35 is an exploded perspective view of a rotor according to a second medication.
Figure 36A:
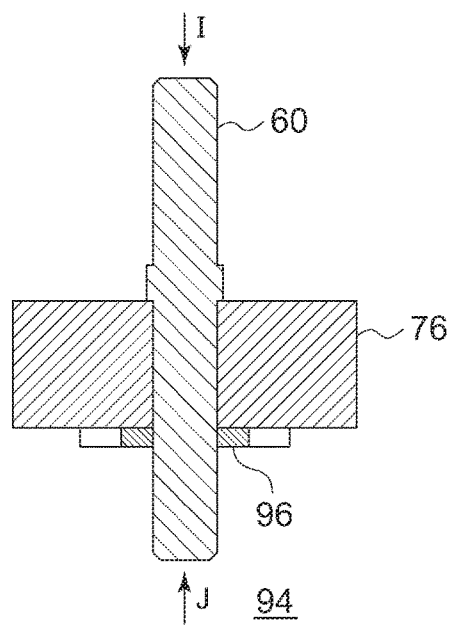
FIG. 36A is a cross-sectional view of a rotor according to a second modification.
Figure 36B:
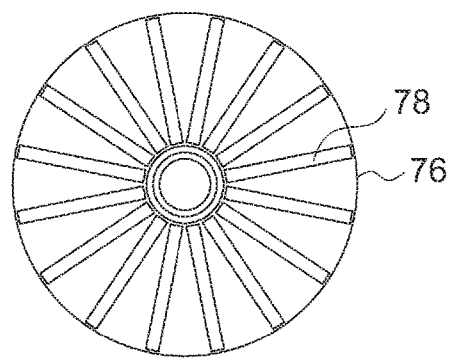
FIG. 36B is a top view thereof as seen from direction I indicated in FIG. 36A.
Figure 36C:
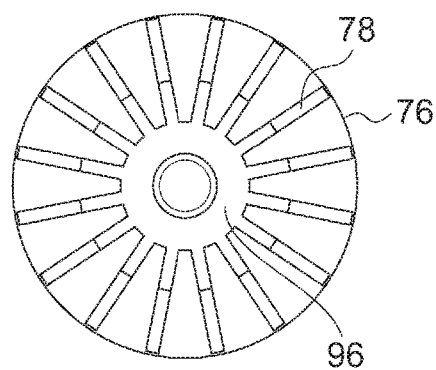
FIG. 36C is a bottom view thereof as seen from direction J indicated in FIG. 36A.

FIG. 34 is a perspective view of the rotor 94 according to the second modification. FIG. 35 is an exploded perspective view of the rotor according to the second medication. FIG. 36A is a cross-sectional view of the rotor according to the second modification. FIG. 36B is a top view thereof as seen from direction I indicated in FIG. 36A. FIG. 36C is a bottom view thereof as seen from direction J indicated in FIG. 36A.

A rotor 94 includes a shaft 60, a rotor core 76, a plurality of θ magnets 78, a shield plate 96, and an adjusting sleeve 84.

In the rotor core 76, a plurality of magnet holding sections 76b, which are fixed by inserting the θ magnets 78 thereinto, are provided radially with the rotating shaft as the center. The θ magnets 78 are of plate-shaped members in accordance with the shape of the magnet holding sections 76b.

Then, each member is assembled in sequence. More specifically, a plurality (e.g., sixteen) of θ magnets 78 are fitted into the corresponding magnet holding sections 76b, and the aforementioned shaft 60 is inserted into a through-hole 76a of the rotor core 76.

The θ magnets 78 are contained in the magnet holding sections 76b such that the same magnetic pole of one θ magnet 78 as that of another θ magnet 78 adjacent to said one θ magnet 78 faces the same magnet pole of the adjacent θ magnet 78 in circumferential directions θ of the rotor core 76. In other words, the θ magnets 78 are configured such that principal surfaces 78a and 78b, whose surface areas are largest among the six surfaces of each of the adjacent θ magnets 78 that are each an approximately rectangular parallelepiped, are an N-pole and an S-pole, respectively. Thus, the lines of magnetic force emanating from the principal surface 78a are directed outward of the rotor core 76 from a region disposed between these two adjacent θ magnets 78. As a result, the rotor 94 according to the present embodiment functions as sixteen magnets such that eight N-poles and eight S-poles are alternately formed in a circumferential direction of an outer circumferential surface of the rotor core 76.

[Stator]

Figure 37A:
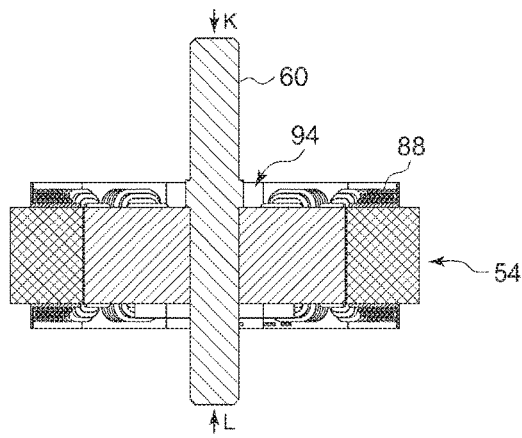
FIG. 37A is a cross-sectional view of a rotor and a stator according to a second modification.
Figure 37B:
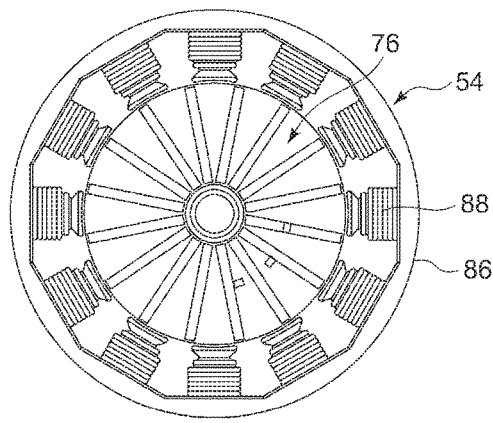
FIG. 37B is a top view thereof as seen from direction K indicated in FIG. 37A.
Figure 37C:
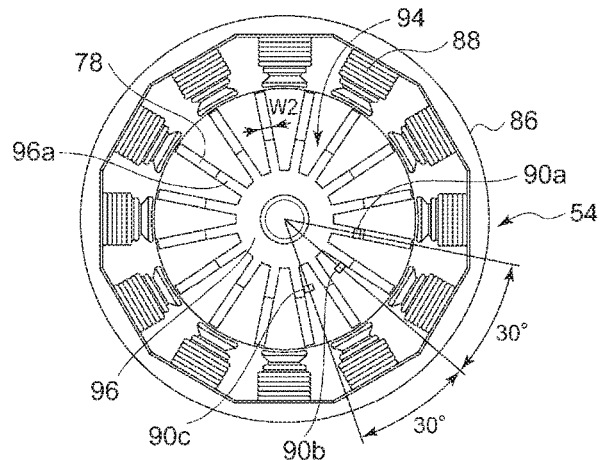
FIG. 37C is a bottom view thereof as seen from direction L indicated in FIG. 37A.

FIG. 37A is a cross-sectional view of a rotor and a stator according to the second modification. FIG. 37B is a top view thereof as seen from direction K indicated in FIG. 37A. FIG. 37C is a bottom view thereof as seen from direction L indicated in FIG. 37A.

The stator 54 includes a cylindrical stator core 86 and windings 88. Twelve arms are provided on an inner circumferential part of the stator core 86, and the winding 88 is wound around each arm. The twelve windings 88 are arranged in the order of a U phase, a W phase, a V phase, a U phase, a W phase, a V phase and so forth.

[Hall Elements]

As shown in FIG. 37C, three Hall elements 90a, 90b and 90c (hereinafter sometimes referred to as "Hall element 90" or "Hall elements 90" as appropriate, also) are mounted on a base plate 92 (see FIG. 33). As shown in FIG. 37C, each Hall element 90 constituting the signal output unit is so arranged as to face an end face of the rotor core 76. The Hall elements 90 are arranged such that the Hall elements are spaced apart from each other circumferentially, at intervals of 30 degrees, relative to the center of the rotor 52.

Figure 38:
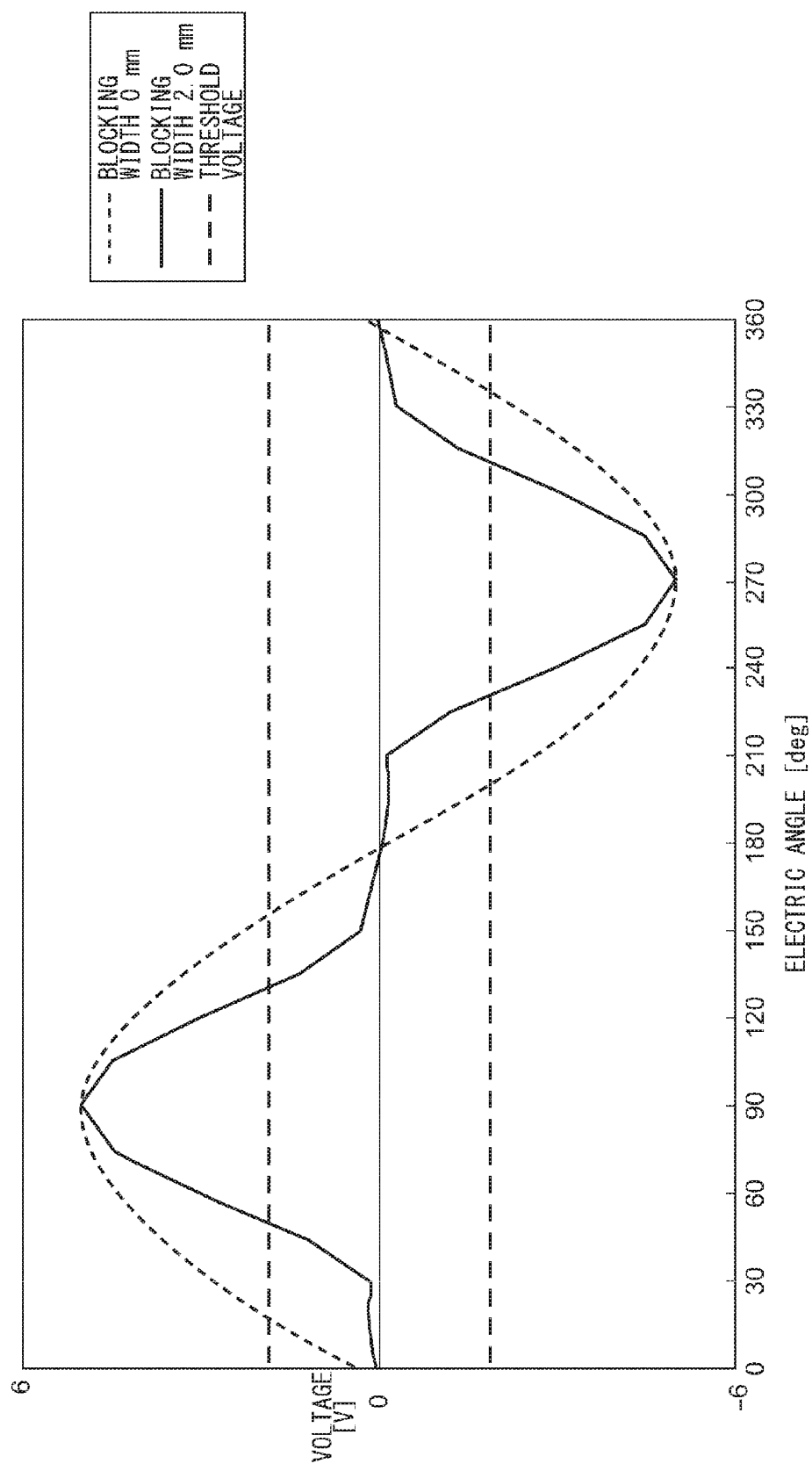
FIG. 38 shows waveforms of signals outputted from each Hall element according to a second modification.

FIG. 38 shows waveforms of signals outputted from each Hall element according to the second modification. In the shield plate 96 shown in FIG. 37C, sixteen rectangular magnetic flux blocking portions 96a are formed radially from the center outward. The magnetic flux blocking portions 96a are arranged such that each of the magnetic flux blocking portions 96a shields part of an end face of each θ magnet 78 in an axial direction. FIG. 38 shows waveforms for two cases; the first case is when no magnetic flux blocking portion 96a is provided, and the second case is when the width W2 of the magnetic flux blocking portion 96a is 2.0 mm. In this manner, provision of the magnetic flux blocking portions 96a allows the output waveform from the Hall element be formed and changed in a desired shape.

Second Embodiment

Figure 39:
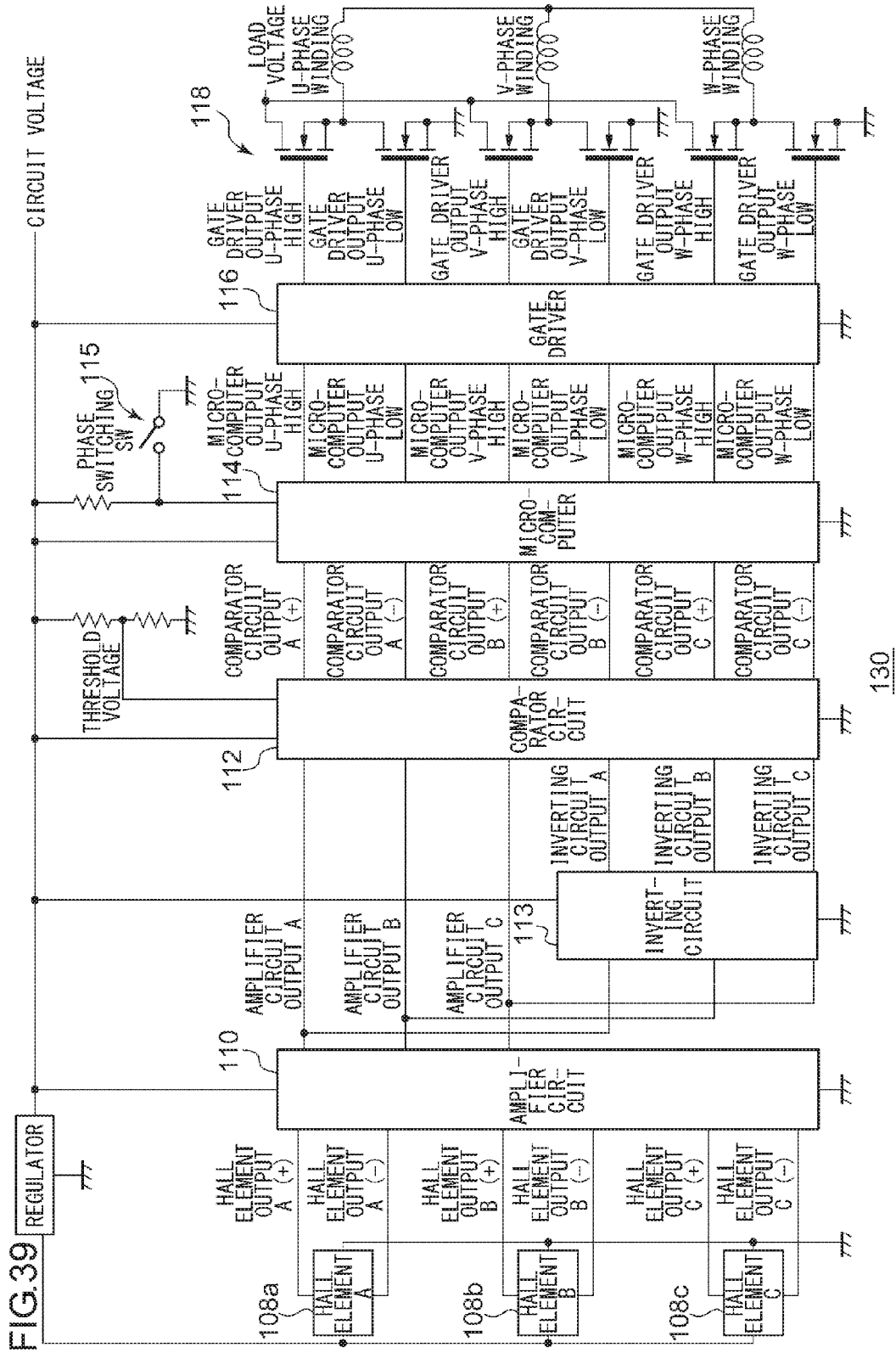
FIG. 39 is a block diagram of a phase control circuit of a brushless motor according to a second embodiment.
Figure 40:
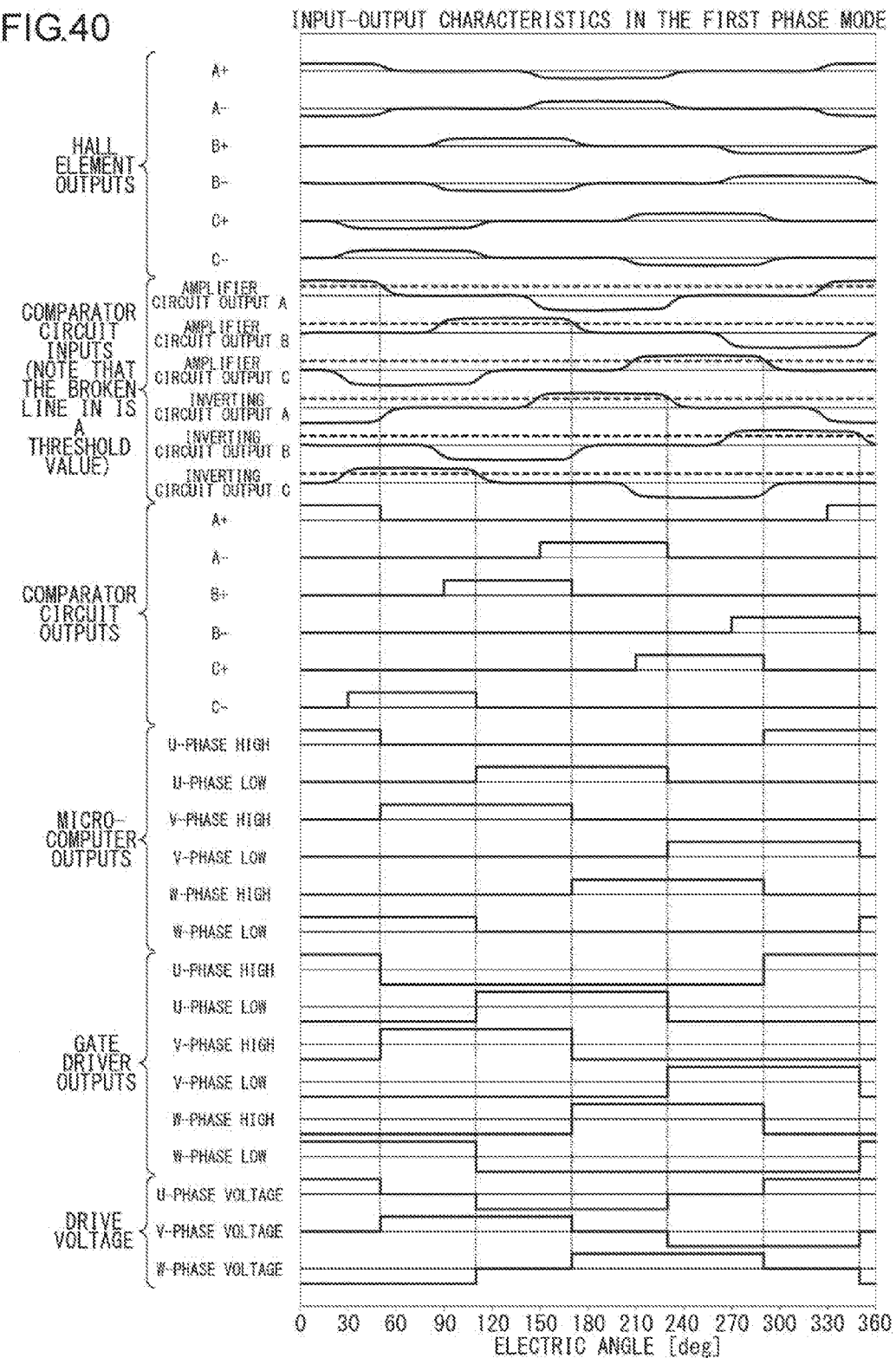
FIG. 40 shows input-output characteristics of each block of a phase control circuit according to a second embodiment, in a first phase mode.
Figure 41:
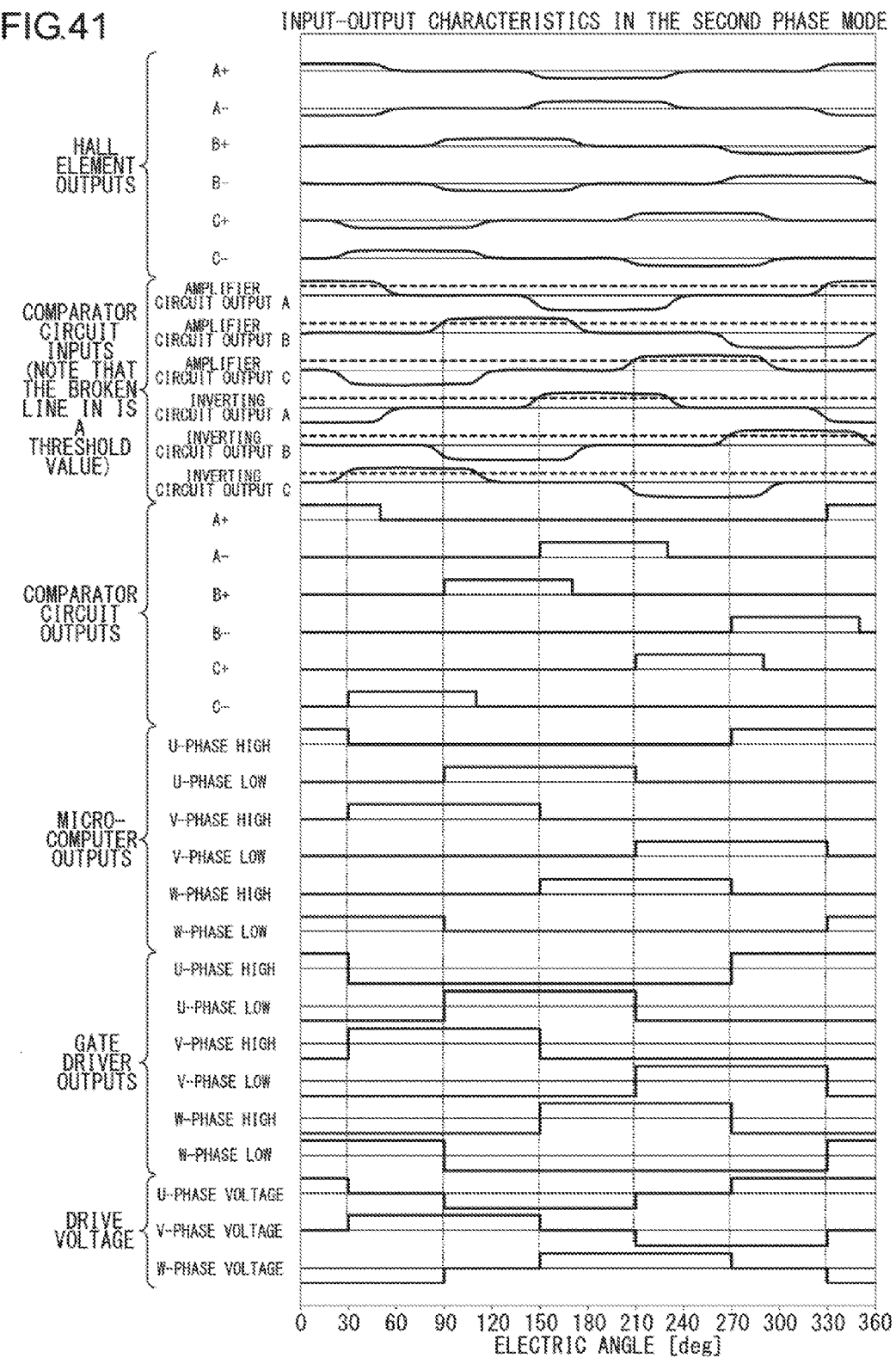
FIG. 41 shows input-output characteristics of each block of a phase control circuit according to a second embodiment, in a second phase mode.

FIG. 39 is a block diagram of a phase control circuit of a brushless motor according to a second embodiment. FIG. 40 shows input-output characteristics of each block of the phase control circuit according to the second embodiment, in a first phase mode. FIG. 41 shows input-output characteristics of each block of the phase control circuit according to the second embodiment, in a second phase mode. Note that the same components as those of the phase control circuit 120 according to the first embodiment are given the same reference numerals and the repeated description thereof is omitted as appropriate.

Hall elements A to C shown in FIG. 39 output six voltages whose phases differ from each other, in response to a change in the magnetic field resulting from the rotation of magnets placed in the rotor. As described earlier, each Hall element according to the present embodiment outputs a set of voltages where the polarity of one of the set thereof is the inverted polarity of the other thereof (see the Hall element outputs in FIG. 40). These six Hall element outputs are amplified by an amplifier circuit 110. Since the voltage of each Hall element output is small, the effect of noise can be reduced, by amplification, in the subsequent processing. Also, each Hall element outputs two voltages whose polarities differ from each other. Thus, the noise can be removed by outputting a voltage difference of the two voltages whose polarities differ from each other when the amplifier circuit 110 performs amplification. The amplifier circuit 110 as used herein is an operational amplifier (op-amp), for instance. Even if the Hall elements A to C are configured such that only the first waveform, which varies in response to a change in the magnetic field, is outputted, the Hall elements A to C can be used as the signal output unit in the present embodiment except for the effect of noise.

Amplifier circuit outputs A to C amplified by the amplifier circuit 110 are inputted to a comparator circuit 112 and an inverting circuit 113. At the inverting circuit 113, amplifier circuit outputs A to C are inverted and then inputted to the comparator circuit 112 as inverted circuit outputs A to C. A threshold voltage is also inputted to the comparator circuit 112. The comparator circuit 112 compares the amplifier circuit outputs against a predetermined threshold value and performs A/D conversion on their comparison results so as to generate a plurality of comparison outputs, having predetermined pulse widths, whose phases differ from each other. A diode can be used as the inverting circuit 113. The processing after this is the same as that carried out in the first embodiment.

A phase control circuit 130 configured as described above includes three Hall elements (108a to 108c) and the inverting circuit 113. The Hall elements are preferably configured such that the first waveform, which varies in response to a change in the magnetic field, is outputted. The inverting circuit 113 is configured such that an output based on the first waveform is inverted so as to output a second waveform. Thereby, the signal output unit can output a number of waveforms, which is greater than the number of Hall elements used, so that the number of Hall elements used can be reduced even though each Hall element outputs a single output.

Third Embodiment

Figure 42:
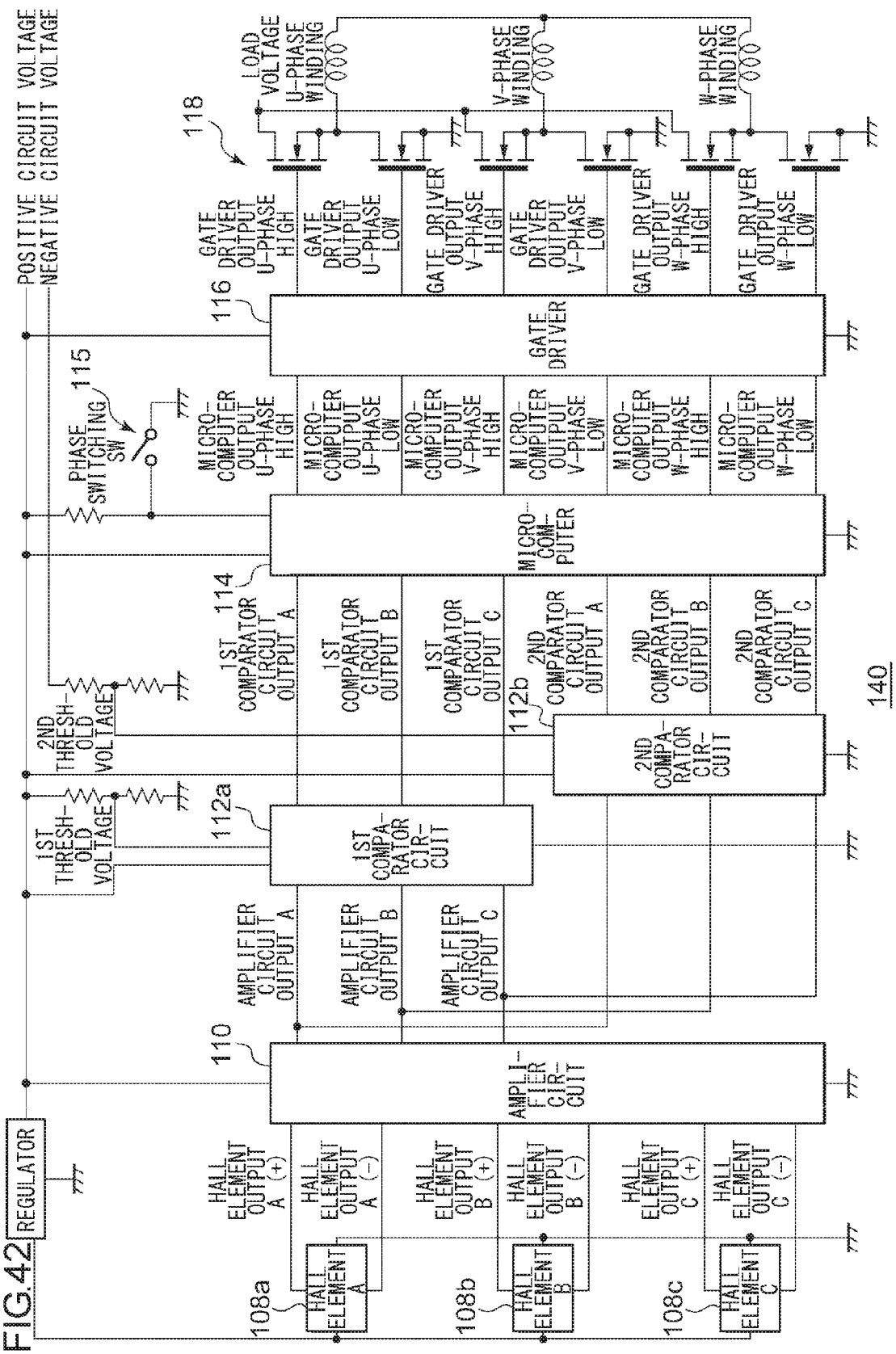
FIG. 42 is a block diagram of a phase control circuit of a brushless motor according to a third embodiment.
Figure 43:
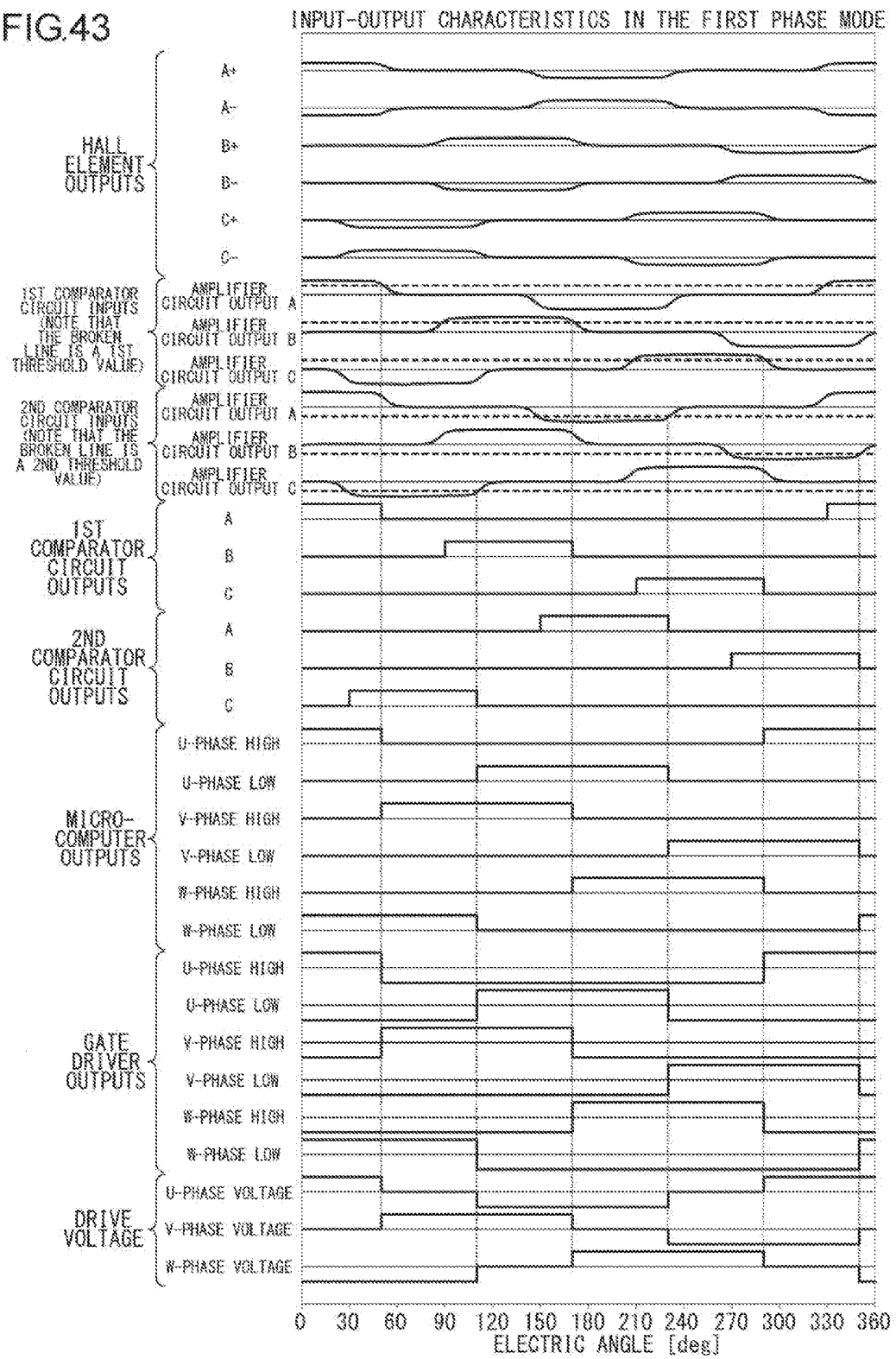
FIG. 43 shows input-output characteristics of each block of a phase control circuit according to a third embodiment, in a first phase mode.
Figure 44:
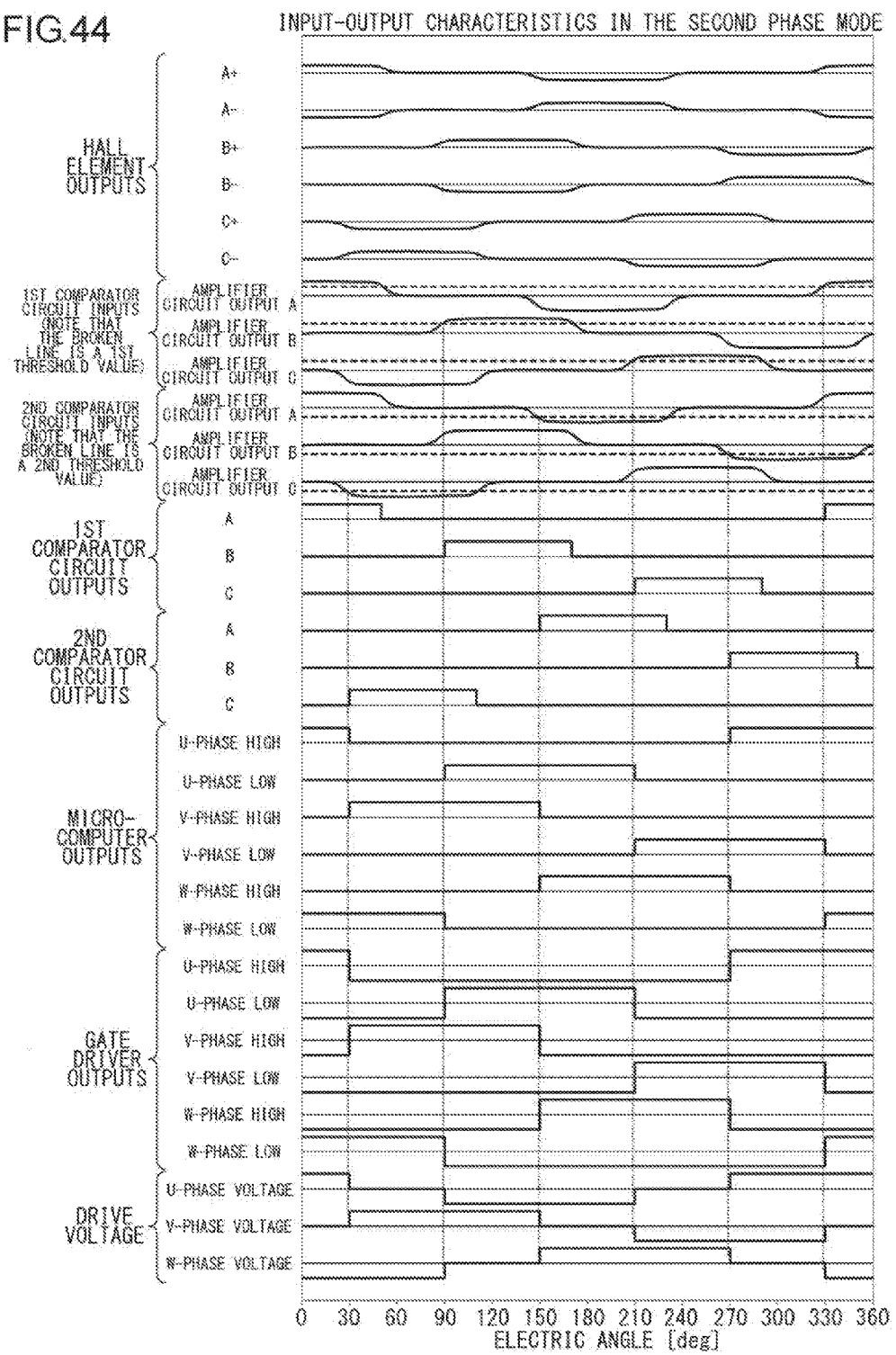
FIG. 44 shows input-output characteristics of each block of a phase control circuit according to a third embodiment, in a second phase mode.

FIG. 42 is a block diagram of a phase control circuit of a brushless motor according to a third embodiment. FIG. 43 shows input-output characteristics of each block of the phase control circuit according to the third embodiment, in a first phase mode. FIG. 44 shows input-output characteristics of each block of a phase control circuit according to the third embodiment, in a second phase mode. Note that the same components as those of the phase control circuit 120 according to the first embodiment and the phase control circuit 130 according to the second embodiment are given the same reference numerals and the repeated description thereof is omitted as appropriate.

As shown in FIG. 42, amplifier circuit outputs A to C amplified by the amplifier circuit 110 are inputted to a comparator circuit 112a and a comparator circuit 112b. A first threshold voltage is inputted to the comparator circuit 112a. A second threshold voltage is inputted to the comparator circuit 112b. The comparator circuit 112a compares the amplifier circuit outputs A to C against the first threshold value and generates a plurality of first comparison outputs, having predetermined pulse widths, whose phases differ from each other. Also, the comparator circuit 112b compares the amplifier circuit outputs A to C against the second threshold value, which differs from the first threshold value, and generates a plurality of second comparison outputs, having predetermined pulse widths, whose phases differ from each other. Thereby, a phase control circuit 140 can generate two different kinds of phase control signal groups from the same signals (the amplifier circuit outputs A to C) outputted from the amplifier circuit 110.

Fourth Embodiment

Figure 45:
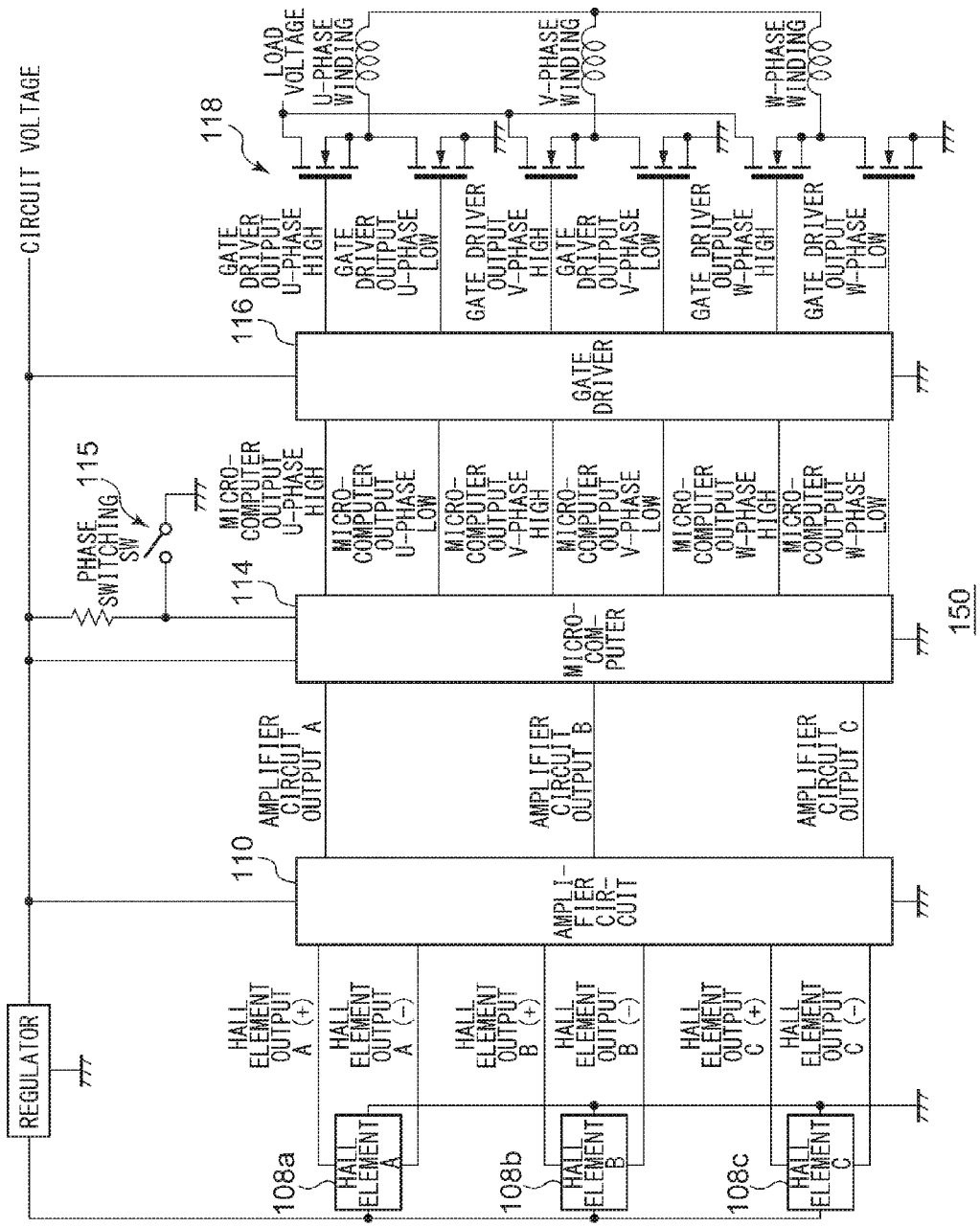
FIG. 45 is a block diagram of a phase control circuit of a brushless motor according to a fourth embodiment.
Figure 46:
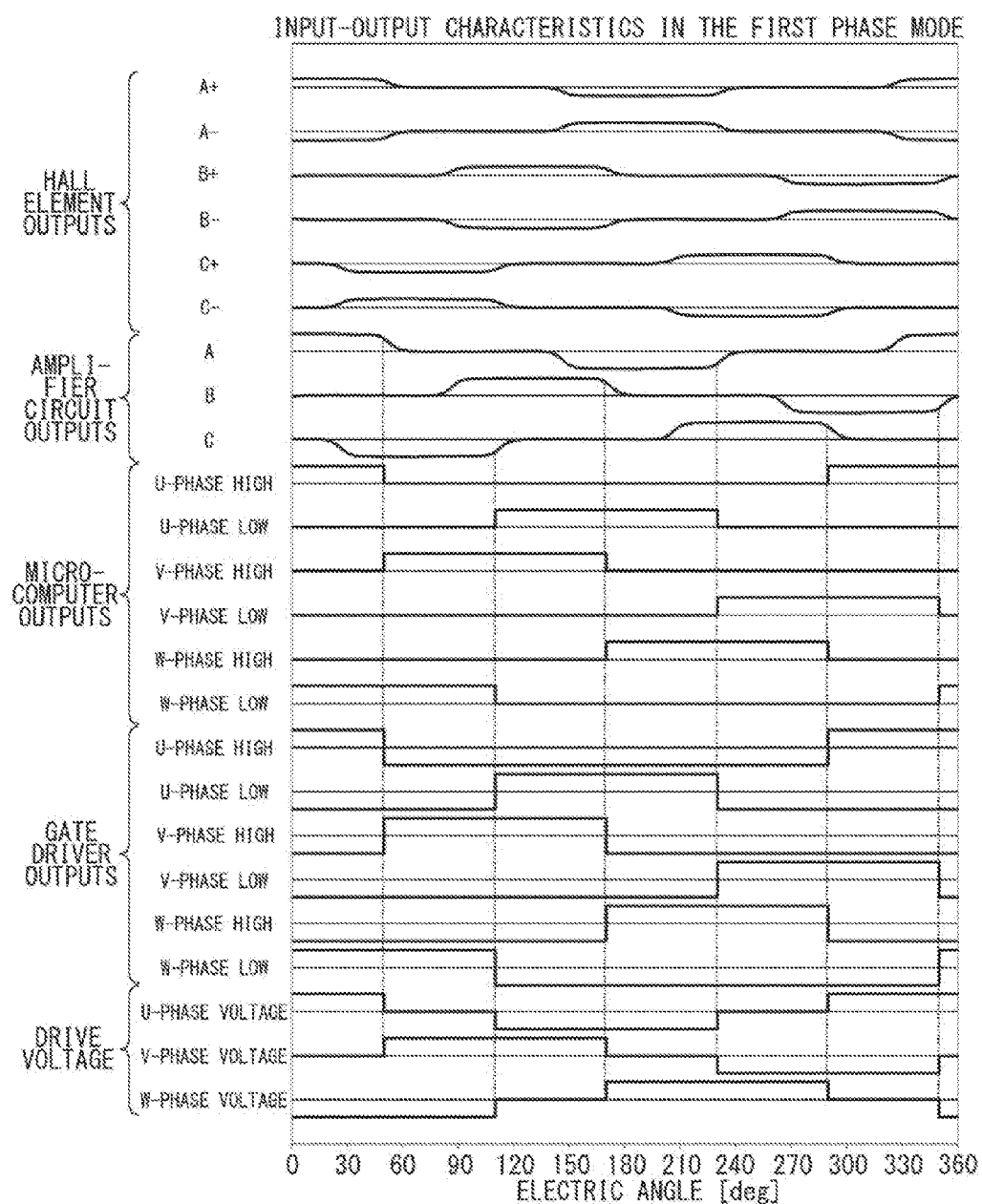
FIG. 46 shows input-output characteristics of each block of a phase control circuit according to a fourth embodiment, in a first phase mode.
Figure 47:
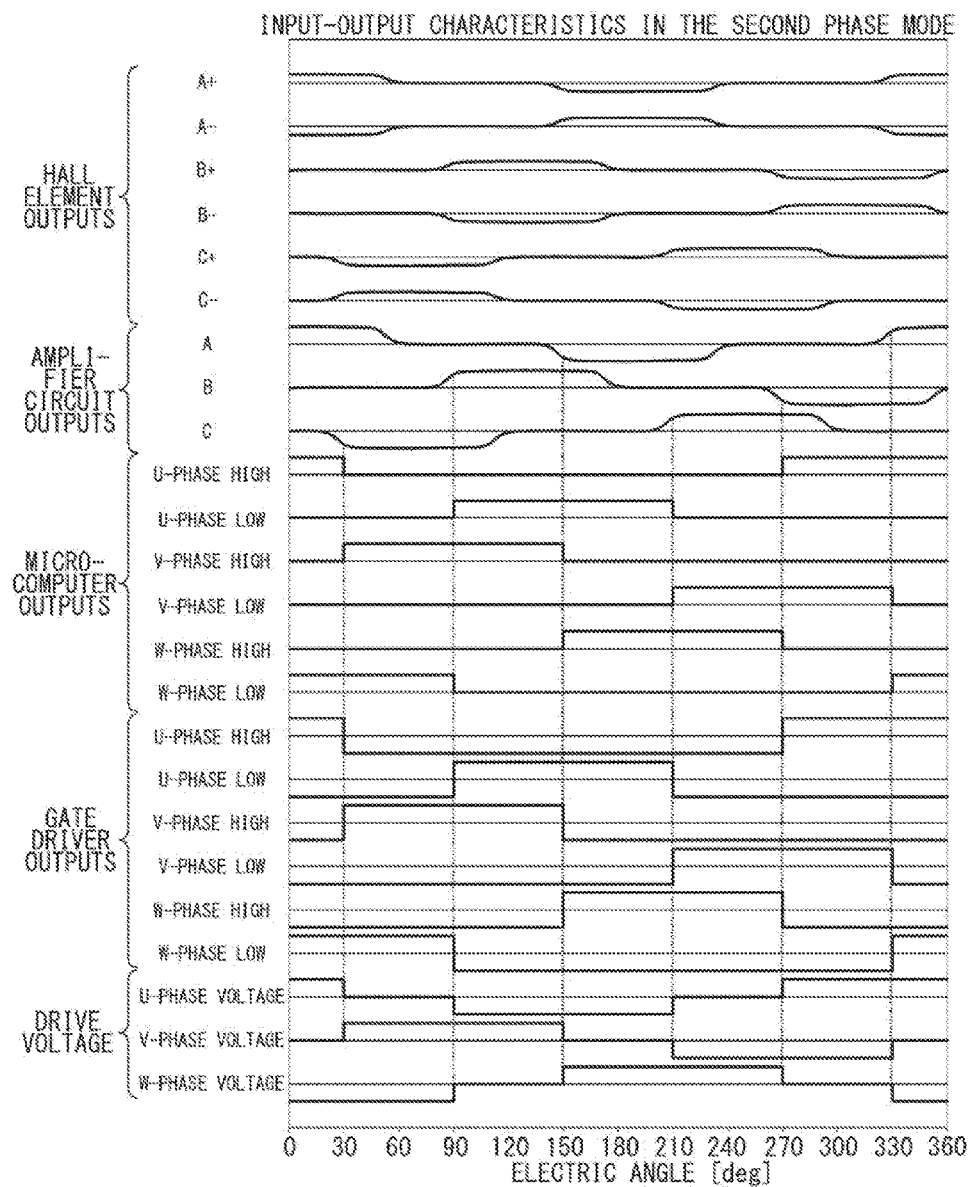
FIG. 47 shows input-output characteristics of each block of a phase control circuit according to a fourth embodiment, in a second phase mode.

FIG. 45 is a block diagram of a phase control circuit of a brushless motor according to a fourth embodiment. FIG. 46 shows input-output characteristics of each block of the phase control circuit according to the fourth embodiment, in a first phase mode. FIG. 47 shows input-output characteristics of each block of the phase control circuit according to the fourth embodiment, in a second phase mode. Note that the same components as those of the phase control circuit 120 according to the first embodiment are given the same reference numerals and the repeated description thereof is omitted as appropriate.

In a phase control circuit 150 according to the fourth embodiment, amplifier circuit outputs A to C amplifier by an amplifier circuit 110 are inputted to a microcomputer 114 through A/D conversion ports. The microcomputer 114 generates two or more different kinds of group of phase control signals, based on the amplifier circuit outputs A to C. Here, the group of phase control signals is used to control the drive voltages, whose phases differ from each other, which are supplied to each phase of a three-phase coil.

Fifth Embodiment

Figure 48:
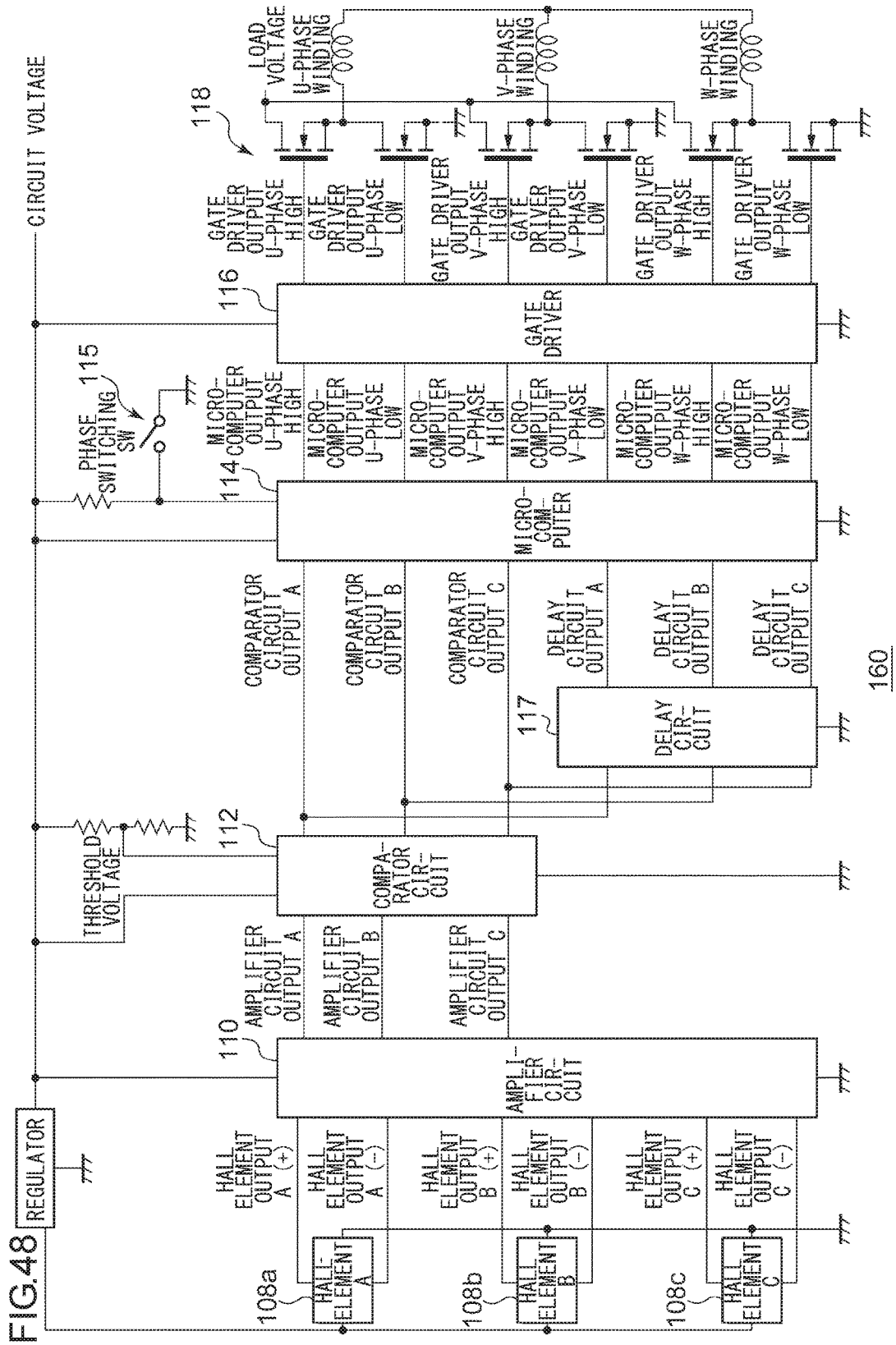
FIG. 48 is a block diagram of a phase control circuit of a brushless motor according to a fifth embodiment.

FIG. 48 is a block diagram of a phase control circuit of a brushless motor according to a fifth embodiment. Note that the same components as those of the phase control circuit 120 according to the first embodiment are given the same reference numerals and the repeated description thereof is omitted as appropriate.

In a phase control circuit 160 according to the fifth embodiment, a delay circuit 117 is provided subsequent to a comparator circuit 112. In other words, the control signal generator of the phase control circuit 160 includes a comparator circuit 112, a delay circuit 117, and a microcomputer 114. Here, the comparator circuit 112 compares the amplifier circuit outputs A to C outputted from an amplifier circuit 110 against a predetermined threshold value and generates comparator circuit outputs A to C, having predetermined pulse widths, whose phases differ from each other. The delay circuit 117 outputs delay circuit outputs A to C whose phases lag the phases of the comparator circuit outputs A to C by a predetermined phase of α degrees (α>0). The microcomputer 114 generates a first phase control signal group, based on one of the rising timing and the falling timing of pulses of the comparator circuit outputs A to C and the delay circuit outputs A to C, and generates a second phase control signal group, based on the other of the rising timing and the falling timing of pulses of the comparator circuit outputs A to C and the delay circuit outputs A to C.

Sixth Embodiment

Figure 49:
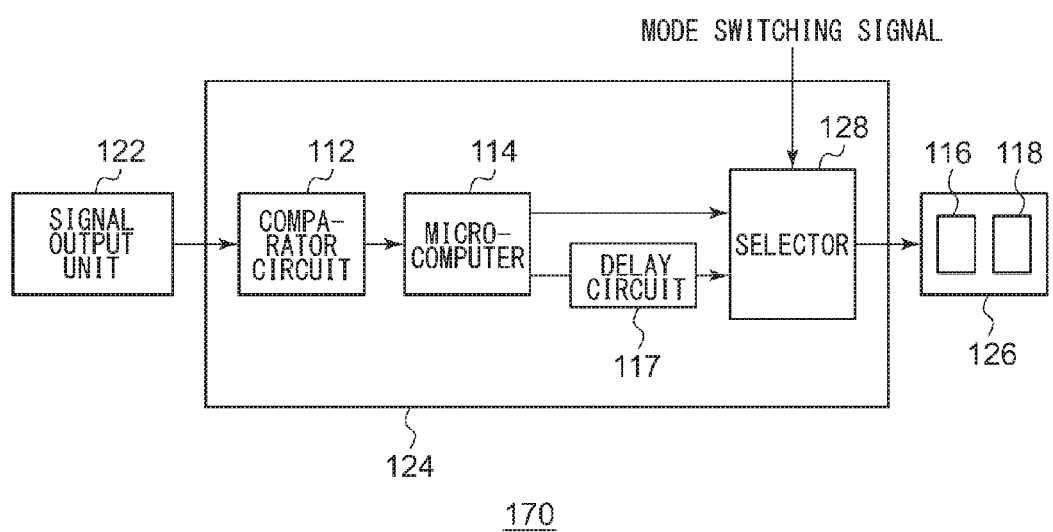
FIG. 49 is a block diagram of a phase control circuit of a brushless motor according to a sixth embodiment.

FIG. 49 is a block diagram of a phase control circuit of a brushless motor according to a sixth embodiment. A phase control circuit 170 according to the sixth embodiment includes a signal output unit 122 having Hall elements, a control signal generator 124, and a drive unit 126. The control signal generator 124 includes a comparator circuit 112, a microcomputer 114, a delay circuit 117, and a selector 128. Here, the comparator circuit 112 of the control signal generator 124 compares a plurality of signals outputted from the signal output unit 122 against a predetermined threshold value and generates a plurality of comparison outputs, having predetermined pulse widths, whose phases differ from each other. The microcomputer 114 generates a first phase control signal group, based on either the rising timing and the falling timing of pulses of the comparator circuit outputs. The delay circuit 117 thereof outputs a second phase control signal group whose phase lags the phase of the first phase control signal group by a predetermined phase of α degrees (α>0). The selector 128 selects as to whether the first phase control signal group or the second phase control signal group is to be outputted, based on a mode switching signal. Thereby, two different kinds of phase control signal groups can be generated from the same comparison output.

Figure 50:
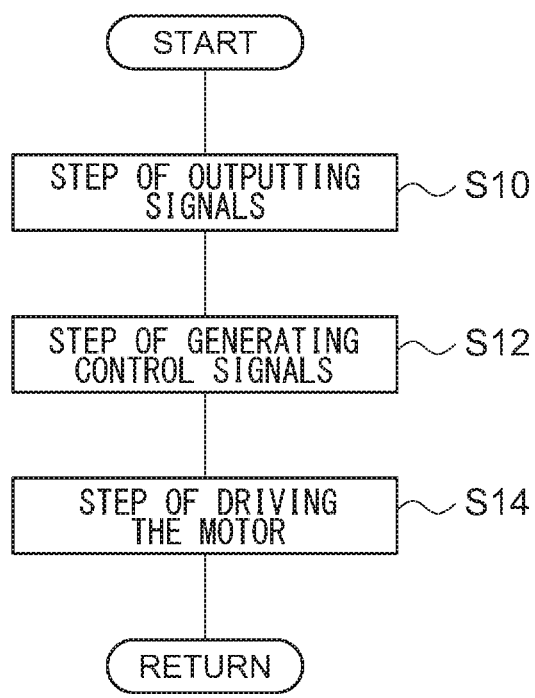
FIG. 50 is a flowchart showing a method for controlling the phase of a brushless motor.

FIG. 50 is a flowchart showing a method for controlling the phase of a brushless motor. The phase control method shown in FIG. 50 includes Step S10, Step S12 and Step S14. Here, Step S10 is a step of outputting M signals, whose phases differ from each other, in response to a change in the magnetic field resulting from the rotation of magnets placed in the rotor. Step S12 is a step of generating two or more different kinds of group of phase control signal groups, used to control the drive voltages, whose phases differ from each other, which are supplied to each phase of an N-phase coil (N being an integer greater than or equal to 2), based on at least M signals. Step S14 is a drive step of supplying the drive voltages to each phase of the N-phase coil, based on the phase control signal group. The control signal generating step selectively generates a first phase control signal group, which controls the drive voltages supplied to each phase of the N-phase coil in the first drive mode of the brushless motor, and a second phase control signal group, whose phase differs from that of the first phase control signal group by a predetermined phase of α degrees (α>0), which controls the drive voltages supplied to each phase of the N-phase coil in the second drive mode of the brushless motor.

By employing this method, a plurality of phase control signal groups can be generated. This eliminates the need of providing different signal output units corresponding respectively to the plurality of phase control signal groups. In other words, it is no longer necessary to provide the corresponding signal output unit for every drive mode of the brushless motor.

As described above, use of the phase control circuit according to each of the embodiments allows the phase control for enlarging the output range of the brushless motor to be achieved with a simple configuration.

The present invention has been described based on the embodiments and the exemplary embodiments. The embodiments and the exemplary embodiments are intended to be illustrative only, and it is understood by those skilled in the art that various modifications to constituting elements or an arbitrary combination of each process could be further developed and that such modifications are also within the scope of the present invention.

The invention claimed is:

1. A phase control circuit for a brushless motor, comprising:
   a signal output unit that outputs M signals, whose phases differ from each other, in response to a change in a magnetic field resulting from a rotation of a magnet placed in a rotor;

a control signal generator that generates two or more different kinds of group of phase control signals, based on at least the M signals, wherein the group of phase control signals is used to control drive voltages, whose phases differ from each other, which are supplied to each phase of an N-phase coil (N being an integer greater than or equal to two); and a drive unit that supplies the drive voltages to each phase of the N-phase coil, based on the group of phase control signals, wherein the control signal generator is configured such that a first phase control signal group and a second phase control signal group are generated, the first phase control signal group controls drive voltages, which are supplied to each phase of the N-phase coil, in a first drive mode of the brushless motor, the second phase control signal group, whose phase differs from that of the first phase control signal group by a predetermined phase of a degrees ($\alpha>0$), controls drive voltages, which are supplied to each phase of the N-phase coil, in a second drive mode of the brushless motor, and wherein the control signal generator includes
a comparator circuit that compares a plurality of signals outputted from the signal output unit against a predetermined threshold value and generates a plurality of comparison outputs, having a predetermined pulse width, whose phases mutually differ from each other; and a generation circuit that generates the first phase control signal group, based on one of rising timing and falling timing of pulses of the comparison outputs, and generates the second phase control signal group, based on the other thereof.

2. A phase control circuit, for a brushless motor, according to claim 1, wherein the signal output unit has P Hall elements where P equals M/2, and wherein the Hall elements are configured such that a first waveform, which varies in response to a change in the magnetic field, and a second waveform, which has an inverted polarity of the first waveform, are outputted separately.

3. A phase control circuit, for a brushless motor, according to claim 1, wherein the control signal generator generates three phase control signals, whose phases mutually differ from each other by 120 degrees in an electric angle, which are supplied to each phase of a three-phase coil.

4. A phase control circuit, for a brushless motor, according to claim 3, wherein the signal output unit has three Hall elements.

5. A phase control circuit, for a brushless motor, according to claim 1, wherein the predetermined phase of a degrees lies in a range of $0<\alpha<240$ (excluding $\alpha=60$, 120 and 180) in an electric angle, and wherein the pulse width lies in a range of $60<60+\alpha<300$ (excluding $\alpha=60$, 120 and 180) in the electric angle.

6. A phase control circuit, for a brushless motor, according to claim 1, wherein a waveform of a signal outputted from the signal output unit is such that an electric angle starting from rising timing of the waveform till a reach of the threshold value is 40 degrees or below.

7. A phase control circuit, for a brushless motor, according to claim 1, wherein the control signal generator has a mode information acquiring unit, which acquires a selection signal indicating that either the first drive mode or the second drive mode is selected as a drive mode of the brushless motor, and outputs a phase control signal corresponding to the selected drive mode.

8. A phase control circuit, for a brushless motor, according to claim 1, wherein the signal output unit has P Hall elements where P equals M/2, and wherein the Hall elements are configured such that a first waveform, which varies in response to a change in the magnetic field, and a second waveform, which differs from the first waveform, are outputted separately.

9. A phase control circuit, for a brushless motor, according to claim 1, wherein the signal output unit has P Hall elements (P=M/2) and an inverting circuit, wherein the Hall elements are configured such that a first waveform, which varies in response to a change in the magnetic field, is outputted, and wherein the inverting circuit is configured such that a second waveform is outputted by inverting an output based on the first waveform.

10. A brushless motor comprising:
a cylindrical stator where a plurality of windings are placed;
a circular rotor core provided in a central part of the stator;
a plurality of plate-shaped magnets placed in a rotor;
a phase control circuit according to claim 1; and
a power feed section for supplying power to the plurality of windings in the stator.

11. A brushless motor according to claim 10, wherein the plurality of plate-shaped magnets are placed at intervals in a circumference direction of the rotor core, and each of the plurality of plate-shaped magnets has a protrusion protruding from an end face of the rotor core in a direction of a rotating shaft, and wherein each Hall element in the signal output unit is placed inward of the protrusion and is so placed as to face the protrusion.

12. A phase control circuit for a brushless motor, comprising:
a signal output unit that outputs M signals, whose phases differ from each other, in response to a change in a magnetic field resulting from a rotation of a magnet placed in a rotor;

a control signal generator that generates two or more different kinds of group of phase control signals, based on at least the M signals, wherein the group of phase control signals is used to control drive voltages, whose phases differ from each other, which are supplied to each phase of an N-phase coil (N being an integer greater than or equal to two); and a drive unit that supplies the drive voltages to each phase of the N-phase coil, based on the group of phase control signals, wherein the control signal generator is configured such that a first phase control signal group and a second phase control signal group are generated, the first phase control signal group controls drive voltages, which are supplied to each phase of the N-phase coil, in a first drive mode of the brushless motor, the second phase control signal group, whose phase differs from that of the first phase control signal group by a predetermined phase of a degrees ($\alpha>0$), controls drive voltages, which are supplied to each phase of the N-phase coil, in a second drive mode of the brushless motor, and wherein the control signal generator includes
a comparator circuit that compares a plurality of signals outputted from the signal output unit against a predetermined threshold value and generates a plurality of comparison outputs, having a predetermined pulse width, whose phases mutually differ from each other;
a generation circuit that generates the first phase control signal group, based on one of rising timing and falling timing of pulses of the comparison outputs; and
a delay circuit that generates the second phase control signal group whose phase lags that of the first phase control signal group by a predetermined phase of α degrees (α>0).

13. A brushless motor comprising:
a cylindrical stator where a plurality of windings are placed;
a circular rotor core provided in a central part of the stator;
a plurality of plate-shaped magnets placed in a rotor;
a phase control circuit according to claim 12; and
a power feed section for supplying power to the plurality of windings in the stator.

14. A brushless motor according to claim 13, wherein the plurality of plate-shaped magnets are placed at intervals in a circumference direction of the rotor core, and each of the plurality of plate-shaped magnets has a protrusion protruding from an end face of the rotor core in a direction of a rotating shaft, and
wherein each Hall element in the signal output unit is placed inward of the protrusion and is so placed as to face the protrusion.

15. A phase control circuit for a brushless motor, comprising:
a signal output unit that outputs M signals, whose phases differ from each other, in response to a change in a magnetic field resulting from a rotation of a magnet placed in a rotor;
a control signal generator that generates two or more different kinds of group of phase control signals, based on at least the M signals, wherein the group of phase control signals is used to control drive voltages, whose phases differ from each other, which are supplied to each phase of an N-phase coil (N being an integer greater than or equal to two); and
a drive unit that supplies the drive voltages to each phase of the N-phase coil, based on the group of phase control signals,
wherein the control signal generator is configured such that a first phase control signal group and a second phase control signal group are generated,
the first phase control signal group controls drive voltages, which are supplied to each phase of the N-phase coil, in a first drive mode of the brushless motor,
the second phase control signal group, whose phase differs from that of the first phase control signal group by a predetermined phase of a degrees (α>0), controls drive voltages, which are supplied to each phase of the N-phase coil, in a second drive mode of the brushless motor, and
wherein the control signal generator includes
a first comparator circuit that compares a plurality of signals outputted from the signal output unit against a first threshold value and generates a plurality of first comparison outputs, having a predetermined pulse width, whose phases mutually differ from each other;
a second comparator circuit that compares a plurality of signals outputted from the signal output unit against a second threshold value, which differs from the first threshold value, and generates a plurality of second comparison outputs, having a predetermined pulse width, whose phases mutually differ from each other; and
a generation circuit that generates the first phase control signal group, based on the first comparison output and generates the second phase control signal group, based on the second comparison output.

* * * * *